US012485694B2

(12) United States Patent
Isobe

(10) Patent No.: US 12,485,694 B2
(45) Date of Patent: Dec. 2, 2025

(54) IMAGE FORMING SYSTEM AND SHEET PROCESSING APPARATUS

(71) Applicant: CANON KABUSHIKI KAISHA, Tokyo (JP)

(72) Inventor: Kenichirou Isobe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 18/601,880

(22) Filed: Mar. 11, 2024

(65) Prior Publication Data

US 2024/0308262 A1 Sep. 19, 2024

(30) Foreign Application Priority Data

Mar. 15, 2023 (JP) ................................ 2023-040809

(51) Int. Cl.
*B42C 9/00* (2006.01)

(52) U.S. Cl.
CPC .. *B42C 9/0081* (2013.01); *B65H 2301/43822* (2013.01); *B65H 2301/51614* (2013.01); *G03G 2215/00835* (2013.01); *G03G 2215/00848* (2013.01)

(58) Field of Classification Search
CPC ........... B65H 2301/43822; B65H 2301/51614; G03G 2215/00835; G03G 2215/00848; B42C 9/0081
See application file for complete search history.

(56) References Cited

U.S. PATENT DOCUMENTS 4,398,986 A * 8/1983 Smith, Jr. ............ B29C 65/305 156/290

FOREIGN PATENT DOCUMENTS

| | | | | |
|---|---|---|---|---|
| JP | 2000255881 | A | * | 9/2000 |
| JP | 2005162352 | A | | 6/2005 |
| JP | 2015178198 | A | * | 10/2015 |
| JP | 2022075503 | A | | 5/2022 |

* cited by examiner

*Primary Examiner* — Jennifer Bahls
(74) *Attorney, Agent, or Firm* — Canon U.S.A., Inc. IP Division

(57) ABSTRACT

An image forming system includes an image forming apparatus and a sheet processing apparatus having a stacking unit, a moving unit, and a thermal compression bonding unit. The stacking unit includes a stack of plural sheet having an adhesive layer for bonding the plural sheets together. The thermal compression bonding unit includes a heating member having a heat generation area. In a case where a length of the adhesive layer regarding a longer-side direction of the heating member is greater than a length of the heat generation area, an entire area of the adhesive layer on the plural sheets is heated and pressed by applying heat and pressure to the adhesive layer more than once while changing, via the moving unit, a relative position of the plural sheets having been conveyed onto the stacking unit and the heat generation area regarding the longer-side direction of the heating member.

38 Claims, 31 Drawing Sheets

IMAGE FORMING SYSTEM AND SHEET PROCESSING APPARATUS

BACKGROUND

Field

The present disclosure relates to an image forming system and a sheet processing apparatus configured to bond a plurality of sheets together by applying heat and pressure to a layer of an adhesive formed on a sheet.

Description of the Related Art

Japanese Patent Laid-Open No. 2022-075503 discloses an image forming system that includes an image forming apparatus configured to form an image on a sheet and a sheet processing apparatus configured to bond sheets together to create a booklet by heating and pressing an adhesive-use toner layer formed on a sheet. A heater configured to heat an adhesive-use toner layer is built in the sheet processing apparatus. Besides a toner image for image-forming use, an adhesive-use toner layer for gluing sheets together is formed at an end portion on a sheet by the image forming apparatus. Heat and pressure are applied to the adhesive-use toner layer of a plurality of sheets by a heater of the sheet processing apparatus, thereby gluing the sheets together.

SUMMARY

There is a demand for an image forming system and a sheet processing apparatus capable of creating a sheet stack that is longer than the heat generation area of the heater. In this case, there is a need to create the sheet stack by properly heating and pressing a layer of an adhesive formed on a sheet. Certain aspect of the present disclosure provide an image forming system and a sheet processing apparatus capable of creating a sheet stack by performing heating and pressing properly while taking the above need into consideration.

According to an aspect of the present disclosure, an image forming system includes an image forming apparatus configured to form an image on a sheet, and a sheet processing apparatus that is configured to create a sheet stack by bonding together a plurality of sheets conveyed from the image forming apparatus and that includes a stacking unit, a moving unit, and a thermal compression bonding unit having a heating member that is elongated and a sheet cradle member that faces the heating member, wherein the stacking unit includes a stacking surface on which plural sheets, having a layer of an adhesive formed on the plural sheets by the image forming apparatus for bonding the plural sheets together, are to be stacked, wherein the moving unit is configured to move either one or both of the plural sheets and the thermal compression bonding unit in a longer-side direction of the elongated heating member, wherein the heating member of the thermal compression bonding unit includes a heat generation area configured to heat the adhesive, wherein the thermal compression bonding unit is configured to sandwich and heat the plural sheets stacked on the stacking unit between the heating member and the sheet cradle member, and to bond the plural sheets together by applying pressure while applying heat to the layer of the adhesive formed on the plural sheets by moving either one or both of the heating member and the sheet cradle member, wherein a position of the layer of the adhesive formed on the plural sheets is selectable in the longer-side direction of the heating member, and wherein, in a case where a length of the layer of the adhesive regarding the longer-side direction of the heating member is greater than a length of the heat generation area, an entire area of the layer of the adhesive on the plural sheets is heated and pressed by applying the heat and the pressure to the layer of the adhesive more than once while changing, via the moving unit, a relative position of the plural sheets having been conveyed onto the stacking unit and the heat generation area regarding the longer-side direction of the heating member.

Further features of the present disclosure will become apparent from the following description of exemplary embodiments with reference to the attached drawings.

DESCRIPTION OF THE EMBODIMENTS

With reference to the drawings, some embodiments of the present disclosure will now be described. The term "image forming apparatus" as used herein encompasses a wide variety of apparatus configured to form (record) an image on a recording material (recording medium) such as a single-function printer, a copier, a multi-function printer, a commercial printing machine, and the like. The image forming apparatus may be a system (image forming system) embodied by coupling an image forming apparatus body configured to form an image on a recording material to equipment such as a sheet processing apparatus, a sheet feeding apparatus, or the like.

First Embodiment

With reference to FIGS. 1 to 21, a configuration of an image forming apparatus that includes a sheet processing apparatus according to the present embodiment will now be described. First, an overall configuration of an image forming apparatus according to the present embodiment is described here, which will be followed by a description of a configuration of a sheet processing apparatus according to the present embodiment next.

Figure 1:
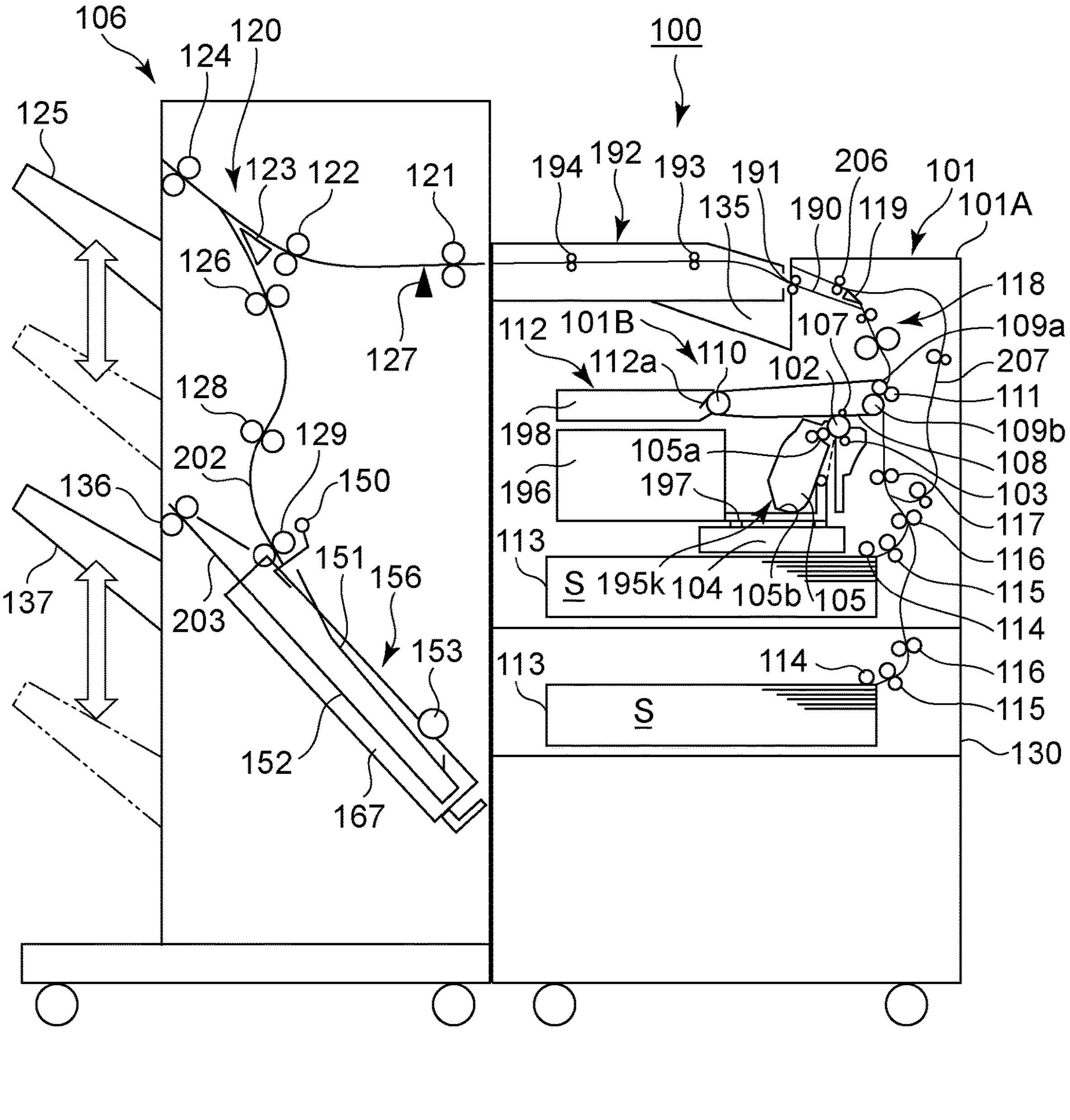
FIG. 1 is a schematic view of an image forming apparatus according to a first embodiment.

FIG. 1 is a schematic view of an image forming apparatus 100 according to a first embodiment. The image forming apparatus 100 includes a printer body 101 as an image forming apparatus body having an image forming function (printing function) and a sheet processing apparatus 106 having a sheet bonding function. That is, the image forming apparatus 100 can be defined as an image forming system made up of the printer body 101, which functions as an image forming apparatus even when configured alone, and the sheet processing apparatus 106.

The image forming apparatus 100 according to the present embodiment, just with a single-apparatus configuration, is capable of creating a booklet through printing and bookbinding by forming an image on sheets S, one by one, using the printer body 101, and then by performing thermal compression bonding of the plurality of sheets S using the sheet processing apparatus 106. Various kinds of sheet medium different in size and material can be used as the sheet S, for example, paper such as plain paper or thick paper, a surface-treated sheet medium such as coated paper, a plastic film, a cloth, a special-shaped sheet medium such as an envelope or an index sheet, or the like.

Image Forming Apparatus Body

The printer body 101 is an electrophotographic apparatus that includes a housing 101A and an electrophotographic image forming section 101B housed in the housing 101A. The image forming section 101B includes an intermediate transfer belt 108, which is an example of an intermediate transfer member, and a process cartridge 195 disposed along the intermediate transfer belt 108. The image forming section 101B is an intermediate-transfer-type electrophotographic unit. The process cartridge 195(K) includes a photosensitive drum 102, which is an example of an image bearing member, a charging device 103, which is an example of a charging component, and a development unit 105, which is an example of a developing component. The image forming section 101B further includes a scanner unit 104, which is an example of an exposing component, and a primary transfer roller 107.

The development unit 105 includes a development roller 105*a*, which is an example of the developing component, and a toner container 105*b*, in which a toner (developer) is contained. The development roller 105*a* is supported rotatably by the toner container 105*b*. The process cartridge 195 can be detachably attached to the housing 101A. A toner cartridge 196, which contains a toner to be supplied to the development unit 105, is detachably mounted in the printer body 101. The "housing 101A" of the printer body 101 means a portion excluding the process cartridge 195 and the toner cartridge 196 from the printer body 101. The housing 101A includes a frame member such as a metal frame constituting the framework of the printer body 101, and members fixed to this frame body, and forms a mounting space into which the process cartridge 195 and the toner cartridge 196 are mounted.

The process cartridge 195 forms a toner image for image recording on the sheet S using a toner, and forms an adhesive-use toner image for gluing the sheets S together. The printer body 101 according to the present embodiment has a configuration of a monochrome printer configured to record a monochrome image. The printer body 101 uses a black toner not only as a toner for image-recording purpose but also as a toner for adhesive purpose (powdery adhesive). As in first to third embodiments to be described later, the toner for adhesive use may be a toner other than a black toner, or may be a dedicated toner used exclusively for adhesive purpose separately from the toner used for recording an image.

The toner cartridge 196 and the process cartridge 195 that are mounted in the housing 101A are connected to each other through a toner-conveying pipe 197. The toner cartridge 196 is capable of supplying a toner for replenishment to the development unit 105 through the toner-conveying pipe 197.

The scanner unit 104, as an example of the exposing component, is disposed under the process cartridge 195 inside the housing 101A. A cassette 113 (also called "sheet tray", "storage container"), which is an example of a sheet storage portion configured to store the sheets S to be used for forming an image, is mounted under the scanner unit 104 in such a way as to be able to be drawn out of the housing 101A. One or more optional sheet feeding apparatuses 130 including an additional cassette(s) 113 may be coupled to the lower portion of the housing 101A.

The intermediate transfer belt 108 is a movable (rotatable) endless belt stretched on and around a drive roller 109*a*, a stretching roller 109*b*, and a tension roller 110, which are configured to rotate on axial lines parallel to one another. Driven by rotation of the drive roller 109*a*, the intermediate transfer belt 108 moves (turns, performs conveyor action) counterclockwise in the figure. The primary transfer roller 107, which is an example of a primary transfer member, is disposed on the inner-side surface of the intermediate transfer belt 108 at a position where it faces the photosensitive drum 102, with the intermediate transfer belt 108 interposed therebetween. A secondary transfer roller 111, which is an example of a transfer member (secondary transfer member), is disposed on the outer-side surface of the intermediate transfer belt 108 at a position where it faces the drive roller 109*a*, with the intermediate transfer belt 108 interposed therebetween. A secondary transfer section as an example of a transfer section is formed as a nip between the intermediate transfer belt 108 and the secondary transfer roller 111. The intermediate transfer belt 108, the primary transfer roller 107, and the secondary transfer roller 111 constitute a transfer unit (transferring component) configured to transfer the toner image having been formed on the photosensitive drum 102, which is an example of the image bearing member, onto the sheet S.

A belt cleaner 112, which is an example of a cleaning component configured to clean the intermediate transfer belt 108, is provided at a position where it faces the tension roller 110, with the intermediate transfer belt 108 interposed therebetween. The belt cleaner 112 includes a cleaning member 112*a* such as a blade or a brush disposed in contact with the intermediate transfer belt 108, and a waste toner container 198 functioning as a collection container. The belt cleaner 112 removes dregs such as an un-transferred residual toner from the intermediate transfer belt 108 by using the cleaning member 112*a*, and collects the removed toner, etc. to the waste toner container 198.

A fixing device 118, which is an example of a fixing component, is disposed over the secondary transfer section inside the housing 101A. The fixing device 118 has a thermal-fixing configuration of fixing a toner image by applying heat. The fixing device 118 includes a pair of rotary members (for example, a roller pair made up of a fixing roller and a pressing roller) configured to nip and convey the sheet S, and a heat source (for example, a halogen lamp, an induction heating mechanism) configured to heat a toner image on the sheet S via the fixing roller.

Image Forming Operation

When the printer body 101 performs image forming operation, the sheet S is fed by a feeding roller 114 functioning as a pickup feeder either from the cassette 113 in the lower portion of the housing 101A or from the cassette 113 of the sheet feeding apparatus 130. A pair of separation rollers 115 conveys the fed sheets S one by one while performing multiple-fed sheet separation. The sheet S is conveyed by a pulling roller 116 toward a pair of registration rollers 117. A skew of the sheet S is corrected as a result of collision of the leading edge of the sheet S with a nip of the pair of registration rollers 117 that is in a stopped state. The pair of registration rollers 117 sends the sheet S to the secondary transfer section at a timing synchronized with the progress of a process of toner image generation by the image forming section 101B.

Meanwhile, at the image forming section 101B, the photosensitive drum 102 and the intermediate transfer belt 108 rotate. The charging device 103 charges the surface of the photosensitive drum 102 uniformly. The scanner unit 104 writes an electrostatic latent image by irradiating the photosensitive drum 102 with laser light on the basis of image information that represents an image to be recorded on the sheet S. The development unit 105 performs development using a black toner, thereby developing (visualizing) this electrostatic latent image as a black toner image.

In a case where thermal compression bonding to be described later is performed by the sheet processing apparatus 106, the scanner unit 104 writes an electrostatic latent image by irradiating the photosensitive drum 102 with laser light on the basis of information that specifies the position of adhesive bonding of the sheets S. As a result of the development of this electrostatic latent image by using the black toner by the development unit 105, an adhesive-use toner image is formed on the photosensitive drum 102 at an area corresponding to the position of adhesive bonding on the sheet S.

The toner image having been formed on the photosensitive drum 102 (image bearing member) is transferred (primarily transferred) onto the intermediate transfer belt 108 by the primary transfer roller 107, and is then conveyed toward the secondary transfer section due to the turning of the intermediate transfer belt 108. Then, a voltage is applied to the secondary transfer roller 111 at the secondary transfer section to cause a transfer (secondary transfer) of the toner image onto the sheet S coming from the pair of registration rollers 117. The sheet S having passed through the secondary transfer section is sent to the fixing device 118. Heat and pressure are applied to the toner image while the sheet S passes through the nip between the fixing roller and the pressing roller, causing the softening of the toner. The toner thereafter solidifies, as a result of which the image becomes fixed on the sheet S.

The conveyance path of the sheet S having passed through the fixing device 118 is switched by a switcher 119. In a case where simplex printing is performed, the sheet S is guided by the switcher 119 onto an ejection path 190, and is ejected out of the housing 101A by a pair of ejection rollers 191. In the present embodiment, the printer body 101 is coupled to the sheet processing apparatus 106 via a relay conveyance unit 192. The sheet S having been ejected from the pair of ejection rollers 191 is handed over to the sheet processing apparatus 106 via a pair of conveyance rollers 193 of the relay conveyance unit 192 and next via a pair of conveyance rollers 194 thereof. In a case where the relay conveyance unit 192 and the sheet processing apparatus 106 are not coupled thereto, the pair of ejection rollers 191 ejects the sheet S as a print output onto a sheet-stacking tray 135 provided at the top portion of the housing 101A.

In a case where duplex printing is performed, the sheet S on the first surface of which an image has been formed is guided by the switcher 119 to a pair of reversing rollers 206. Then, the sheet S, after reversing conveyance (switchback conveyance) by the pair of reversing rollers 206, is conveyed toward the pair of registration rollers 117 via a duplex conveyance path 207. An image is formed on the second surface, which is the opposite of the first surface, of the sheet S by passing through the secondary transfer section and the fixing device 118. The sheet S is thereafter ejected out of the housing 101A by the pair of ejection rollers 191.

Figure 2:
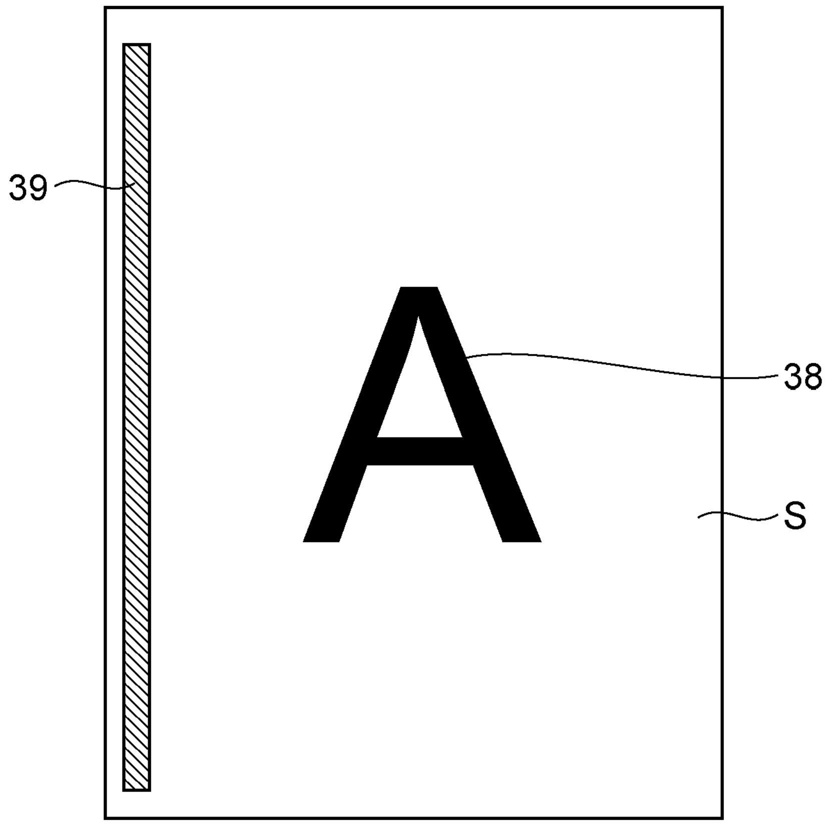
FIG. 2 is a diagram illustrating a toner image formed on a sheet by a printer body according to the first embodiment.

FIG. 2 is a diagram illustrating an example of a toner image formed on the sheet S. On the illustrated sheet S, a recording-use toner image 38 for recording an image such as a text, a figure, a photograph, and/or the like, and an adhesive-use toner image (a layer of an adhesive) 39 for gluing sheets together, are formed. The adhesive-use toner image (a layer of an adhesive) 39, in the present embodiment, is formed by means of an image-forming-use toner. However, the configuration according to the present embodiment is not limited to a configuration of forming the adhesive-use toner image 39 by means of the image-forming-use toner. The medium used for adhesive bonding is not limited to a toner. A powdery adhesive exclusive for adhesive purpose may be used for forming the adhesive-use toner image 39. The position, shape, area size, and the like of the adhesive-use toner image 39 can be changed in accordance with the configuration of a thermal compression bonding unit 167 to be described later. In the present embodiment, it is assumed that a layer of an adhesive is formed at an end portion on the sheet S as viewed in a direction intersecting with the conveyance direction of the sheet S. In a case where the image forming apparatus 100 creates a simplex-printed booklet, the adhesive-use toner image 39 is formed on one side only of the sheet S (i.e., on the same surface as the surface on which a recording-use toner image is formed). In a case of duplex-printed booklet, the adhesive-use toner image 39 may be formed on one side only of the sheet S, or on both sides of the sheet S.

Sheet Processing Apparatus

The sheet processing apparatus 106 includes a buffer unit 120 configured to put a plurality of sheets S one on top of another and operating as an example of a buffer, an alignment unit 156 configured to edge-align the plurality of sheets S and operating as an example of an aligner, and a thermal compression bonding unit 167 configured to bond the sheets S to one another by means of thermal compression bonding. The thermal compression bonding unit 167 is an example of a sheet adhesive bonding apparatus (an adhesive bonding unit, an adhesive bonder, a thermal compression bonder, a pasting processor) configured to glue the sheets together.

The sheet processing apparatus 106 further includes an upper ejection tray 125 and a lower ejection tray 137, each of which is configured to be able to move up and down, as ejection destinations where a print-processed output of the image forming apparatus 100 can be ejected.

The sheet processing apparatus 106 receives the plurality of sheets S on which an image has been formed by the printer body 101 one by one, performs gluing processing (thermal compression bonding), and then ejects the processing result as a stack of sheets (booklet). The buffer unit 120, the alignment unit 156, and the thermal compression bonding unit 167 will be described in detail later. The sheet processing apparatus 106 is not only capable of performing the above sheet processing but also capable of ejecting the sheets S on which an image has been formed by the printer body 101 to the upper ejection tray 125 or the lower ejection tray 137 without performing processing thereon.

Buffer Unit

Figure 3:
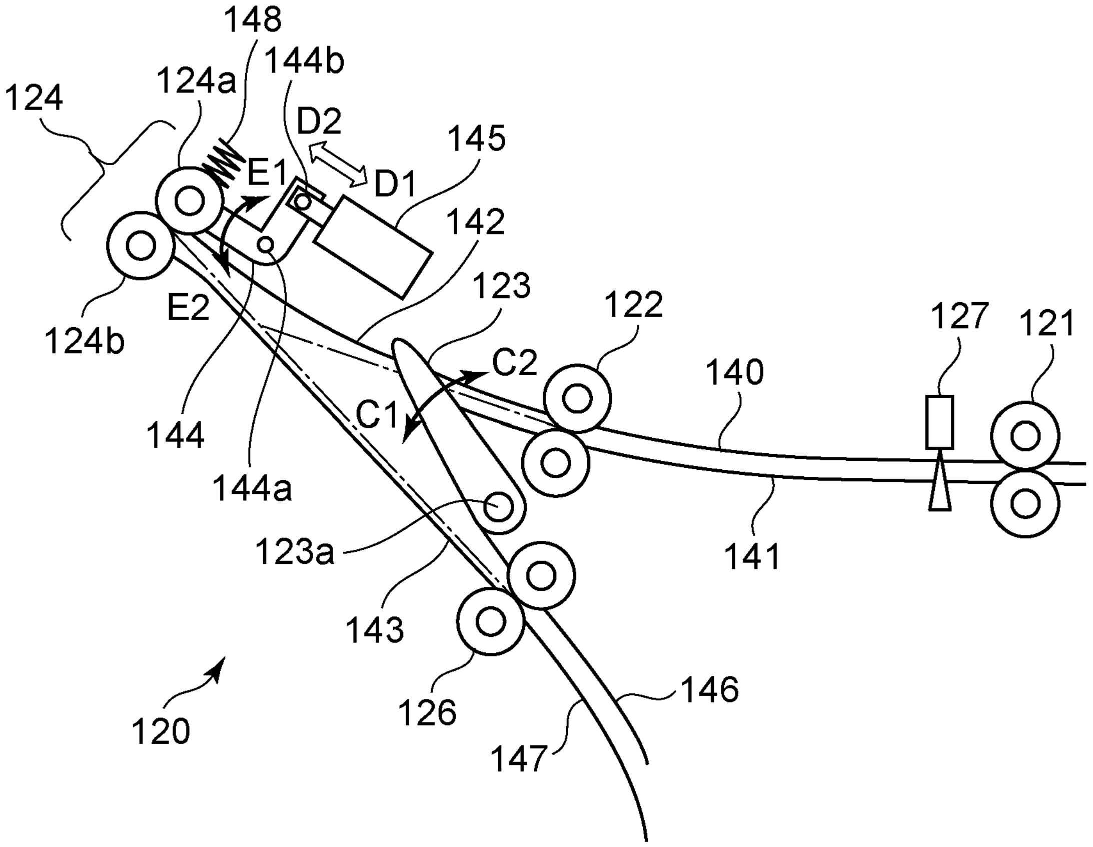
FIG. 3 is a diagram illustrating a buffer unit of a sheet processing apparatus according to the first embodiment.

With reference to FIG. 3, the buffer unit 120 will now be explained. FIG. 3 is a cross-sectional enlarged view of the buffer unit 120. The buffer unit 120 includes a pair of gateway rollers 121, a pair of pre-buffer rollers 122, a non-return valve 123, a pair of reversing rollers 124, and a pair of internal ejection rollers 126. The buffer unit 120 further includes a gateway sensor 127 configured to perform sheet detection and a separation mechanism including a plunger solenoid 145 and the like for the purpose of opening and closing the pair of reversing rollers 124 (bring the rollers into contact with, and away from, each other).

Each of the pair of gateway rollers 121, the pair of pre-buffer rollers 122, the pair of reversing rollers 124, and the pair of internal ejection rollers 126 is a pair of rollers configured to nip and convey a sheet. The pair of gateway rollers 121 and the pair of pre-buffer rollers 122 are disposed on a conveyance path (entrance path) where the sheet processing apparatus 106 receives the sheet S coming in. The pair of reversing rollers 124 is disposed on a conveyance path (first ejection path, see FIG. 1) that leads to the upper ejection tray 125. The pair of internal ejection rollers 126 is disposed on a conveyance path (internal ejection path, see FIG. 1) that leads from the pair of reversing rollers 124 toward the thermal compression bonding unit 167. The sheet processing apparatus 106 includes a conveyance path (second ejection path, see FIG. 1) that leads from the thermal compression bonding unit 167 toward the lower ejection tray 137.

The entrance path is formed of an upper entrance guide 140 and a lower entrance guide 141. The first ejection path is formed of an upper reversing guide 142 and a lower reversing guide 143. The internal ejection path is formed of an upper internal ejection guide 146 and a lower internal ejection guide 147. The gateway sensor 127 is disposed in such a way as to detect the sheet received by the pair of gateway rollers 121. The following reflective-type photo sensor, for example, can be used as the gateway sensor 127: a reflective-type photo sensor configured to determine whether the sheet S is present or absent by applying infrared light to the entrance path through an opening provided in the upper entrance guide 140 and detecting reflected light coming back from the sheet S. A hole having a diameter not less than a spot diameter of the infrared light emitted by the gateway sensor 127 may be provided in the lower entrance guide 141 so that no infrared light will be reflected when no sheet is passing along the entrance path.

The non-return valve 123 is disposed downstream of the pair of pre-buffer rollers 122 in the sheet conveyance direction at the entrance path. The non-return valve 123 is disposed in such a way as to be able to rotate freely on its rotation shaft 123*a* with respect to the upper internal ejection guide 146. The non-return valve 123 is capable of moving to a first position and a second position. The first position is a position for preventing sheet movement (returning) from the first ejection path to the entrance path. The second position is a position for tolerating sheet movement from the entrance path to the first ejection path. The non-return valve 123 is urged by a non-illustrated spring in a C2 direction from the second position toward the first position. The non-return valve 123 is configured to move in a C1 direction from the first position toward the second position by being pushed by a sheet and, upon the passing of the sheet, return to the first position.

When viewed in the direction of the rotational axial line of the non-return valve 123, the tip portion of the non-return valve 123 located at the first position overlaps with the upper reversing guide 142. The tip portion of the non-return valve 123 has a comb-teeth shape that enables overlapping with the upper reversing guide 142. When viewed in the direction of the rotational axial line of the non-return valve 123, a space where a sheet can pass is formed between the non-return valve 123 located at the second position and the upper reversing guide 142.

The pair of reversing rollers 124 is made up of an upper reversing roller 124*a* and a lower reversing roller 124*b*, to both of which a driving force is supplied. The upper reversing roller 124*a* and the lower reversing roller 124*b* are configured such that their rotations are always in sync. A separating lever 144 is connected to the upper reversing roller 124*a*. The separating lever 144 is supported in such a way as to be able to rotate freely on its lever fulcrum shaft 144*a* with respect to the upper reversing guide 142. The separating lever 144 is connected rotatably to the plunger solenoid 145 at its solenoid connection shaft 144*b*.

When an electric current flows to the plunger solenoid 145, a core moves in a D1 direction illustrated in this figure and, therefore, the separating lever 144 turns in an E1 direction illustrated in this figure. In this case, the pair of reversing rollers 124 is in a separated state (a nip-opened state), in which the upper reversing roller 124*a* and the lower reversing roller 124*b* are not in contact with each other. When the electric current flowing to the plunger solenoid 145 stops, due to an urging force of a pressing spring 148, the upper reversing roller 124*a* moves in an E2 direction, and the core of the plunger solenoid 145 moves in a D2 direction. In this case, the pair of reversing rollers 124 is in a contact state (a nip-formed state), in which the upper reversing roller 124*a* and the lower reversing roller 124*b* are in contact with each other.

Buffer Operation

Next, the operation of the buffer unit 120 will now be explained. FIGS. 4A to 4H are diagrams illustrating the operation of the buffer unit 120. In the description below, it is assumed that sheets come to the sheet processing apparatus 106 from the printer body 101 in the order of a sheet S1, a sheet S2, and a sheet S3. As will be described below, the buffer unit 120 performs operation of putting a new incoming sheet on top of another sheet (a stack) while moving the sheets (the stack) back and forth between the pair of reversing rollers 124 and the pair of internal ejection rollers 126 (this operation will be hereinafter referred to as "buffer operation"). In addition, the sheet processing apparatus 106 increases the speed of sheet conveyance inside itself. In the description below, the speed of sheet conveyance by the pair of gateway rollers 121 will be denoted as V1, and the speed of sheet conveyance by the pair of pre-buffer rollers 122, the pair of reversing rollers 124, and the pair of internal ejection rollers 126 (the speed of conveyance after the acceleration) will be denoted as V2.

Figure 4A:
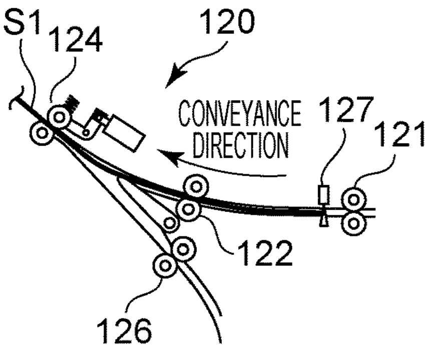
FIGS. 4A to 4H are a set of diagrams illustrating operation of the buffer unit according to the first embodiment.

As illustrated in FIG. 4A, after the passing of the trailing edge of the sheet S1, which is the preceding one, through the gateway sensor 127, the speed of conveyance of the sheet S1 by the pair of pre-buffer rollers 122 and the pair of reversing rollers 124 is increased from V1 to V2. Because of this acceleration, the interval of conveyance between the sheet S1 and the sheet S2, which is the succeeding one, widens. This makes it possible for the pair of reversing rollers 124 to perform a switchback of the sheet S1 without a collision of the sheet S2 with the sheet S1.

Figure 4B:
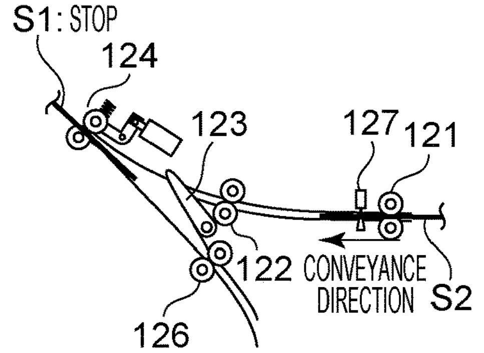

As illustrated in FIG. 4B, after the trailing edge of the sheet S1 leaves the non-return valve 123, the conveyance by the pair of reversing rollers 124 is temporarily stopped.

Figure 4C:
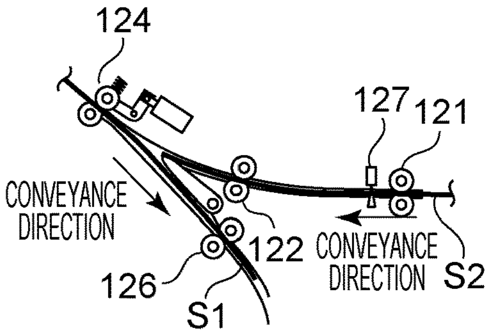

As illustrated in FIG. 4C, the pair of reversing rollers 124 changes its direction of rotation and then conveys the sheet S1 toward the pair of internal ejection rollers 126.

Figure 4D:
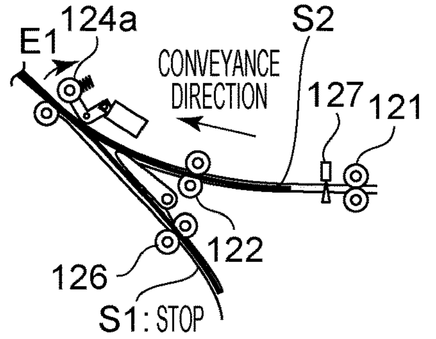

As illustrated in FIG. 4D, the conveyance of the sheet S1 by the pair of reversing rollers 124 and the pair of internal ejection rollers 126 is stopped at a position where the leading edge of the sheet S1 is located beyond the pair of internal ejection rollers 126 by a predetermined amount of conveyance after passing therethrough. In addition, after the sheet S1 is nipped by the pair of internal ejection rollers 126, the upper reversing roller 124*a* moves in the E1 direction. This puts the pair of reversing rollers 124 into a separated state, in which the sheet S2, the succeeding one, is receivable. After the separating operation of the upper reversing roller 124*a*, the sheet S2, the succeeding one, is conveyed to the pair of reversing rollers 124.

Figure 4E:
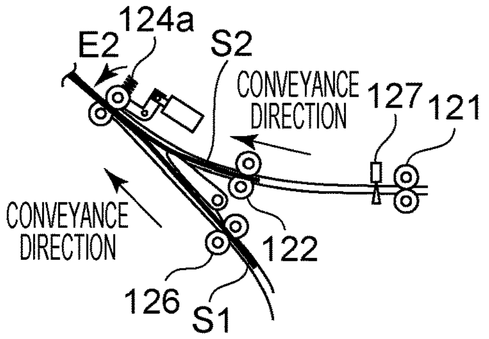

As illustrated in FIG. 4E, after the passing of the trailing edge of the sheet S2, the succeeding one, through the gateway sensor 127, the speed of conveyance of the sheet S2 is increased from V1 to V2, similarly to the sheet S1. At a timing when the sheet S2 arrives at a predetermined target position, the pair of internal ejection rollers 126 conveys the sheet S1 toward the pair of reversing rollers 124. At a timing when the speed of conveyance of the sheet S1 and the speed of conveyance of the sheet S2 become substantially equal to each other (i.e., when a speed difference therebetween becomes substantially zero), the upper reversing roller 124*a* moves in the E2 direction to bring the pair of reversing rollers 124 into a contact state. The pair of reversing rollers 124, when brought into a contact state, nips the sheet S1 and the sheet S2 simultaneously. The pair of reversing rollers 124 undergoes a speed adjustment in such a way as to achieve equality in the speed of conveyance of the sheet S1, S2 no later than switching to a contact state from a separated state.

Figure 4F:
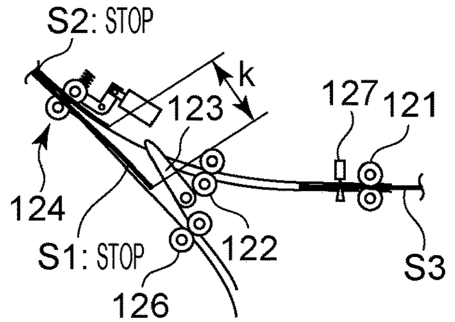

As illustrated in FIG. 4F, after the trailing edge of the sheet S2 leaves the non-return valve 123, the pair of reversing rollers 124 is put into a temporarily-stopped state again. The target position mentioned above is set such that, at this time, the sheet S1 protrudes by a predetermined amount k with respect to the sheet S2 in a direction of conveyance from the pair of internal ejection rollers 126 toward the alignment unit 156. In other words, among the sheets having been put one on top of another at the buffer unit 120, the sheet S1, which is to be the lower one in the stack when located at the alignment unit 156, protrudes downstream in the direction of conveyance toward the alignment unit 156, as compared with the sheet S2, which is to be the upper one in the stack when located at the alignment unit 156.

Figure 4G:
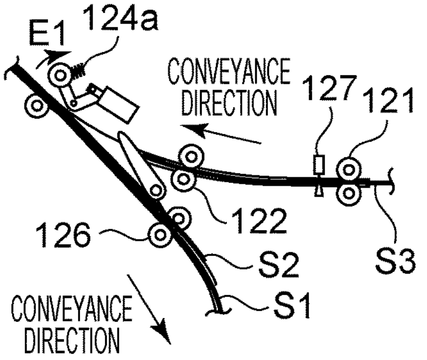

As illustrated in FIG. 4G, the pair of reversing rollers 124 changes its direction of rotation and then conveys the sheet S1 and the sheet S2 toward the pair of internal ejection rollers 126. The sheet S1 and the sheet S2 are conveyed by the pair of internal ejection rollers 126 toward the alignment unit 156. After the sheet S1 and the sheet S2 are nipped by the pair of internal ejection rollers 126, the upper reversing roller 124*a* moves in the E1 direction. This puts the pair of reversing rollers 124 into a separated state, in which the sheet S3, the succeeding one, is receivable.

Figure 4H:
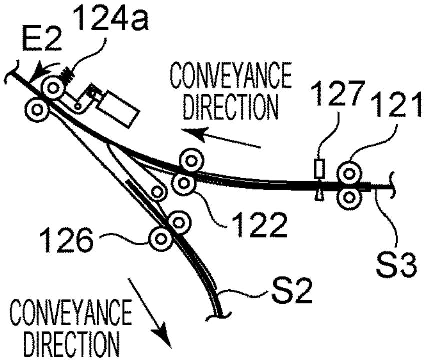

As illustrated in FIG. 4H, after the trailing edge of the sheet S2 leaves the pair of reversing rollers 124, the upper reversing roller 124*a* moves in the E2 direction. This puts the pair of reversing rollers 124 into a contact state for nipping and conveying the sheet S3.

By repeating the buffer operation described above, the buffer unit 120 is capable of sending a predetermined number of sheets each time in a state of being put one on top of another to the alignment unit 156. Though two-ply buffer operation of putting one sheet on top of another sheet has been taken as an example above, it is possible to further put the sheet S3 on top of the sheets S1 and S2 by temporarily stopping the conveyance of the sheets S1 and S2 from the state illustrated in FIG. 4G and conveying them in the reverse direction. That is, by repeating the operation from FIGS. 4D to 4G, the buffer unit 120 is capable of creating a sheet stack made up of three or more sheets (for example, five sheets) put one on top of another.

The target position of putting sheets one on top of another is determined on the basis of the timing of detecting the trailing edge of the sheet by the gateway sensor 127. For this reason, even when the length of the sheet in the direction of conveyance changes, the buffer operation according to the present embodiment makes it possible to put the sheets one on top of another in a state of being shifted by a predetermined amount k each. The stack of the sheets having been put one on top of another at the buffer unit 120 is, as illustrated in FIG. 1, conveyed from the pair of internal ejection rollers 126 along an incoming conveyance path 202 through a pair of intermediate conveyance rollers 128 to a conveyance roller 129. The conveyance roller 129 and the alignment unit 156 are in such a positional relationship that, upon the passing of the trailing edge of a sheet through the conveyance roller 129, the sheet is stacked on the alignment unit 156. In FIG. 1, the conveyance roller 129 and the alignment unit 156 are located at mutually-overlapping positions in the conveyance direction of the sheet conveyance path when viewed in the axial direction of the conveyance roller 129; however, the conveyance roller 129 and the alignment unit 156 may be located at mutually-non-overlapping positions in the conveyance direction of the sheet conveyance path as long as the entrance to the alignment unit 156 is located adjacent to the conveyance roller 129. For the purpose of avoiding interference between the trailing edge of already-stacked sheets on the alignment unit 156 and the leading edge of a succeeding sheet coming in to the alignment unit 156, a stack holder flag 150 configured to suppress a rise curl at the trailing edge of the already-stacked sheets is disposed downstream of the conveyance roller 129.

Configuration of Alignment Unit

Figure 5:
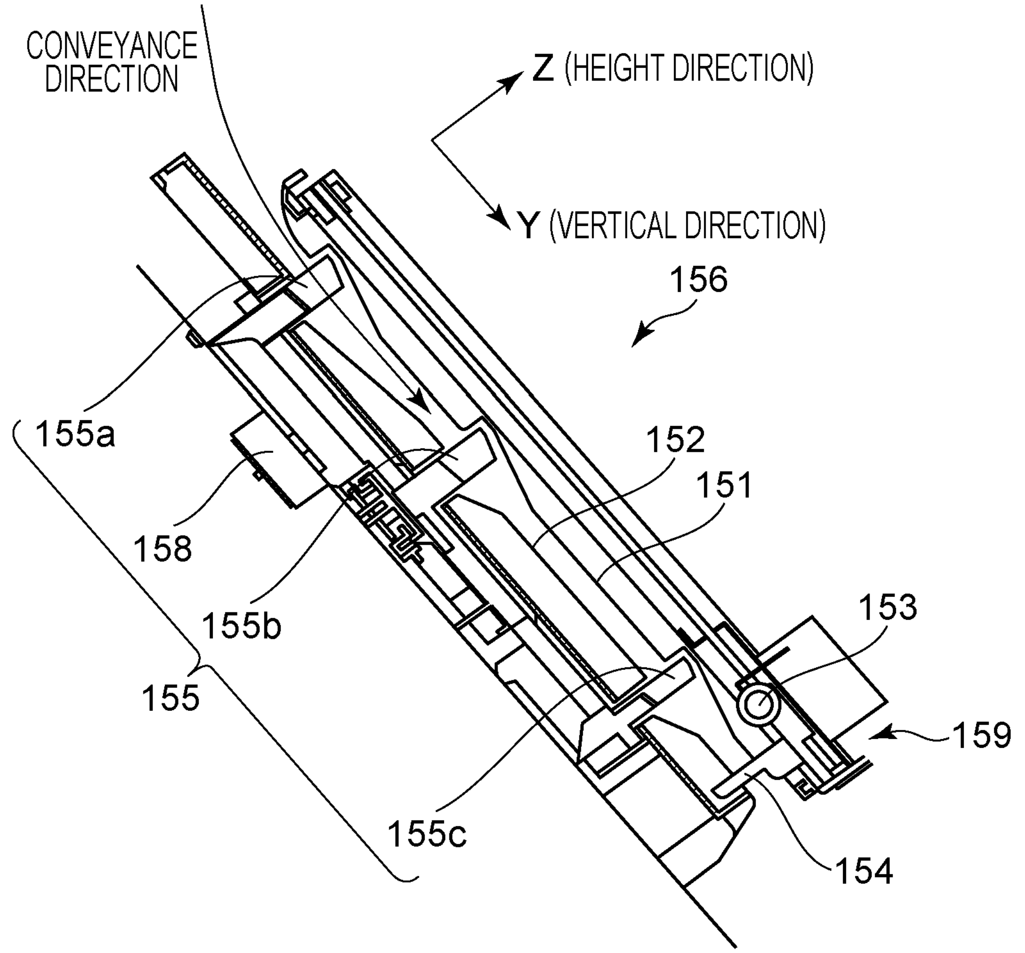
FIG. 5 is a diagram illustrating an alignment unit of the sheet processing apparatus according to the first embodiment.
Figure 6:
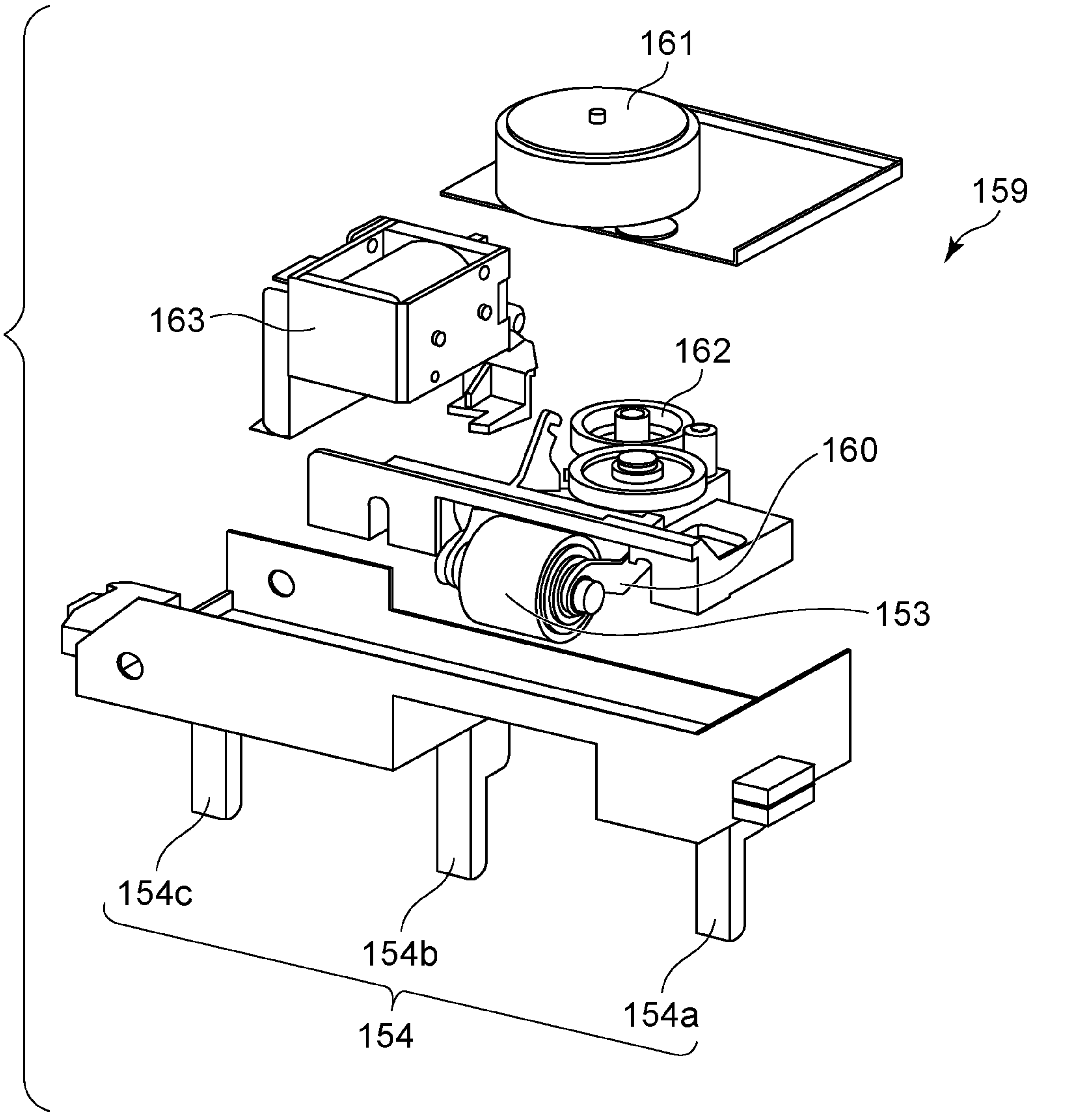
FIG. 6 is a diagram illustrating a movable unit of the alignment unit according to the first embodiment.

Next, with reference to FIGS. 5 and 6, a configuration of the alignment unit 156 will now be described. FIG. 5 is a cross-sectional view of the alignment unit 156. FIG. 6 is an exploded view of elements that constitute a moving unit 159. In the description below and in each of the drawings, a direction in which a pressing member of the thermal compression bonding unit 167 moves with respect to a receiving member for the purpose of applying pressure to a stack of sheets will be referred to as "Z direction". The Z direction is a height direction (thickness direction) of a stack of sheets on the alignment unit 156. Directions that are orthogonal to each other in a virtual plane orthogonal to the Z direction are defined as an X direction and a Y direction. Where necessary, directions indicated by arrows X, Y, and Z in each of the drawings will be referred to as "+X side", "+Y side", and "+Z side" respectively, and their opposite directions will be referred to as "−X side", "−Y side", and "−Z side" respectively.

In the present embodiment, the Y direction is substantially parallel to a conveyance direction in which a sheet is conveyed to the alignment unit 156 by the conveyance roller 129. In the present embodiment, the X direction is a sheet width direction orthogonal to the conveyance direction. In the description below, the Y direction may be referred to as "vertical direction", and the X direction may be referred to as "width direction" or "horizontal direction". The alignment unit 156 includes a lower intermediate guide 152 functioning as an example of a stacking portion configured to support a stack of sheets, an upper intermediate guide 151 facing the lower intermediate guide 152, and a moving unit 159 including a vertical alignment reference plate 154 and a vertical alignment roller 153.

As illustrated in FIG. 6, the vertical alignment reference plate 154 includes a plurality of sheet contact portions 154*a*, 154*b*, and 154*c* arranged next to each other in the sheet width direction, and functions as an example of a restriction member configured to restrict sheet movement due to contact of the leading edge of a sheet therewith. The sheet contact portions 154*a*, 154*b*, and 154*c* define a reference position for sheet alignment in the sheet conveyance direction (Y direction). The vertical alignment roller 153 is held rotatably by a roller holder 160. The roller holder 160 is pivotable by receiving a driving force of a solenoid 163. Due to the pivotal motion of the roller holder 160, the vertical alignment roller 153 is able to move between a position of being in contact with the sheet S on the lower intermediate guide 152 and thus conveying the sheet S and a position of being retracted up away from the sheet S.

A drive motor 161 is mounted on the moving unit 159. The vertical alignment roller 153 rotates when a driving force of the drive motor 161 is transmitted thereto via a gear train 162. The moving unit 159, as a single integrated unit, is capable of moving in the sheet conveyance direction (Y direction) with respect to the lower intermediate guide 152. By this means, it is possible to change the relative position of the sheet S and the thermal compression bonding unit 167 in the sheet conveyance direction (Y direction).

Figure 7A:
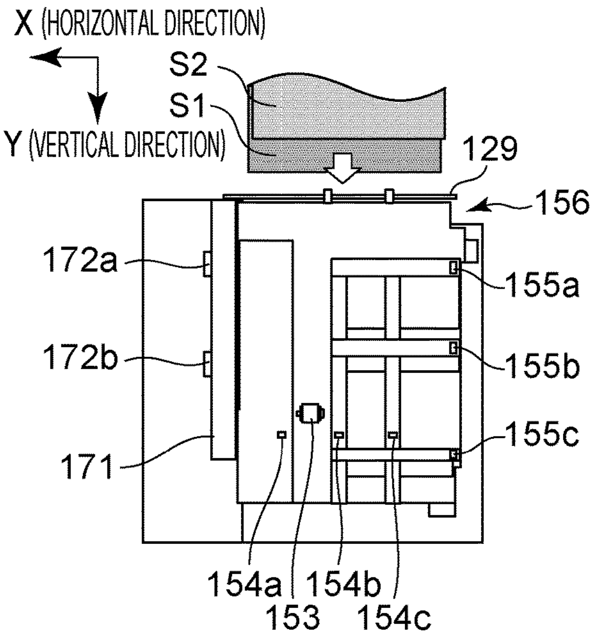
FIGS. 7A to 7D are a set of diagrams illustrating operation of the alignment unit according to the first embodiment.

As illustrated in FIG. 5, the alignment unit 156 includes a width alignment member 155, a drive motor 158, and width alignment reference plates 172*a* and 172*b* (FIG. 7A). By receiving the driving force of the drive motor 158, the width alignment member 155 is movable in the sheet width direction (X direction). The width alignment member 155 includes a plurality of sheet pushing portions 155*a*, 155*b*, and 155*c* arranged next to each other in the sheet conveyance direction. As illustrated in FIG. 7A, the width alignment reference plates 172*a* and 172*b* are configured as a plurality of plate-like members (sheet contact portions) arranged next to each other in the sheet conveyance direction. The width alignment reference plates 172*a* and 172*b* define a reference position for sheet alignment in the sheet width direction (X direction).

Operation of Alignment Unit

With reference to FIGS. 7A to 7D, the operation of the alignment unit 156 will now be described. Taken as an example in the description here is a case where the size of a sheet (for example, A4 size or A5 size is assumed here, but is not limited thereto) is smaller than the size of a pressing plate (plate member) 169 to be described later. Each of FIGS. 7A to 7D is a schematic view of the alignment unit 156 as viewed from above in the Z direction. The illustration of the upper intermediate guide 151 and driving members/components, etc. of the thermal compression bonding unit 167 is omitted.

When alignment of a stack of sheets on the alignment unit 156 is to be performed, the moving unit 159 is positioned to a predetermined standby position in advance in the sheet conveyance direction (Y direction) in accordance with the sheet size. The standby position is a position where the distance from the nip position of the conveyance roller 129 to the sheet contact portions 154*a* to 154*c* of the vertical alignment reference plate 154 in the Y direction is slightly greater than the sheet length.

The operation of the alignment unit 156 will be described below based on a case where an incoming sheet stack is made up of five sheets S1 to S5 having been put one on top of another at the buffer unit 120. The number of the sheets put one on top of another at the buffer unit 120 is not limited to five but may be changed to any number.

FIG. 7A illustrates a state in which the sheet S1, which is the first one, and the sheet S2, which is the second one, are being conveyed toward the alignment unit 156. The moving unit 159 (the vertical alignment reference plate 154 and the vertical alignment roller 153) have already moved to the standby position in accordance with the sheet size. The width alignment member 155 is waiting at a position located slightly outward of and away from a sheet-stack-side-edge position so as not to be obstructive to the conveyance of the sheet stack. When the sheet stack passes through the conveyance roller 129, it is preferable if the position of the center of the sheet stack in the X direction lies at substantially a middle position between a heating member 171 and the width alignment member 155 in the X direction, but is not limited thereto.

Figure 7B:
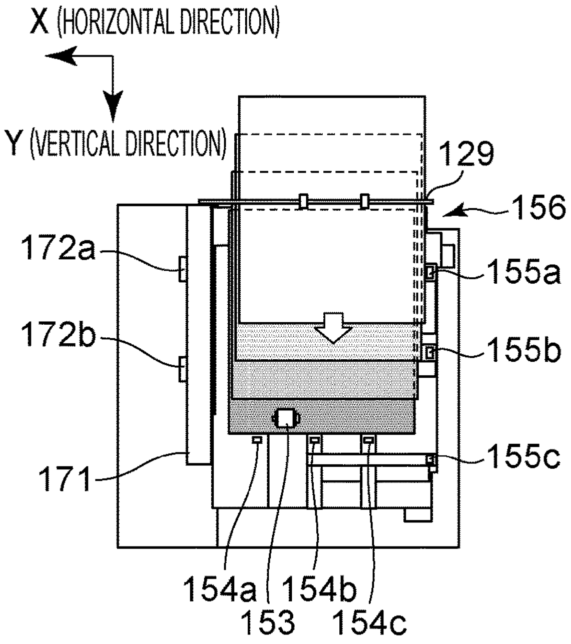

FIG. 7B illustrates a state in which the trailing edge of the sheet S1, the first one, has left the nip of the conveyance roller 129, and the leading edge of the sheet S1 has arrived at the vertical alignment roller 153. The vertical alignment roller 153 has been lowered to a contact position in advance due to electric energization to the solenoid 163 and is being rotated by the drive motor 161. The sheet S1 is transported toward the +Y side by the vertical alignment roller 153 and comes into contact with the vertical alignment reference plate 154, thereby being aligned in the sheet conveyance direction. After that, each time the succeeding sheet S2 to S5 leaves the conveyance roller 129, the sheet is transported toward the +Y side by the vertical alignment roller 153 and is brought into contact with the vertical alignment reference plate 154, thereby being aligned in the sheet conveyance direction.

Figure 7C:
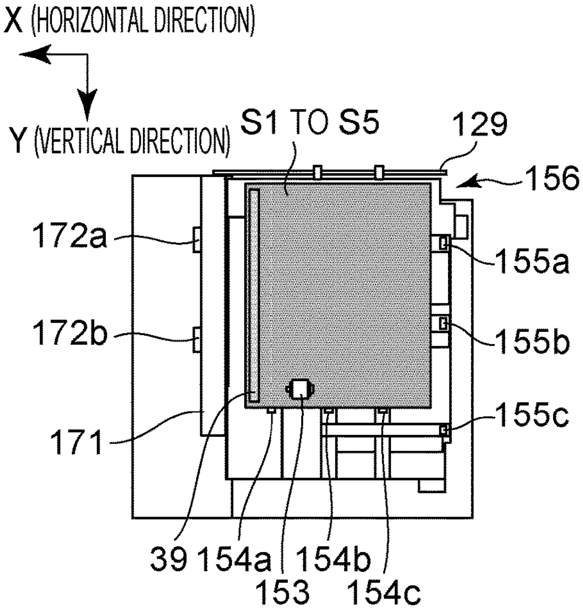

FIG. 7C illustrates a state in which each of the five sheets S1 to S5 has come into contact with the vertical alignment reference plate 154, and the alignment of them in the sheet conveyance direction has completed. In this state, by supplying the driving force of the drive motor 158 (FIG. 5), the width alignment member 155 is moved in the sheet width direction (+X direction). Sheet pushing portions 155*a*, 155*b*, and 155*c* of the width alignment member 155 push one side edge of the sheets S1 to S5, and, due to this pushing, the sheets S1 to S5 move toward the width alignment reference plates 172*a* and 172*b*.

Figure 7D:
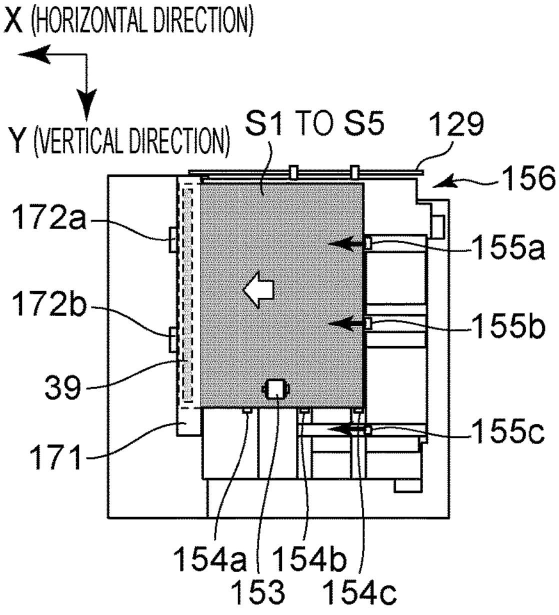

FIG. 7D illustrates a state in which the other side edge of each of the sheets S1 to S5 has come into contact with the width alignment reference plates 172*a* and 172*b*. The sheets S1 to S5 become aligned in the sheet width direction due to this side-edge contact. After this alignment, thermal compression bonding is performed on the five sheets S1 to S5 by the heating member 171 to be described later. In a case where a booklet made up of six or more sheets is to be created, the alignment unit 156 performs preparation to be ready for accepting the sixth sheet (and subsequent sheets), concurrently with the thermal compression bonding of the sheets S1 to S5. Specifically, the width alignment member 155 moves in the retracting direction (toward the −X side).

Thermal Compression Bonding Portion

Figure 8:
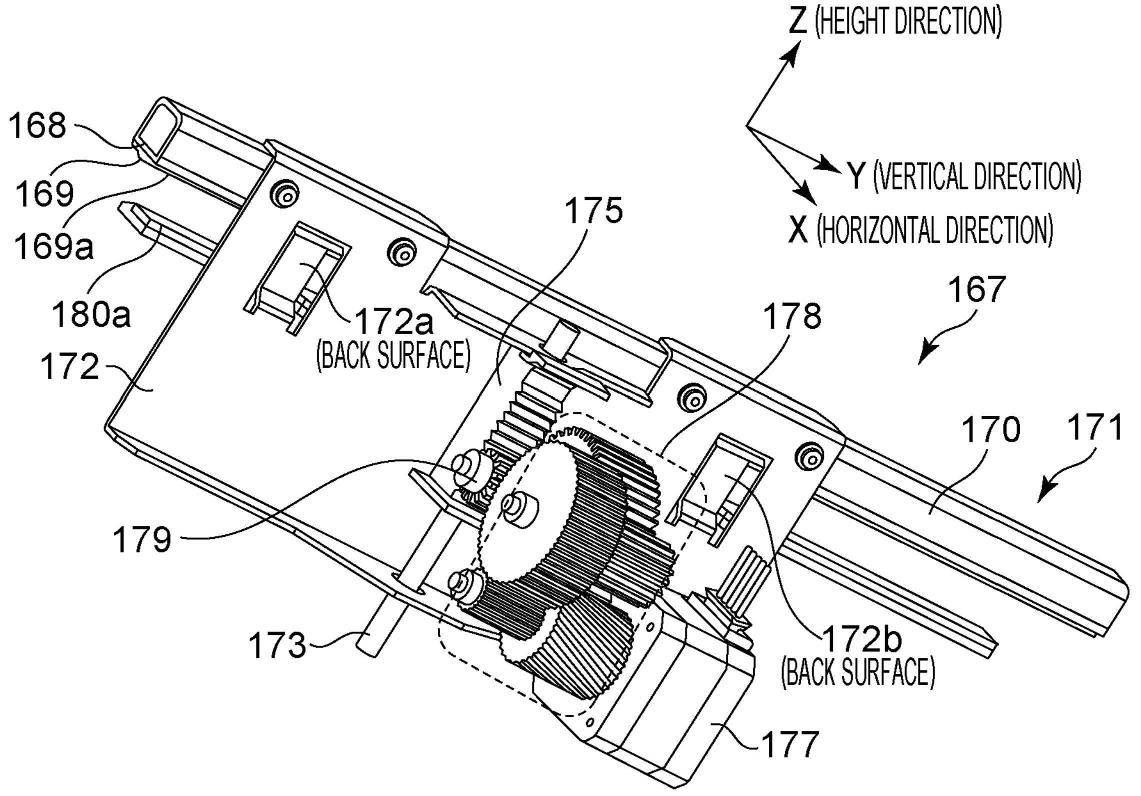
FIG. 8 is a diagram for explaining a thermal compression bonding portion according to the first embodiment.

With reference to FIG. 8, a configuration of the thermal compression bonding unit 167 according to the present embodiment will now be described. FIG. 8 is a perspective view of the thermal compression bonding unit 167. The thermal compression bonding unit 167 is an example of a sheet adhesive bonding apparatus (an adhesive bonding unit, an adhesive bonder, a thermal compression bonder, a pasting processor) configured to glue the sheets together. As illustrated in FIG. 8, the thermal compression bonding unit 167 includes the heating member 171 including the pressing plate 169, a cradle plate 180 (sheet cradle member) facing the pressing plate 169, and a drive system including a motor 177. The cradle plate 180 is made of an elastic material (elastomer), for example, a silicone rubber. The cradle plate 180 is an example of a receiving member configured to receive a pressing force of a pressing member. The cradle plate 180 has an elongated plate-like shape having a thickness in the Z direction and being long in the Y direction. The cradle plate 180 has a contact surface 180*a* configured to be in contact with the lower surface of a stack of sheets. The contact surface 180*a* according to the present embodiment is a planar (flat) surface extending substantially perpendicularly to the Z direction.

The heating member 171 includes the pressing plate 169, a heater 168, and a metal stay 170. The pressing plate 169 is an example of a pressing member configured to apply pressure to a stack of sheets that is the target of adhesive bonding. The heater 168 is an example of a heating component configured to heat the pressing member. The pressing plate 169 has an elongated plate-like shape having a thickness in the Z direction and being long in the Y direction. The pressing plate 169 is made of, for example, aluminum. The thermal compression bonding unit 167 is capable of performing thermal compression bonding of a stack of sheets on the alignment unit 156 along one side extending in the Y direction by using the pressing plate 169 extending in the Y direction. The alignment unit 156 and the thermal compression bonding unit 167 according to the present embodiment are capable of performing so-called longer-side adhesive bonding, in which sheets having a size of A4 or the like are aligned in an orientation in which their longer side is parallel to the sheet conveyance direction (longer-side-feed orientation) and then are bonded using thermal compression bonding at an adhesive bonding area (FIG. 2) that is along the longer side. Adhesive bonding other than the longer-side adhesive bonding may be performed by altering the shape of the pressing plate 169 and the cradle plate 180, the arrangement of the thermal compression bonding unit 167, and/or the like. For example, the apparatus may be altered to bond the sheets at a corner.

The pressing plate 169 has a contact surface 169*a* configured to be in contact with the upper surface of a stack of sheets. The contact surface 169*a* according to the present embodiment includes a ridge portion (FIG. 9A) having a cross-sectional shape of protruding in a pressing direction (toward the −Z side) at its center portion in the X direction and extending in the Y direction. The heater 168 is a ceramic heater in which a pattern of a heat generation resistor is formed on a substrate made of ceramic. The heater 168 is disposed in contact with the pressing plate 169. The pressing plate 169 and the heater 168 are supported by the metal stay 170. A lift plate 172 is fixed to the metal stay 170 of the heating member 171.

The lift plate 172 moves integrally with the heating member 171. In the present embodiment, the width alignment reference plates 172*a* and 172*b* mentioned earlier are formed integrally with the lift plate 172 by bending a part of a metal member of which the lift plate 172 is made.

The heating member 171 includes a temperature detector such as a thermistor configured to detect a temperature of the heater 168. A control unit of the sheet processing apparatus 106 controls a surface temperature of the pressing plate 169 to a predetermined temperature that is suited for thermal compression bonding by controlling power supply to the heater 168 in accordance with the detection result of the temperature detector.

The drive system of the thermal compression bonding unit 167 includes the motor 177 operating as a drive source, a gear train 178, a pinion gear 179, and a rack gear 175.

The gear train 178, the pinion gear 179, and the rack gear 175 operate as an example of a drive transmission mechanism configured to transform the rotation of the motor 177 into a force in a direction in which the heating member 171 moves (Z direction) and transmit the force to the heating member 171. The pinion gear 179 is connected indirectly to the motor 177, with the gear train 178 interposed therebetween. The pinion gear 179 is in mesh with the rack gear 175. The gear train 178, the pinion gear 179, and the rack gear 175 constitute a speed reduction mechanism for obtaining a pressing force required for thermal compression bonding of a stack of sheets. As the speed reduction mechanism, for example, a worm gear or a planetary gear mechanism may be used. Guided by a guide shaft 173 having a columnar shape and extending in the Z direction, the rack gear 175 reciprocates in the Z direction. The guide shaft 173 is fixed to a frame body of the thermal compression bonding unit 167. The movement of the heating member 171 up and down is driven by the motor 177. Since the pinion gear 179 is in mesh with the rack gear 175, the rotation of the motor 177 is transmitted to the rack gear 175 via a non-illustrated motor gear and the gear train 178.

When the thermal compression bonding unit 167 performs thermal compression bonding of a stack of sheets, the rack gear 175 moves in the pressing direction (toward the −Z side) due to the driving force transmitted from the motor 177. Accordingly, the lift plate 172 and the heating member 171 move in the pressing direction (toward the −Z side), and the pressing plate 169 comes into contact with the sheet stack. The thermal compression bonding unit 167 moves away from the sheet stack after applying pressure thereto.

Operation of Thermal Compression Bonding Portion

With reference to FIGS. 9A to 9F, the thermal compression bonding operation of the thermal compression bonding unit 167 will now be described. Each of FIGS. 9A to 9F is a view of the thermal compression bonding unit 167 in the sheet conveyance direction (Y direction).

Figures 9A, 9B, 9C, 9D, 9E, 9F:
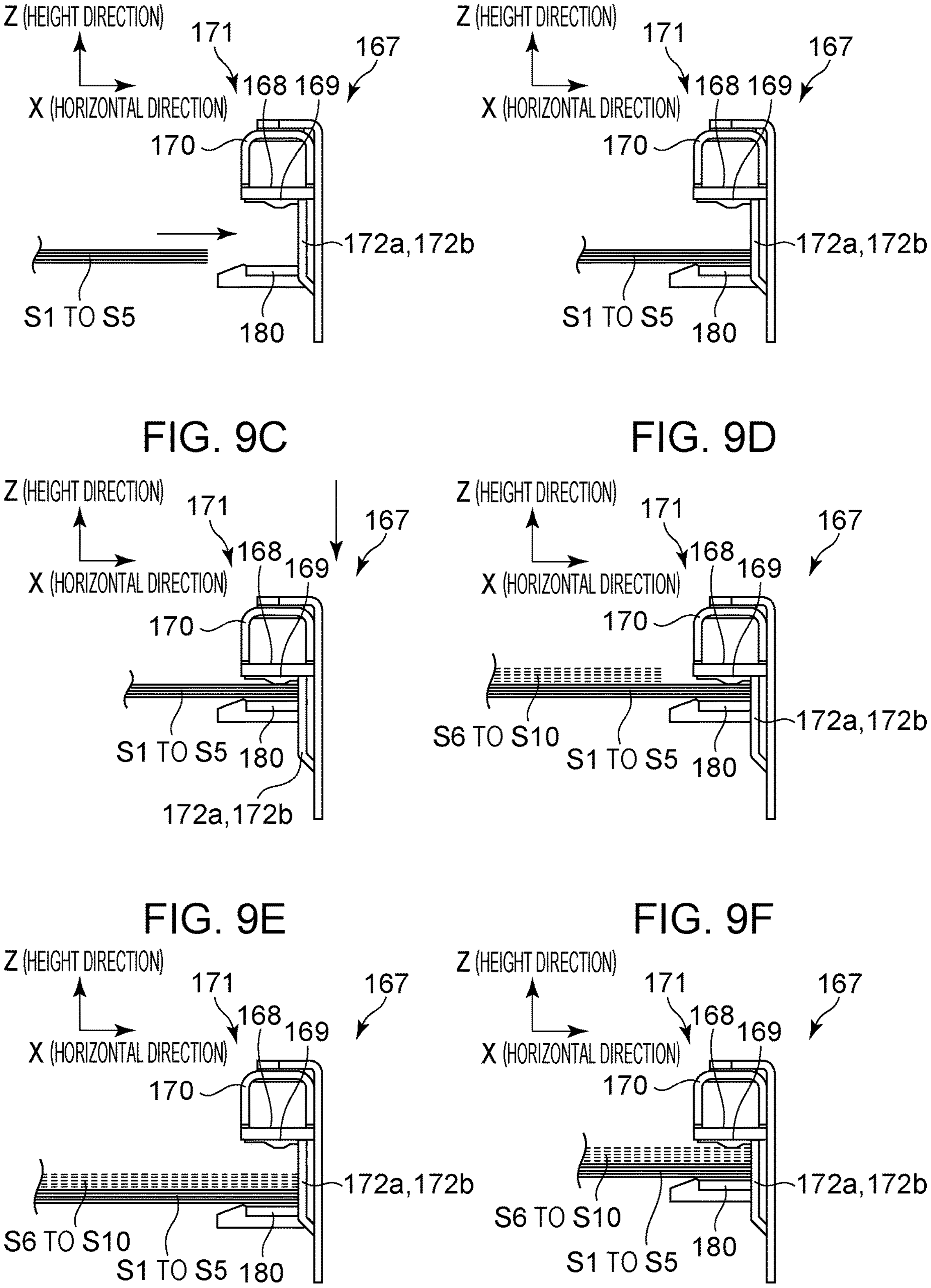
FIGS. 9A to 9F are a set of diagrams illustrating operation of the thermal compression bonding portion according to the first embodiment.

FIG. 9A illustrates the same state as that of FIG. 7C, that is, a state in which the alignment of the sheets S1 to S5 in the sheet conveyance direction (Y direction) has completed. In this state, the heating member 171 is located away from the sheet stack in the Z direction.

FIG. 9B illustrates the same state as that of FIG. 7D, that is, a state in which the alignment of the sheets S1 to S5 in the width direction has completed. By being brought into contact with the width alignment reference plates 172*a* and 172*b*, the sheets S1 to S5 are aligned in the sheet width direction (X direction).

FIG. 9C illustrates a state in which, due to forward rotation of the motor 177, the heating member 171 has moved in the pressing direction (toward the −Z side) and thus in which the contact surface 169*a* of the pressing plate 169 has come into contact with the sheet S5, which is the topmost one.

FIG. 9D illustrates a state in which, due to continued driving of the motor 177, the sheets S1 to S5 are sandwiched between the pressing plate 169 and the cradle plate 180 and thus in which thermal compression bonding of the sheets S1 to S5 is being performed now. FIG. 9D further illustrates that the next sheets S6 to S10 have come to the alignment unit 156, concurrently with the thermal compression bonding of the sheets S1 to S5.

FIG. 9E illustrates a state in which, after the completion of the thermal compression bonding of the sheets S1 to S5, due to reverse rotation of the motor 177, the heating member 171 has moved (retracted) toward the opposite side in the pressing direction (toward the +Z side) and thus in which the pressing plate 169 has become separated away from the sheet S5. FIG. 9E further illustrates that the alignment of the next sheets S6 to S10 has been performed and, after the retracting movement of the heating member 171, the sheets S6 to S10 have been brought into contact with the width alignment reference plates 172*a* and 172*b*.

FIG. 9F illustrates a state in which, due to forward rotation of the motor 177, the heating member 171 has moved in the pressing direction (toward the −Z side) again, in which the sheets S1 to S10 are sandwiched between the pressing plate 169 and the cradle plate 180, and thus in which thermal compression bonding of the sheets S6 to S10 is being performed now. Since an adhesive-use toner image is formed on the upper surface of the sheet S5 and/or the lower surface of the sheet S6, the sheet stack made up of the sheets S1 to S5, which have already been bonded together, and the sheets S6 to S10 are bonded to each other by using thermal compression bonding.

The thermal compression bonding unit 167 is capable of creating a booklet made up of sheets the number of which is greater than a predetermined number by performing the thermal compression bonding operation once each time a sheet stack made up of the predetermined number of sheets is aligned by the alignment unit 156. Though an example of creating a booklet made up of ten sheets, the sheets S1 to S10, has been described above, it is possible to create a booklet made up of several tens of sheets or more.

After the completion of the thermal compression bonding of all of the sheets that make up a booklet, the booklet made up of the sheets S1 to S10 is pushed out by the vertical alignment reference plate 154 and is conveyed in a direction toward a pair of stack ejection rollers 136 (FIG. 1) regarding the sheet conveyance direction. In other words, the vertical alignment reference plate 154 is an example of a pushing-out member configured to push the sheet stack out of the alignment unit 156 and the thermal compression bonding unit 167. A pushing-out member configured to push out the sheet stack having been processed may be provided separately from the vertical alignment reference plate 154 serving as a reference for alignment of the sheet stack.

The pair of stack ejection rollers 136 is a roller pair whose rollers can be opened and closed (can be brought into contact with and away from each other), and accepts the booklet via an ejection conveyance path 203. After the leading edge of the booklet in the direction of pushing out the booklet by the vertical alignment reference plate 154 goes beyond the position of the pair of stack ejection rollers 136, the movement of the vertical alignment reference plate 154 is stopped, and the pair of stack ejection rollers 136 switches into a contact state. By this means, the pair of stack ejection rollers 136 conveys the booklet while nipping it and ejects it to the lower ejection tray 137. On the other hand, the vertical alignment reference plate 154 returns to the standby position again after transferring the booklet to the pair of stack ejection rollers 136.

Figure 10:
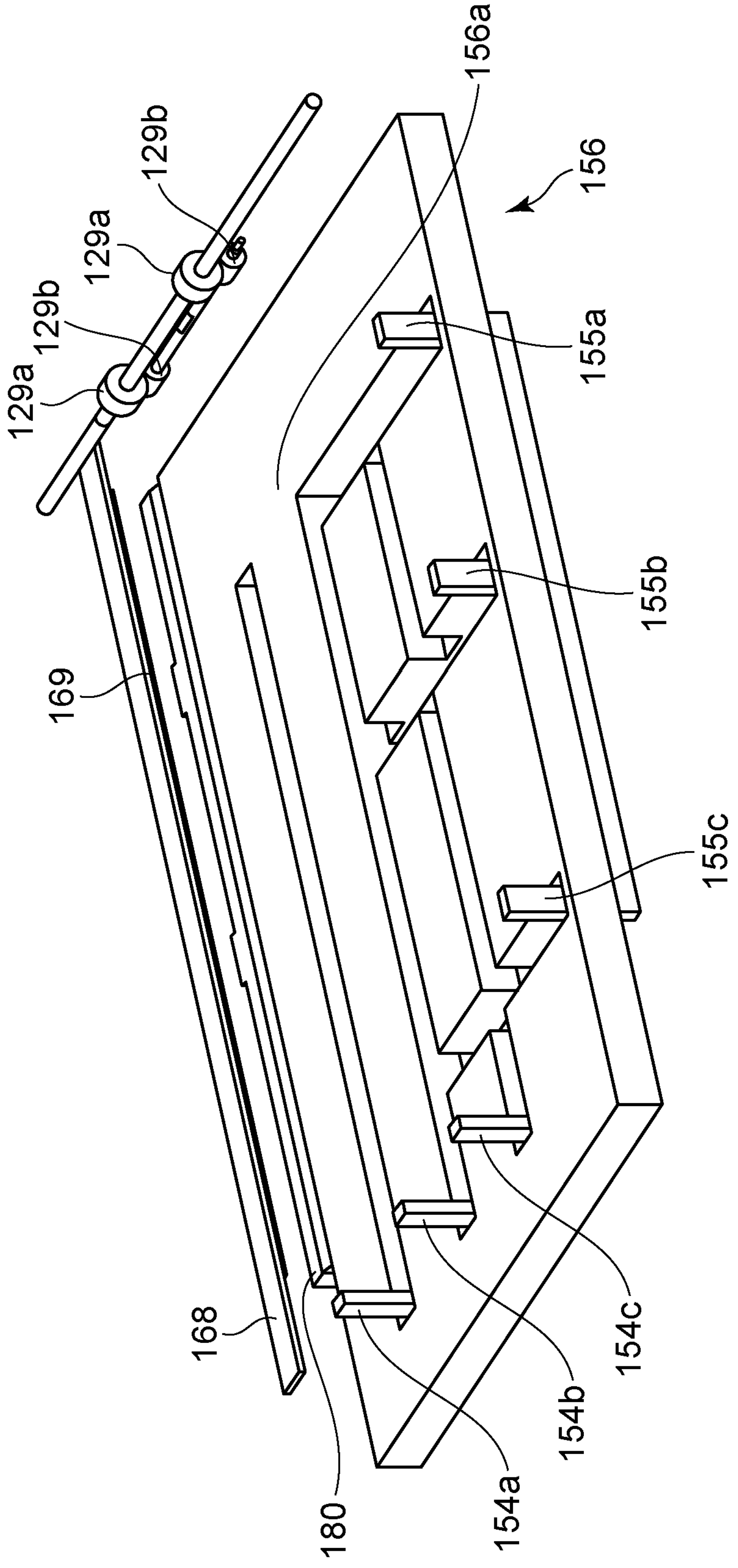
FIG. 10 is a perspective view illustrating a layout of a thermal compression bonding unit and a stacking unit according to the first embodiment.
Figure 11:
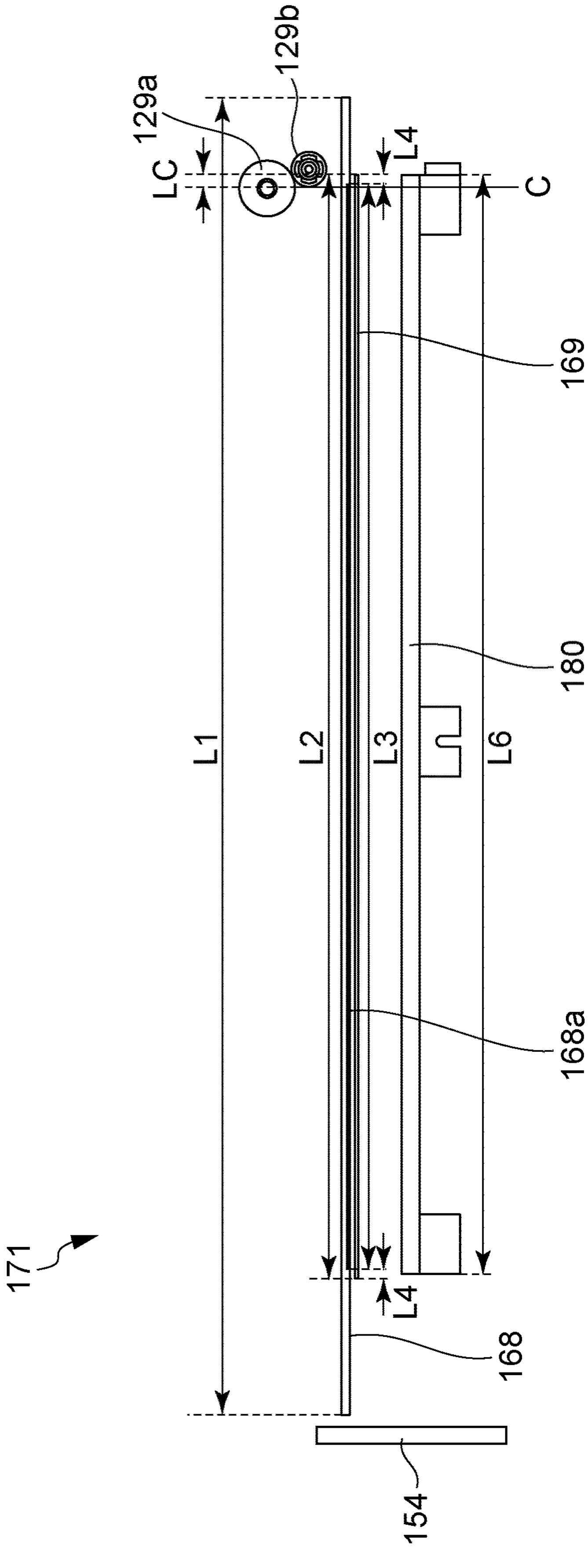
FIG. 11 is a dimension diagram regarding the thermal compression bonding unit according to the first embodiment.
Figure 12:
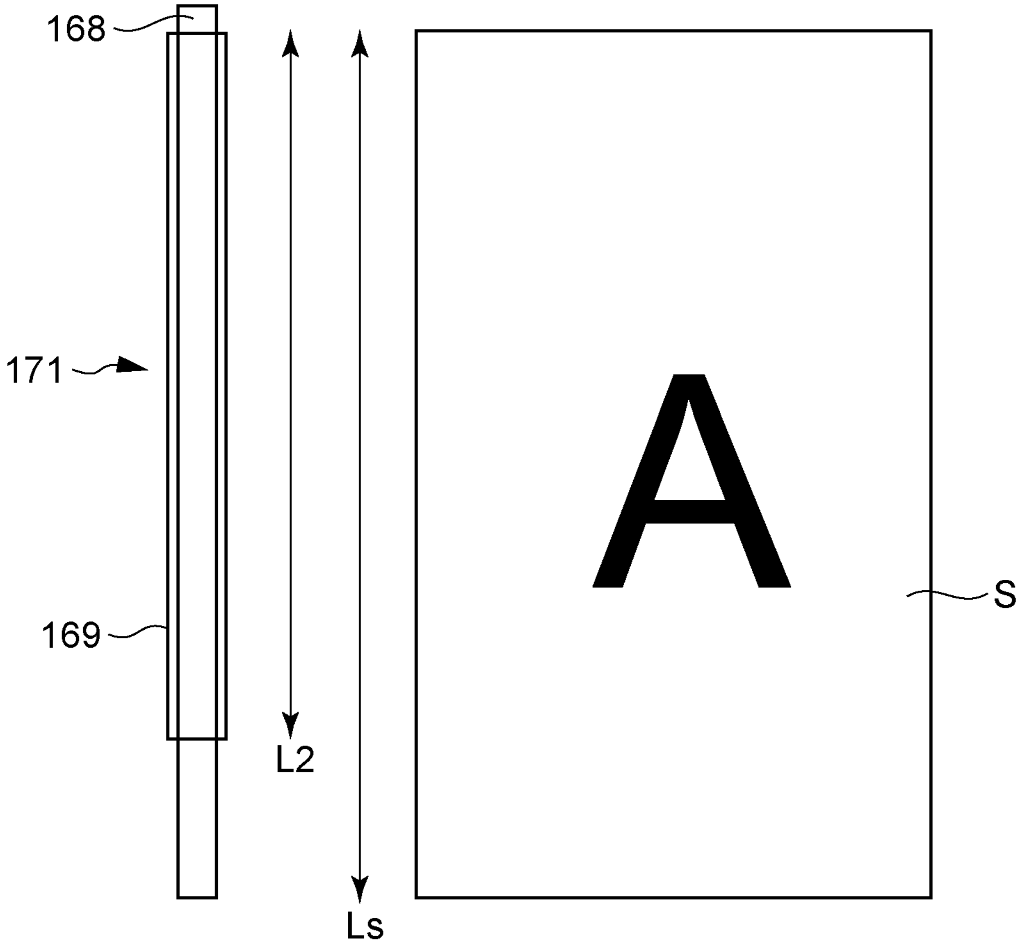
FIG. 12 is a comparative dimension diagram of a sheet and the thermal compression bonding unit according to the first embodiment.

In the present embodiment, a case where the length of a sheet is greater than the length of a heat generation resistor (heat generation area) 168*a* of the heater 168 to be described later is assumed. With reference to FIGS. 10 to 12, a detailed explanation of a structure will be given below. As illustrated in FIG. 10, the heater 168 and the cradle plate 180 are disposed outward of, in the width direction, a stacking surface 156*a* of the alignment unit (stacking unit) 156 on which the sheets S are to be placed and stacked.

A sheet comes in to the alignment unit 156 through a nip between each of two roller pairs of the conveyance roller 129, specifically, each pair made up of a first roller 129*a* and a second roller 129*b*.

A specific example of dimensions of the heating member 171 is illustrated in FIG. 11. The length of the heater 168 is: L1=376.3 mm. The length of the pressing plate 169 is: L2=315 mm. The length of the heat generation resistor (heat generation area) 168*a* formed in the heater 168 configured to give heat to the pressing plate 169 is: L3=311 mm. The heat generation resistor (heat generation area) 168*a* is located inward of each of the two ends of the pressing plate 169 by L4=2 mm each. The length of the cradle plate 180 is: L6=315 mm.

In addition, a reference position C where an incoming sheet enters the alignment unit 156 beyond the second rollers 129*b* of the conveyance roller 129 is shifted toward the vertical alignment reference plate 154 by LC=3.32 mm from the end of the pressing plate 169 in the longer-side direction of the heater 168. The length of a legal-size sheet is 356 mm. The length of an A4-size sheet is 297 mm. Therefore, the length of the heat generation resistor (heat generation area) 168*a* of the heating member 171 according to the present embodiment is greater than the length of an A4-size sheet but is less than the length of a legal-size sheet. The position where a legal-size sheet having come into the alignment unit 156 is restricted by the vertical alignment reference plate 154 is, for example, located slightly downward of one end of the heater 168 in the direction in which the sheet is conveyed to the alignment unit 156.

The structure of the heating member 171 is not limited to a structure including the pressing plate 169. The heating member 171 may apply heat to sheets by using a heater that includes a heat generation resistor, not via a pressing plate. In this case, the substrate of the heater may be made of ceramic as in the present embodiment or may be made of metal.

With reference to FIG. 12, a relationship between the length of the heating member 171 and the length of a legal-size sheet will now be described. The length of a legal-size sheet is 356 mm and is therefore less than the length of the heater 168 according to the present embodiment, which is 376.3 mm. The length of a legal-size sheet is greater than the length of the heat generation resistor (heat generation area) 168*a* according to the present embodiment, which is 311 mm, and the length of the pressing plate 169 according to the present embodiment, which is 315 mm.

In the present embodiment, as illustrated in FIG. 12, the length L2 of the heater portion is less than the maximum sheet length Ls supported by the sheet processing apparatus. In addition, the adhesive-use toner image 39 is arbitrarily selectable within a range Lt that is greater in length than the length L2 of the heater portion. The description of the operation of the alignment unit that has been given so far is based on a case where the sheet length Ls is less than the length L2 of the heater portion and where the adhesive-use toner image 39 on the sheet at the point in time of having come onto the lower intermediate guide 152 overlaps with the heater portion in the Y direction.

Figure 13:
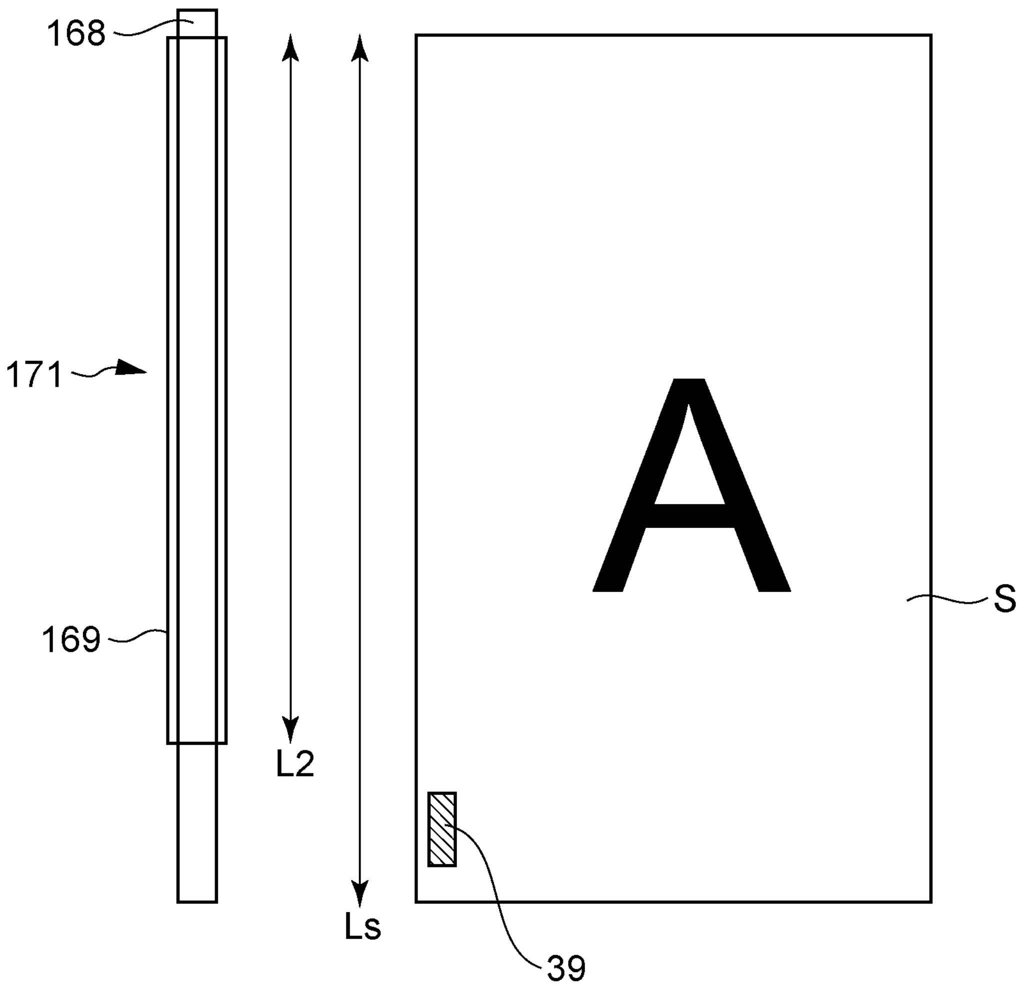
FIG. 13 is a diagram illustrating a length of a heater portion, a maximum sheet length, and a length of a toner layer according to the first embodiment.

Described next below is a case where, as illustrated in FIG. 13, the length of a sheet (for example, a legal-size sheet) is greater than the length L2 of the heater portion and where the adhesive-use toner image 39 on the sheet at the point in time of having come onto the lower intermediate guide 152 does not overlap with the heating member 171 in the Y direction.

Figure 14:
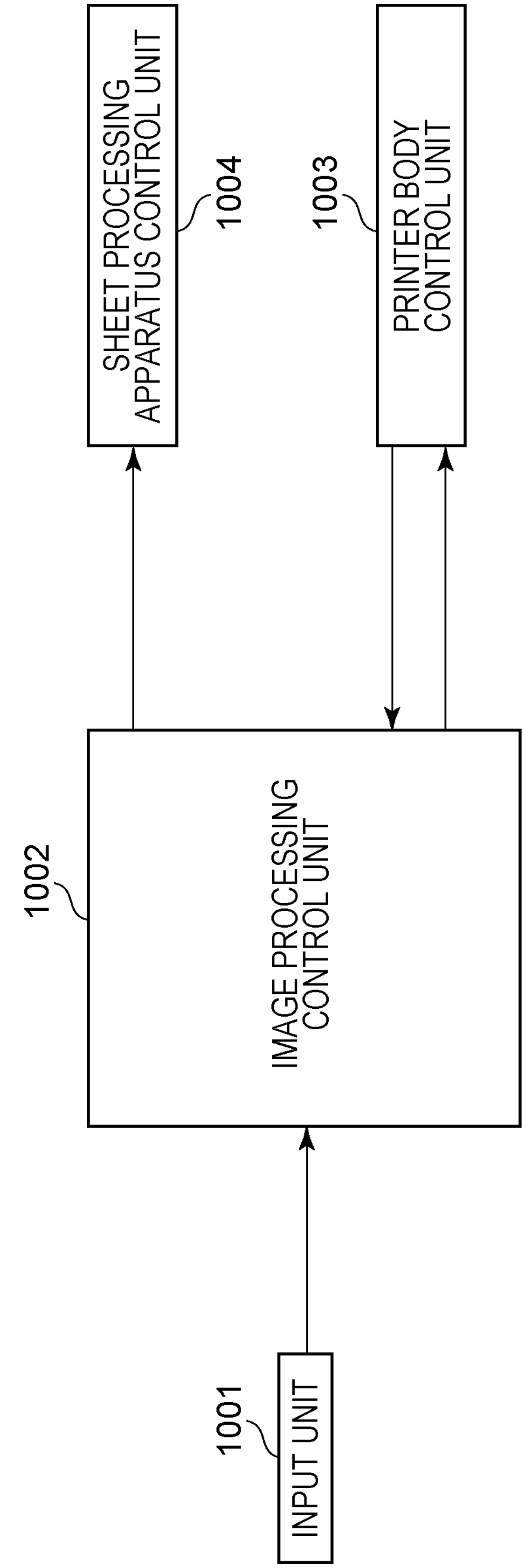
FIG. 14 is a block diagram of a controller of an image forming system according to the first embodiment.

With reference to a block diagram of FIG. 14, control operation of communicating an area where the adhesive-use toner image 39 is formed to the control unit of the sheet processing apparatus 106 will now be described. First, when information about a sheet size, an adhesive bonding area pattern, the number of sheets of a booklet, and the like is inputted to an input unit 1001, the information about them is conveyed to an image processing control unit 1002. With regard to the adhesive bonding area pattern, in the present embodiment, it is assumed that a preset pattern corresponding to the sheet size and corresponding to an adhesive bonding pattern selected by the user has been set in advance. In the present embodiment, a case where the user selects a corner bonding of legal-size sheets is taken as an example. The scope of the present embodiment is not limited to this example. The apparatus may be configured such that the user can set the adhesive bonding area at any position on the sheet. The information about them is further conveyed to a printer body control unit 1003. At the printer body 101, a layer of an adhesive is formed at, on the sheet, a predetermined position corresponding to the sheet size and corresponding to the adhesive bonding area pattern. The sheet size is detected at the printer body control unit 1003, and the detected sheet size is communicated to the image processing control unit 1002 where it is confirmed that the detected sheet size is the same as the sheet size inputted to the input unit 1001. After that, the information about the sheet size and the adhesive bonding area pattern is conveyed to a sheet processing apparatus control unit 1004, and heat and pressure are applied to the layer of the adhesive formed at the predetermined position on the sheet. Though the information about the sheet size and the adhesive bonding area pattern is conveyed to the sheet processing apparatus control unit 1004 from the image processing control unit 1002 in the above configuration, this does not imply any limitation. For example, as a configuration in which the image processing control unit 1002, the printer body control unit 1003, and the sheet processing apparatus control unit 1004 are configured as a single integrated control unit of an image forming system, the information may be conveyed directly from the input unit 1001.

With reference to FIGS. 15A to 15G, operation for alignment and thermal compression bonding of legal-size sheets will now be described. The same description as the foregoing description of a sheet that is shorter than the heater portion will not be repeated.

Alignment Operation and Thermal Compression Bonding Operation: Length L2 of Heater Portion<Sheet Length Ls Each of FIGS. 15A to 15G is a schematic view of the alignment unit 156 as viewed from above in the Z direction. The illustration of the upper intermediate guide 151 and driving members/components, etc. of the thermal compression bonding unit 167 is omitted.

Figure 15A:
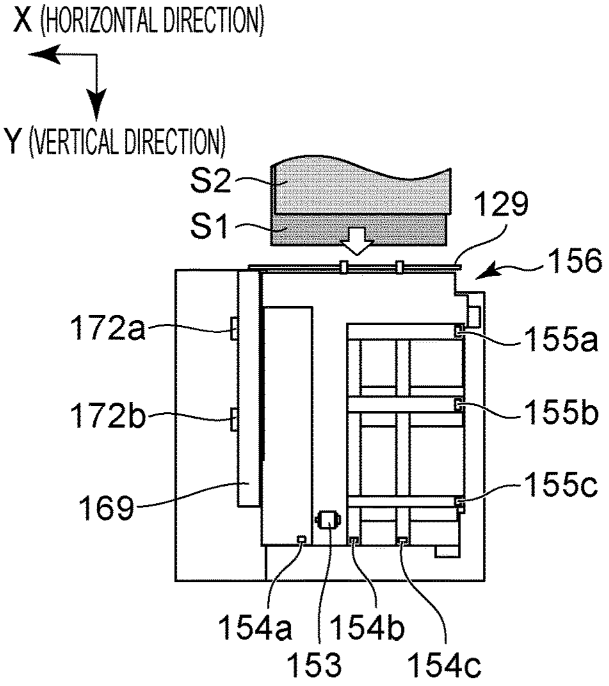
FIGS. 15A to 15G are a set of diagrams illustrating operation of the alignment unit for a sheet that is longer than the heater portion according to the first embodiment.

FIG. 15A illustrates a state in which the sheet S1, which is the first one, and the sheet S2, which is the second one, are being conveyed toward the alignment unit 156. The moving unit 159 (the vertical alignment reference plate 154 and the vertical alignment roller 153) have already moved to the standby position in accordance with the sheet size. The width alignment member 155 is waiting at a position located away in the −X direction from a sheet-stack-side-edge position so as not to be obstructive to the conveyance of the sheet stack.

Figure 15B:
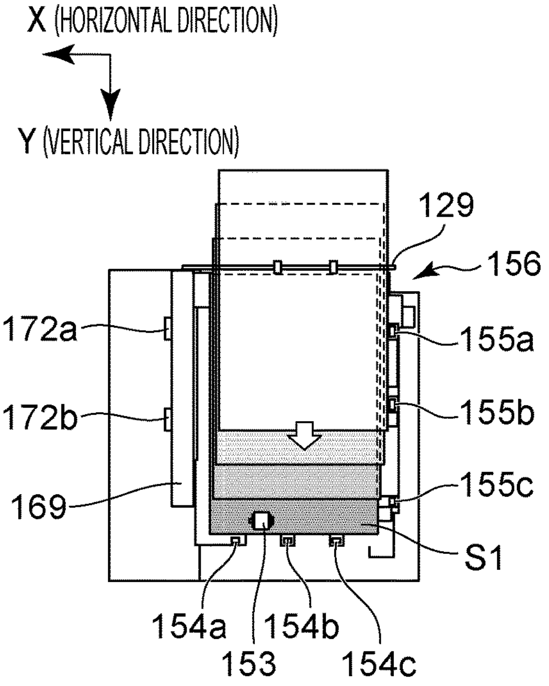

FIG. 15B illustrates a state in which the trailing edge of the sheet S1, the first one, has left the nip of the conveyance roller 129, and the leading edge of the sheet S1 has arrived at the vertical alignment roller 153. The vertical alignment roller 153 has been lowered to a contact position in advance due to electric energization to the solenoid 163 and is being rotated by the drive motor 161.

The sheet S1 is transported toward the +Y side by the vertical alignment roller 153 and comes into contact with the vertical alignment reference plate 154, thereby being aligned in the sheet conveyance direction. After that, each time the succeeding sheet S2 to S5 leaves the conveyance roller 129, the sheet is transported toward the +Y side by the vertical alignment roller 153 and is brought into contact with the vertical alignment reference plate 154, thereby being aligned in the sheet conveyance direction.

Figure 15C:
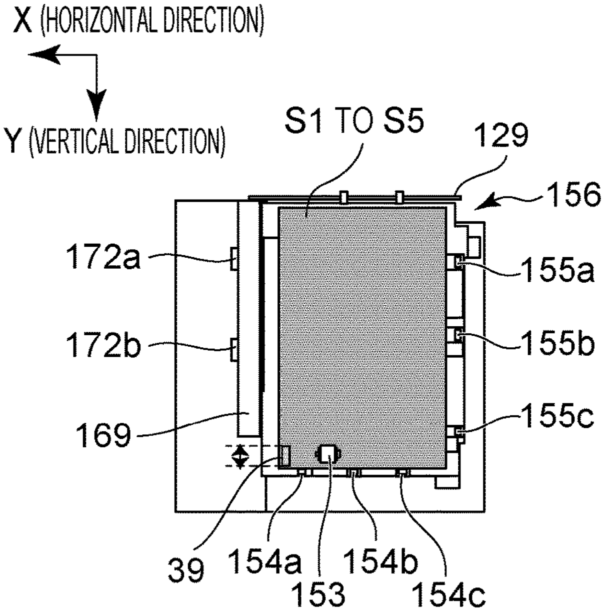

FIG. 15C illustrates a state in which each of the five sheets S1 to S5 has come into contact with the vertical alignment reference plate 154, and the alignment of them in the sheet conveyance direction has completed.

At this point in time, the adhesive-use toner image 39 formed at the lower left corner portion of the sheet does not overlap with the pressing plate 169 in the Y direction.

Figure 15D:
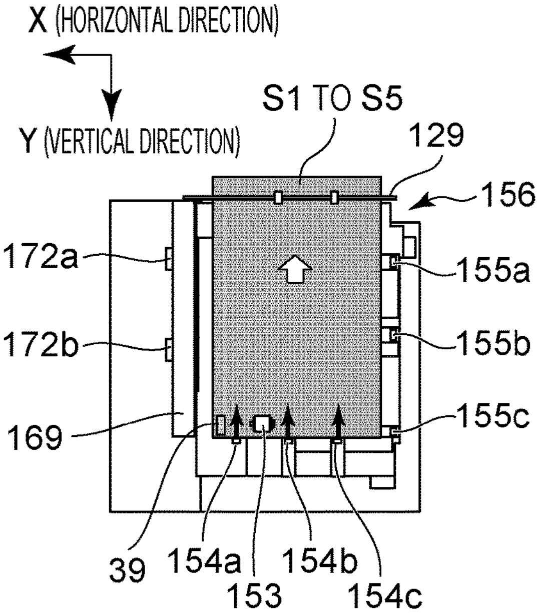

FIG. 15D illustrates a state in which the sheets S1 to S5 have been moved in the −Y direction (the direction going toward the upstream side regarding the direction in which the sheet comes into the alignment unit 156) by being pushed by the sheet contact portions 154*a*, 154*b*, and 154*c*. This operation brings the adhesive-use toner image 39 selected to be at the lower left corner portion of the sheet to a position where it overlaps with the pressing plate 169 in the Y direction.

Even in a case where the sheet length Ls is greater than the length L2 of the heater portion, if the adhesive-use toner image 39 already overlaps with the heating member 171 in the Y direction in the state illustrated in FIG. 15C, the movement in the −Y direction illustrated in FIG. 15D is unnecessary.

Figure 15E:
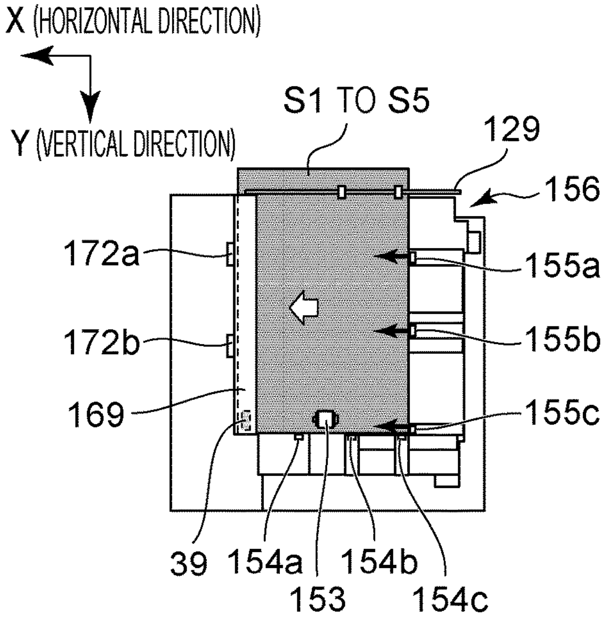

FIG. 15E illustrates a state in which the sheets S1 to S5 have been moved in the +X direction by being pushed by the sheet pushing portions 155*a*, 155*b*, and 155*c* of the width alignment member 155. This operation brings the side edge of each of the sheets S1 to S5 into contact with the width alignment reference plates 172*a* and 172*b*, resulting in alignment in the sheet width direction.

Figure 15F:
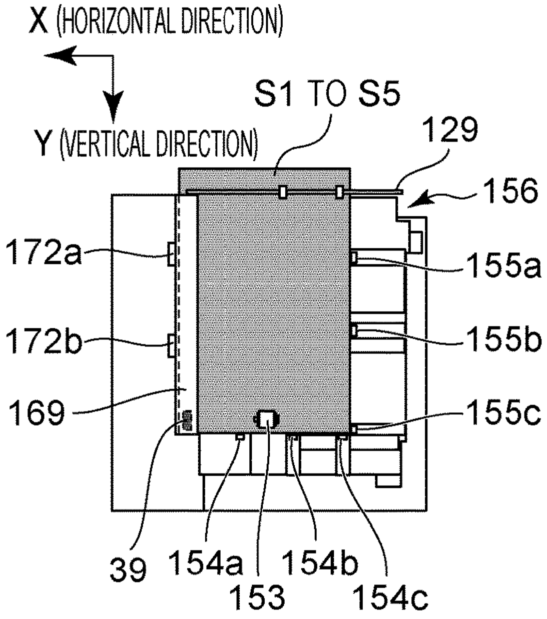

FIG. 15F illustrates a state in which thermal compression bonding has been performed on the aligned sheets S1 to S5 by the heating member 171.

Figure 15G:
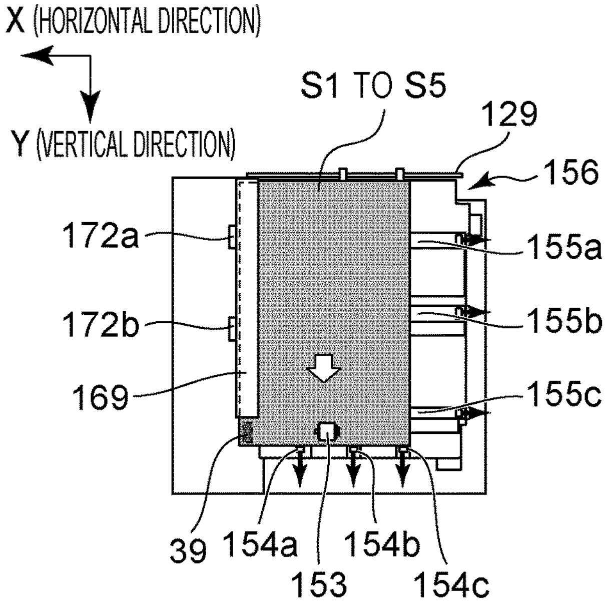

FIG. 15G illustrates a state in which, in order to be ready for accepting the sixth and subsequent sheets, the width alignment member 155 has moved in the retracting direction (toward the −X side) and in which the vertical alignment reference plate 154 and the vertical alignment roller 153 have moved to the standby position in accordance with the sheet size. At this time, the sheets S1 to S5 after the thermal compression bonding are aligned in the sheet conveyance direction by being conveyed toward the +Y side and being brought into contact with the vertical alignment reference plate 154 by the vertical alignment roller 153 while being kept at the position of being in contact with the width alignment reference plates 172*a* and 172*b* in the X direction.

Figure 16:
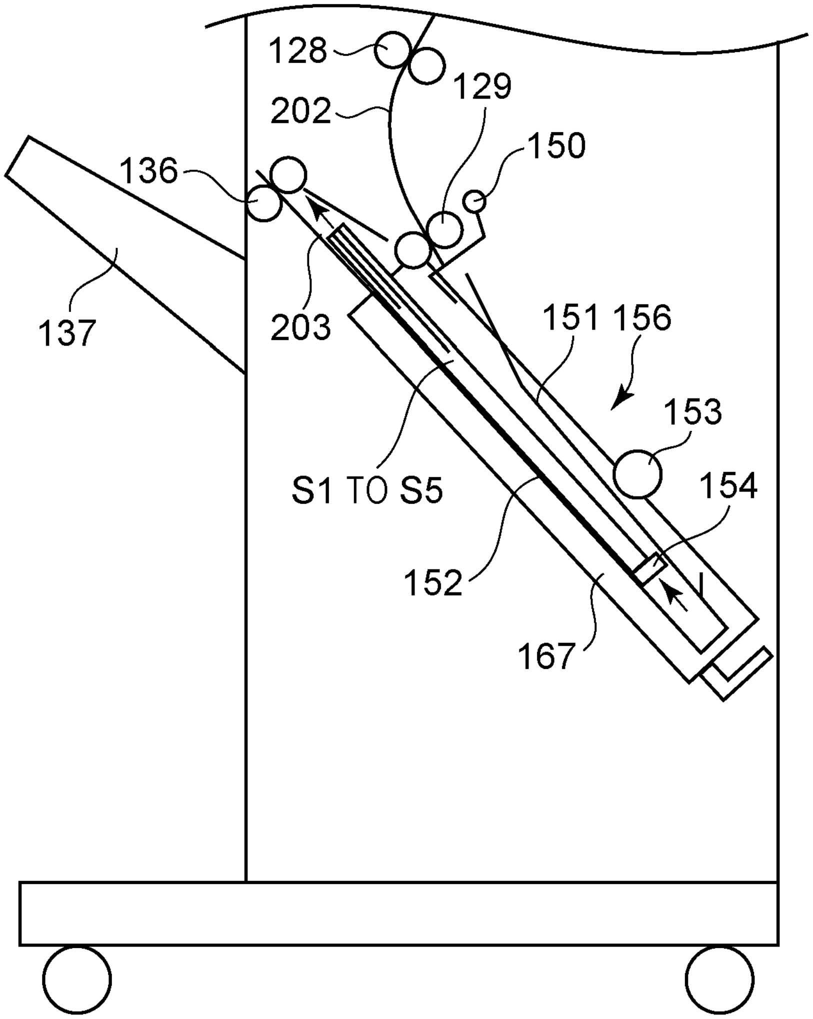
FIG. 16 is a diagram illustrating alignment operation of a sheet that is longer than the heater portion according to the first embodiment.
Figure 17A:
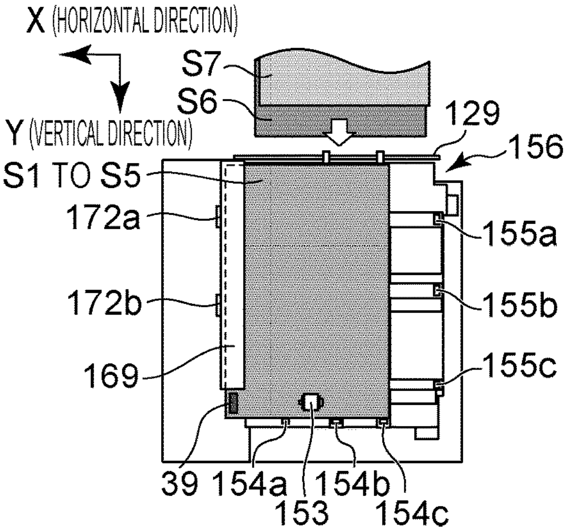
FIGS. 17A to 17F are a set of diagrams illustrating operation of the alignment unit for a sheet that is longer than the heater portion according to the first embodiment.
Figure 17B:
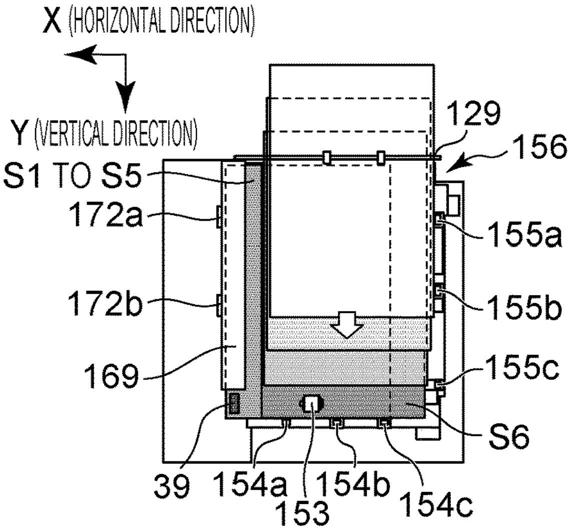
Figure 17C:
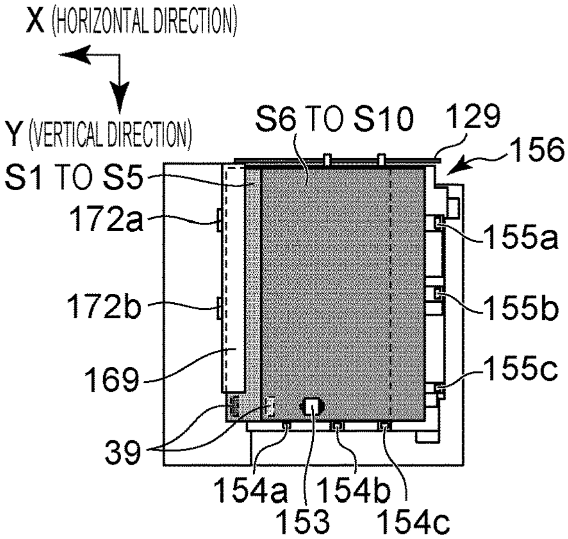
Figure 17D:
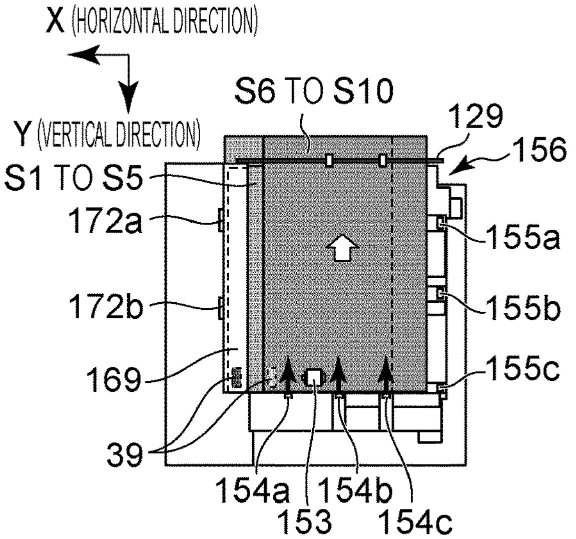
Figure 17E:
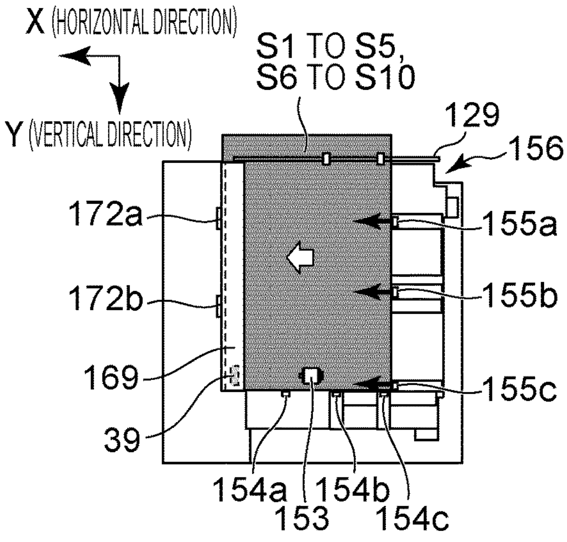
Figure 17F:
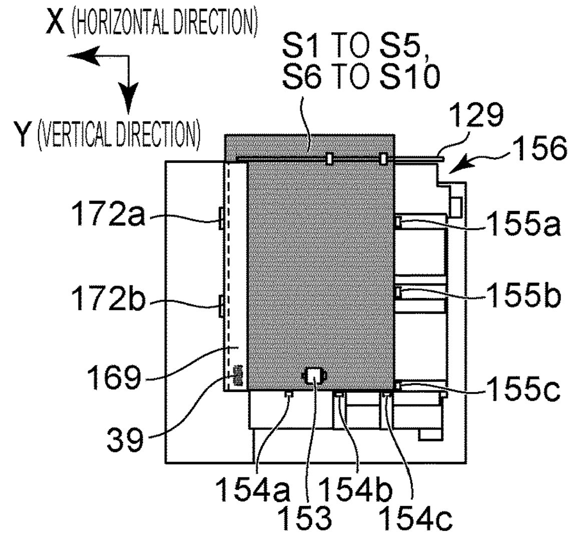

When the movement in FIG. 15D is performed, the stack holder flag 150 illustrated in FIG. 16 moves in such a way as to hold the sheets S1 to S5 having been moved in the −Y direction, thereby directing them toward an outgoing conveyance path 203 without a return to the incoming conveyance path 202. Then, the same steps of alignment operation and thermal compression bonding operation as above are repeated as illustrated in FIGS. 17A to 17F for the sheets S6 to S10.

Upon completion of thermal compression bonding of all of the sheets that make up one copy of a booklet, the booklet made up of the sheets S1 to S10 is pushed out by the vertical alignment reference plate 154 and is conveyed toward the pair of stack ejection rollers 136 (FIG. 1) (toward the −Y side) regarding the sheet conveyance direction.

As explained above, with the configuration of the sheet processing apparatus according to the present embodiment, with the operation of the alignment unit according to the present embodiment, and with the thermal compression bonding according to the present embodiment, it is possible to provide a low-cost sheet processing apparatus by adopting a configuration in which the length L2 of the heater portion is less than the maximum sheet length supported by the sheet processing apparatus, for example, the length of a legal-size sheet. With regard to every sheet size, even when the position of the adhesive-use toner image is selected to be a position of not overlapping with the heater portion, it is possible to create a booklet by adding an operation step of positioning the adhesive-use toner image 39 to the heating member 171 prior to thermal compression bonding.

Moreover, in the present embodiment, since a plurality of sheets S comes onto the lower intermediate guide 152 together through the buffer operation, it is possible to make the number of times of execution of the positioning of the adhesive-use toner image 39 to the heating member 171 in steps for creating one copy of a booklet less than the number of the sheets S that make up the booklet.

Therefore, a time loss incurred due to this operation step is minimal, and an effect on total time required for creating a booklet is small.

Operation for Overlapping of Heater Portion and Adhesive-use Toner Image in Y Direction: Explanation of Other Methods In the present embodiment, as an example, it has been described that the adhesive-use toner image 39 is brought to a position of overlapping with the heating member 171 in the Y direction by using a method of moving the sheet stack by moving the sheet contact portions 154*a*, 154*b*, and 154*c* to push the sheet stack. However, any other method may be used. Specific examples of another method will be described below.

Method of Moving Heater Portion

Figure 18A:
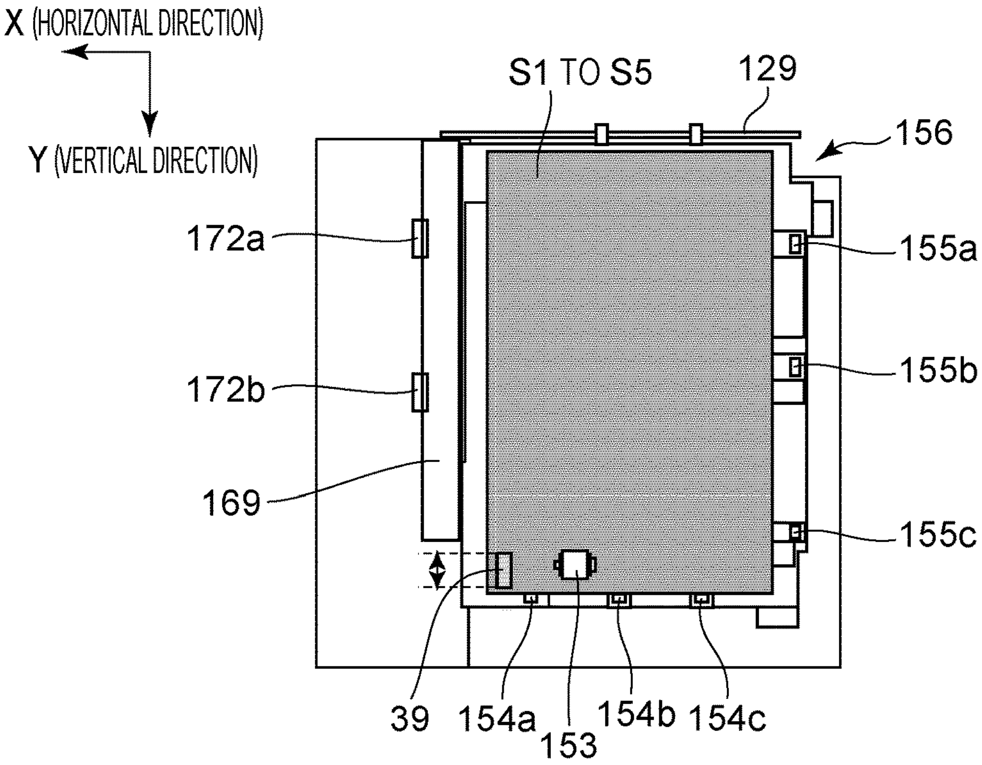
FIGS. 18A and 18B are a set of diagrams illustrating operation of the heater portion in another example of operation of the alignment unit for a sheet that is longer than the heater portion according to the first embodiment.

FIG. 18A illustrates a state in which each of the five sheets S1 to S5 has come into contact with the vertical alignment reference plate 154, and the alignment of them in the sheet conveyance direction has completed.

At this point in time, the adhesive-use toner image 39 selected to be at the lower left corner portion does not overlap with the heating member 171 in the Y direction.

Figure 18B:
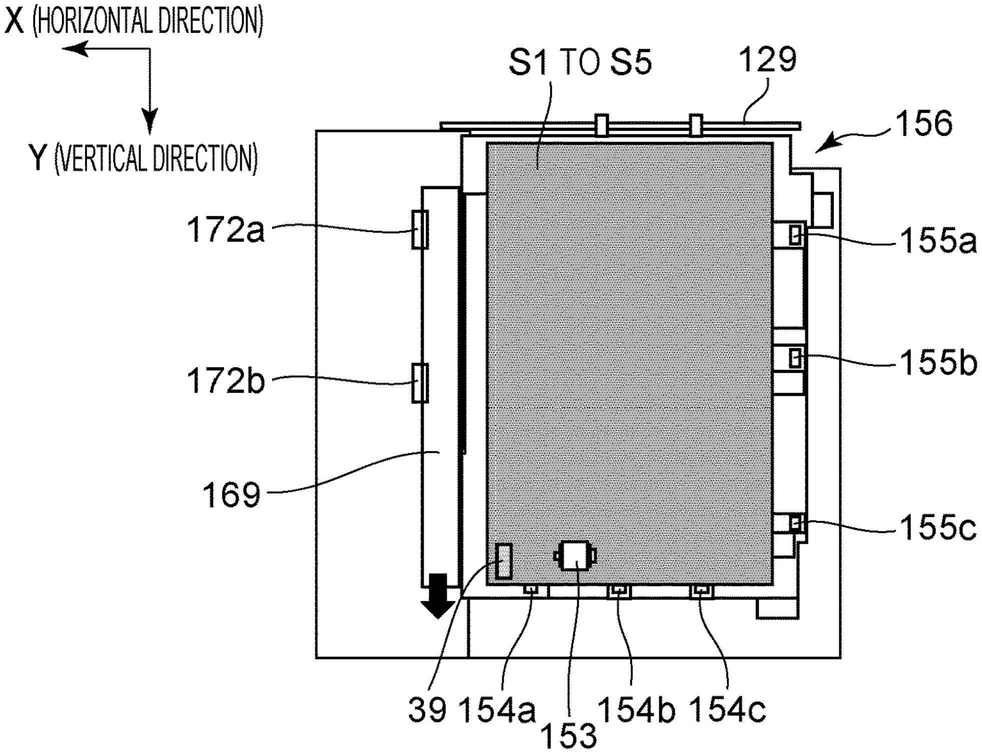

FIG. 18B illustrates a state in which the heating member 171 has moved in the +Y direction. This operation brings the heating member 171 to a position where it overlaps with, in the Y direction, the adhesive-use toner image 39 selected to be at the lower left corner portion.

Method of Moving Lower Intermediate Guide

Figure 19A:
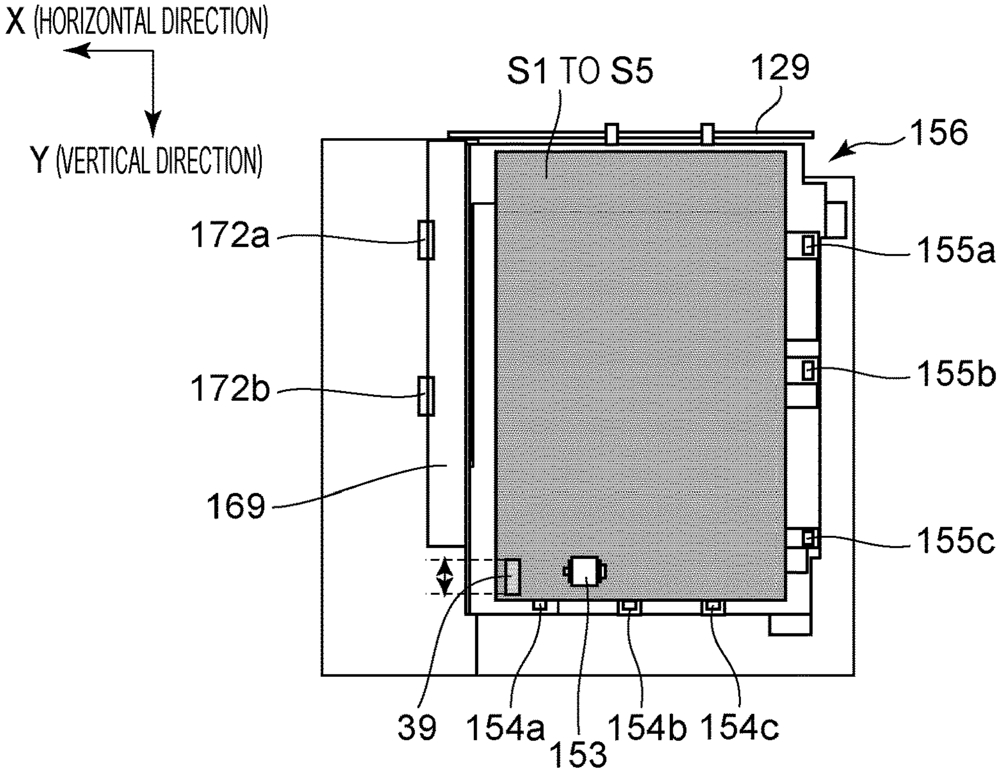
FIGS. 19A and 19B are a set of diagrams illustrating operation of a lower intermediate guide in another example of operation of the alignment unit for a sheet that is longer than the heater portion according to the first embodiment.

FIG. 19A illustrates a state in which each of the five sheets S1 to S5 has come into contact with the vertical alignment reference plate 154, and the alignment of them in the sheet conveyance direction has completed.

At this point in time, the adhesive-use toner image 39 selected to be at the lower left corner portion does not overlap with the heating member 171 in the Y direction.

Figure 19B:
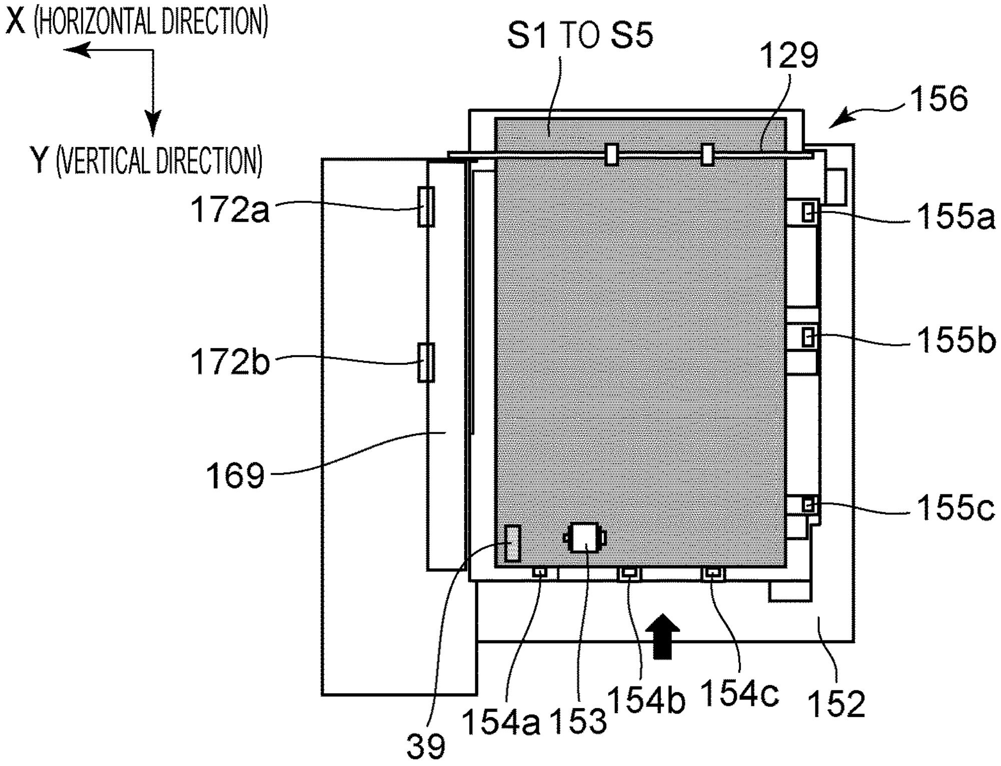

FIG. 19B illustrates a state in which the lower intermediate guide 152 has moved in the −Y direction together with the moving unit 159, the width alignment member 155, and the sheets S1 to S5. This operation brings the adhesive-use toner image 39 selected to be at the lower left corner portion to a position where it overlaps with the heating member 171 in the Y direction.

Second Embodiment

Timing of Executing Movement Control: Explanation of Another Method

In the first embodiment, as an example, it has been described that the adhesive-use toner image 39 is brought to a position of overlapping with the heating member 171 in the Y direction by performing movement in the −Y direction by the sheet contact portions 154*a*, 154*b*, and 154*c* after the sheets S1 to S5 come onto the lower intermediate guide 152. However, a similar effect may be obtained even if the timing of execution of the movement is before the sheets come. This will be explained in the present embodiment.

Alignment Operation and Thermal Compression Bonding Operation: Movement Before Sheets Come Each of FIGS. 20A to 20F is a schematic view of the alignment unit 156 as viewed from above in the Z direction. In the present embodiment, the conveyance roller 129 is not located adjacent to the alignment unit 156. The conveyance roller 129 and the alignment unit 156 are in a positional relationship illustrated in FIGS. 20A to 20F. Each sheet S illustrated in FIGS. 20A to 20F has a legal size. When the sheet S comes into the alignment unit 156 at the standby position to be described later, the trailing edge of the sheet S is located beyond the conveyance roller 129.

The illustration of the upper intermediate guide 151 and driving members/components, etc. of the thermal compression bonding unit 167 is omitted.

Figure 20A:
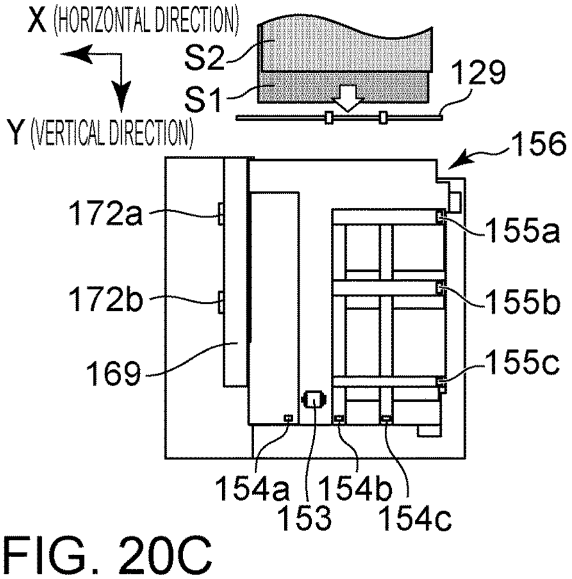
FIGS. 20A to 20F are a set of diagrams illustrating another example of operation of an alignment unit with a different timing of execution of movement for a sheet that is longer than a heater portion according to a second embodiment.

FIG. 20A illustrates a state in which the sheet S1, which is the first one, and the sheet S2, which is the second one, are being conveyed toward the alignment unit 156. The width alignment member 155 is waiting at a position located away in the −X direction from a sheet-stack-side-edge position so as not to be obstructive to the conveyance of the sheet stack. The moving unit 159 (the vertical alignment reference plate 154 and the vertical alignment roller 153) starts moving to the standby position in accordance with the sheet size and in accordance with the position of the adhesive-use toner image 39 before the sheet S comes onto the lower intermediate guide 152. This movement ensures that the adhesive-use toner image 39 will overlap with the pressing plate 169 at the point in time at which the sheet S comes.

Figure 20B:
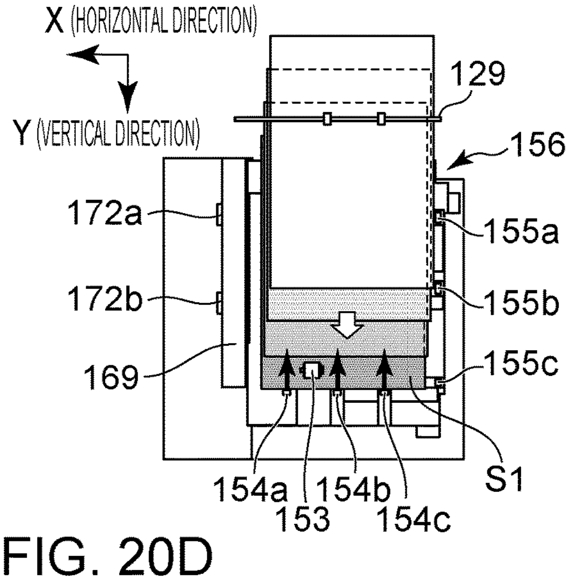

FIG. 20B illustrates a state in which the trailing edge of the sheet S1, the first one, has left the nip of the conveyance roller 129, and the leading edge of the sheet S1 has arrived at the vertical alignment roller 153. The moving unit 159 (the vertical alignment reference plate 154 and the vertical alignment roller 153), at this point in time, has already completed the movement to the standby position in accordance with the sheet size and in accordance with the position of the adhesive-use toner image 39. The vertical alignment roller 153 has been lowered to a contact position in advance due to electric energization to the solenoid 163 and is being rotated by the drive motor 161. The sheet S1 is transported toward the +Y side by the vertical alignment roller 153 and comes into contact with the vertical alignment reference plate 154, thereby being aligned in the sheet conveyance direction. After that, each time the succeeding sheet S2 to S5 leaves the conveyance roller 129, the sheet is transported toward the +Y side by the vertical alignment roller 153 and is brought into contact with the vertical alignment reference plate 154, thereby being aligned in the sheet conveyance direction.

Figure 20C:
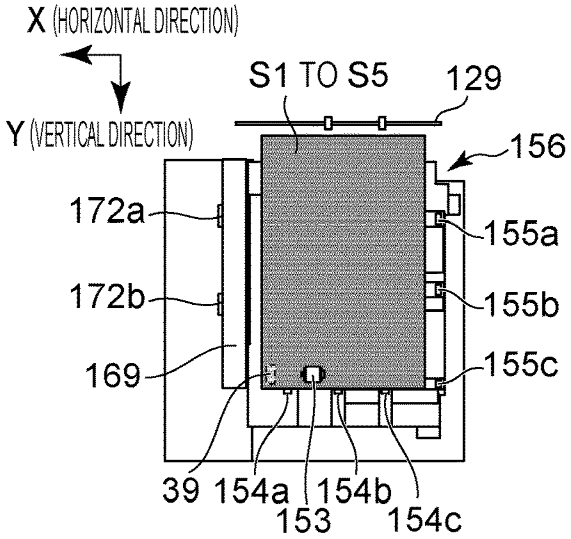

FIG. 20C illustrates a state in which each of the five sheets S1 to S5 has come into contact with the vertical alignment reference plate 154, and the alignment of them in the sheet conveyance direction has completed.

At this point in time, the adhesive-use toner image 39 selected to be at the lower left corner portion overlaps with the heating member 171 in the Y direction.

Figure 20D:
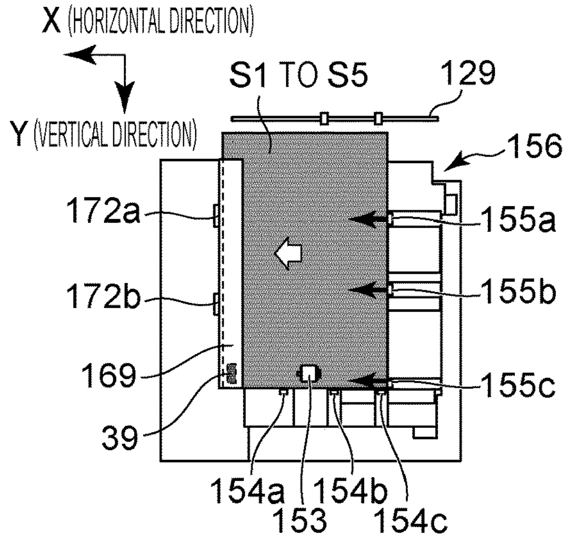

FIG. 20D illustrates a state in which the sheets S1 to S5 have been moved in the +X direction by being pushed by the sheet pushing portions 155*a*, 155*b*, and 155*c* of the width alignment member 155. This operation brings the side edge of each of the sheets S1 to S5 into contact with the width alignment reference plates 172*a* and 172*b*, resulting in alignment in the sheet width direction.

Figure 20E:
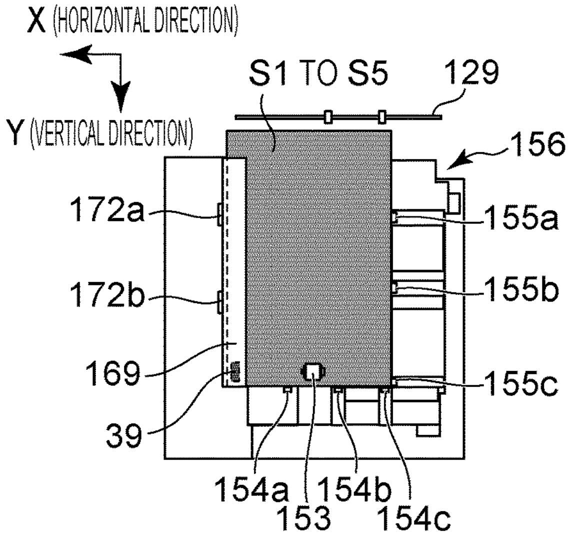

FIG. 20E illustrates a state in which thermal compression bonding has been performed on the aligned sheets S1 to S5 by the heating member 171.

Figure 20F:
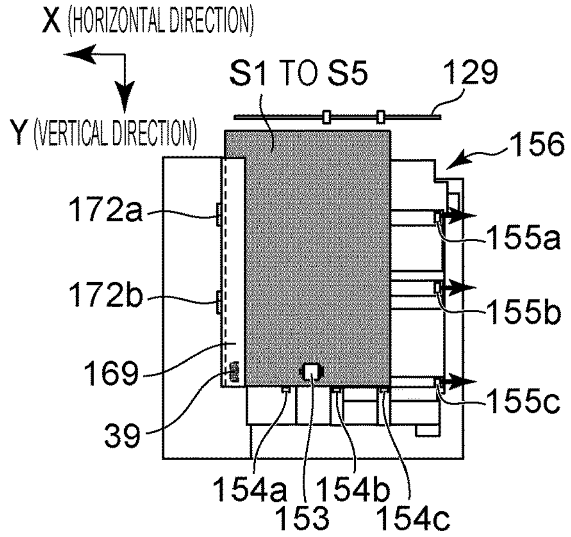

FIG. 20F illustrates a state in which, in order to be ready for accepting the sixth and subsequent sheets, the width alignment member 155 has moved in the retracting direction (toward the −X side). The vertical alignment reference plate 154 and the vertical alignment roller 153 remain at the standby position and do not move.

Then, the same steps of alignment operation and bonding operation as above are repeated for the sheets S6 to S10.

Though a method of moving the sheet contact portions 154*a*, 154*b*, and 154*c* has been described as an example of executing the movement before the sheets come, the same effect can be obtained also when a method of moving the heating member 171 or a method of moving the lower intermediate guide 152 is used, as described earlier with reference to FIGS. 18 and 19. Moreover, it is possible to shorten the entire time taken for adhesive bonding by executing the movement at a timing that is before the sheets come.

Third Embodiment

Figure 21:
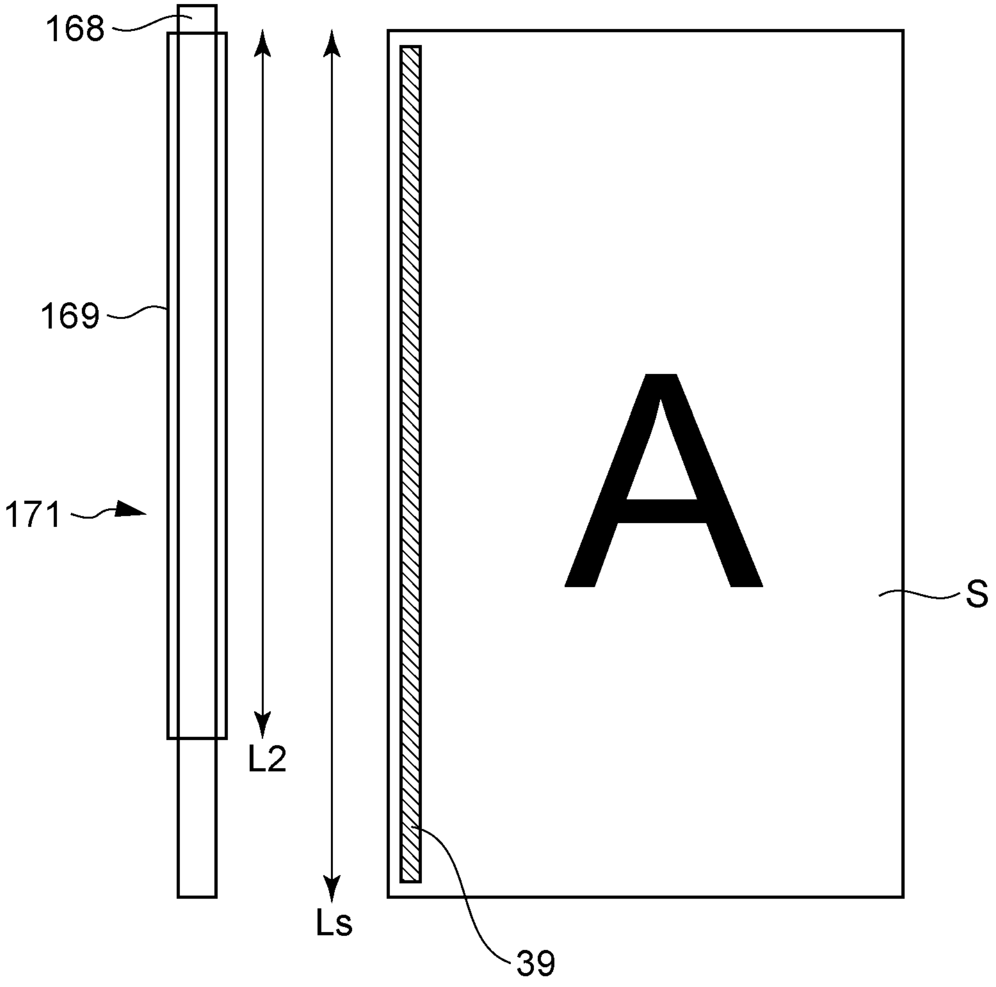
FIG. 21 is a diagram illustrating a toner layer on a sheet that is longer than a heater portion according to a third embodiment.

Next, with reference to FIGS. 21 to 24, operation of the alignment unit and thermal compression bonding according to a third embodiment will now be described. In the present embodiment, the same description as the foregoing description of the first embodiment will not be repeated. The sheet S is a legal-size sheet. The adhesive-use toner image 39 is formed thereon, and, as illustrated in FIG. 21, the sheet length Ls is greater than the length L2 of the heater portion, and the adhesive-use toner image 39 has a length substantially corresponding to the entire length of the sheet S in the longer-side direction of the sheet S. For this reason, a part of the area of the adhesive-use toner image 39 does not overlap with the heating member 171 in the Y direction. The adhesive bonding area pattern according to the present embodiment may be an adhesive bonding area pattern set when legal-size longer-side adhesive bonding is selected via the input unit 1001 illustrated in FIG. 14.

Figure 22A:
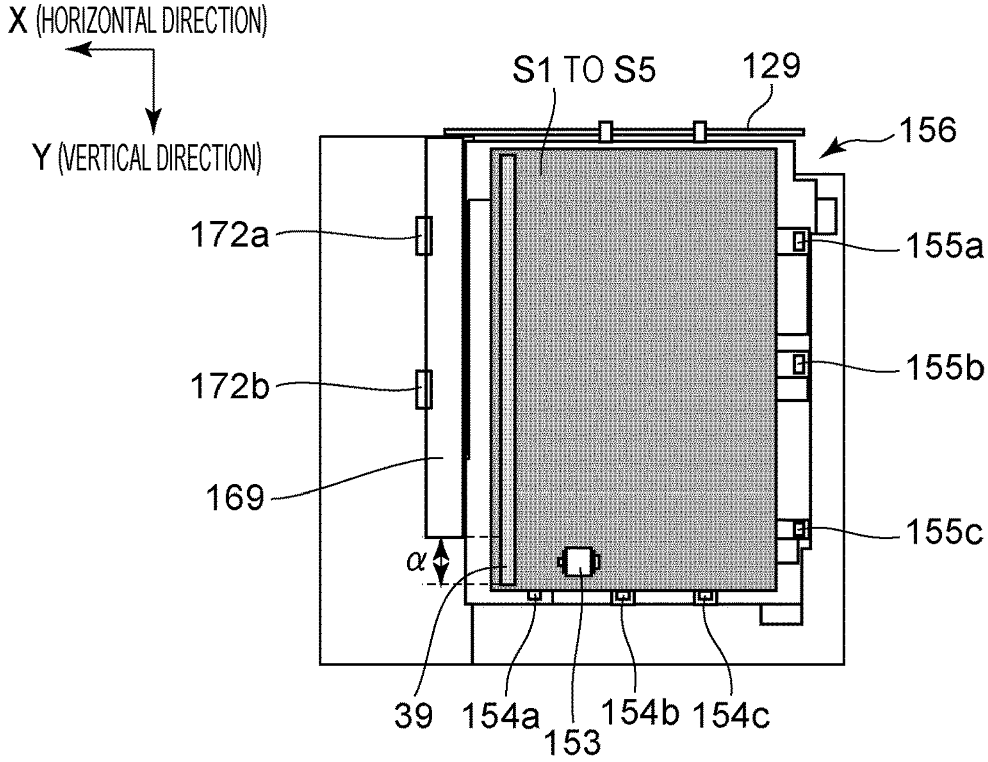
FIGS. 22A and 22B are a set of diagrams illustrating operation of an alignment unit for a sheet that is longer than the heater portion according to the third embodiment.
Figure 22B:
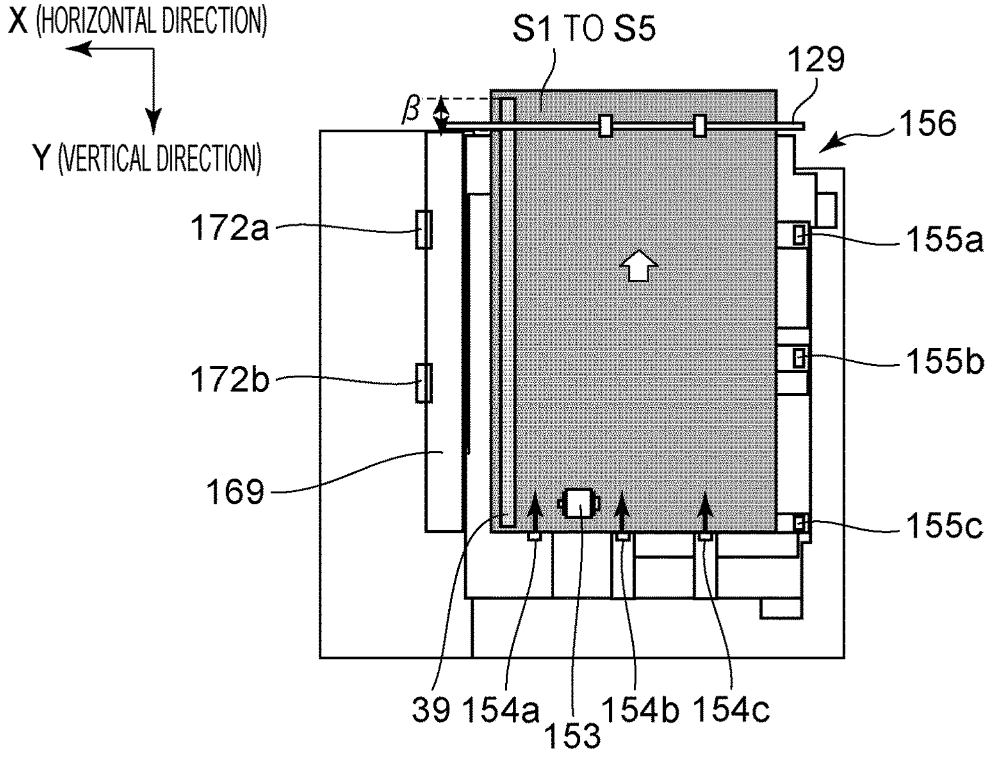

When the adhesive-use toner image 39 is such a long image, if an area α, of the adhesive-use toner image 39, not overlapping with the heating member 171 in the Y direction at a point in time of coming onto the lower intermediate guide 152 is moved to a position of overlapping therewith as illustrated in FIG. 22B, an area β that was originally included in an overlapping portion but goes to a non-overlapping position due to this movement appears. For this reason, if the alignment unit behaves as having been described in the first embodiment, no thermal compression bonding will be performed at the area B. With reference to FIGS. 23A to 23H, alignment operation and thermal compression bonding operation will now be described. The same description as the foregoing description of a sheet that is shorter than the heater portion will not be repeated.

Alignment Operation and Thermal Compression Bonding Operation: Length L2 of Heater Portion<Sheet Length Ls, Length of Adhesive-Use Toner Image Each of FIGS. 23A to 23H is a schematic view of the alignment unit 156 as viewed from above in the Z direction. The illustration of the upper intermediate guide 151 and driving members/components, etc. of the thermal compression bonding unit 167 is omitted.

Figure 23A:
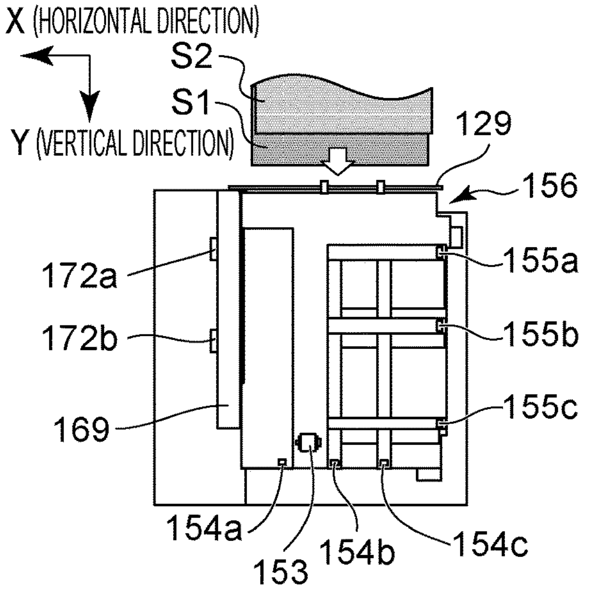
FIGS. 23A to 23H are a set of diagrams illustrating operation of the alignment unit for a sheet that is longer than the heater portion according to the third embodiment.

FIG. 23A illustrates a state in which the sheet S1, which is the first one, and the sheet S2, which is the second one, are being conveyed toward the alignment unit 156. The moving unit 159 (the vertical alignment reference plate 154 and the vertical alignment roller 153) have already moved to the standby position in accordance with the sheet size. The width alignment member 155 is waiting at a position located slightly outward of and away from a sheet-stack-side-edge position so as not to be obstructive to the conveyance of the sheet stack.

Figure 23B:
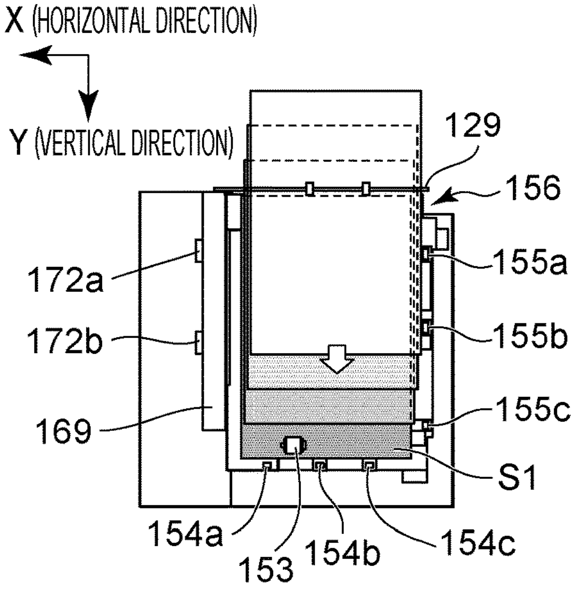

FIG. 23B illustrates a state in which the trailing edge of the sheet S1, the first one, has left the nip of the conveyance roller 129, and the leading edge of the sheet S1 has arrived at the vertical alignment roller 153. The vertical alignment roller 153 has been lowered to a contact position in advance due to electric energization to the solenoid 163 and is being rotated by the drive motor 161. The sheet S1 is transported toward the +Y side by the vertical alignment roller 153 and comes into contact with the vertical alignment reference plate 154, thereby being aligned in the sheet conveyance direction. After that, each time the succeeding sheet S2 to S5 leaves the conveyance roller 129, the sheet is transported toward the +Y side by the vertical alignment roller 153 and is brought into contact with the vertical alignment reference plate 154, thereby being aligned in the sheet conveyance direction.

Figure 23C:
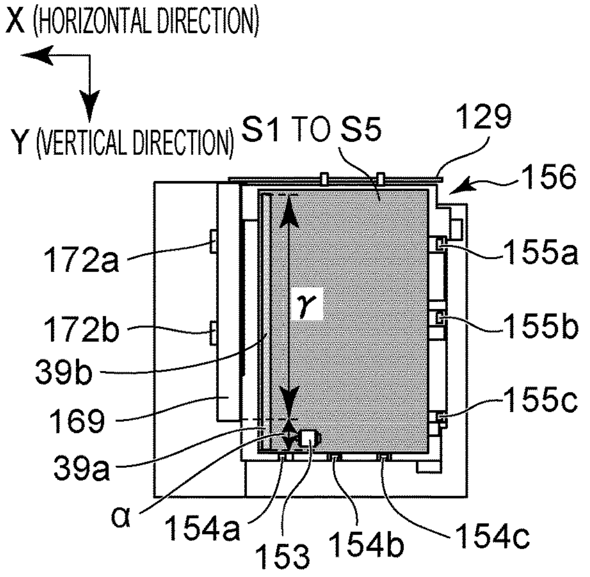

FIG. 23C illustrates a state in which each of the five sheets S1 to S5 has come into contact with the vertical alignment reference plate 154, and the alignment of them in the sheet conveyance direction has completed. At this point in time, an adhesive-use toner image 39*a* at the area a does not overlap with the heating member 171 in the Y direction, and an adhesive-use toner image 39*b* at an area y overlaps with the heating member 171 in the Y direction.

Figure 23D:
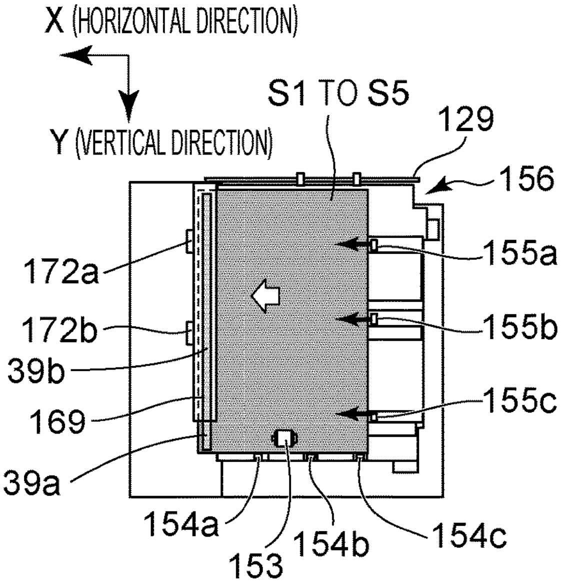

FIG. 23D illustrates a state in which the sheets S1 to S5 have been moved in the +X direction by being pushed by the sheet pushing portions 155*a*, 155*b*, and 155*c* of the width alignment member 155. This operation brings the side edge of each of the sheets S1 to S5 into contact with the width alignment reference plates 172*a* and 172*b*, resulting in alignment in the sheet width direction.

Figure 23E:
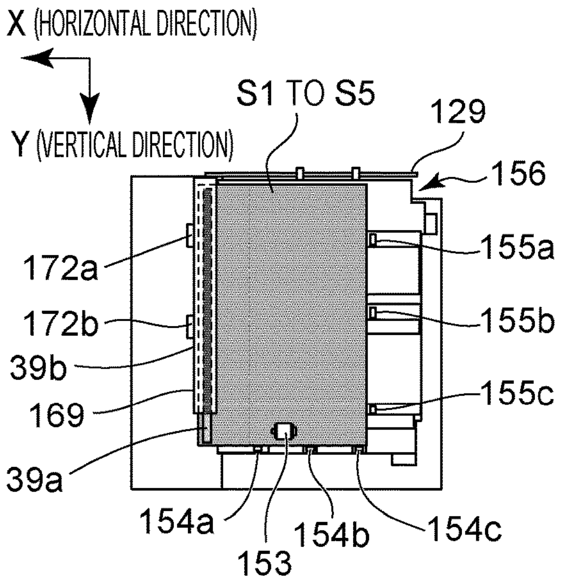

FIG. 23E illustrates a state in which thermal compression bonding has been performed on the aligned sheets S1 to S5 by the heating member 171. At this point in time, the adhesive-use toner image 39*b* only, which overlaps with the heating member 171 in the Y direction, has been bonded through thermal compression bonding, and the adhesive-use toner image 39*a* has not been bonded through thermal compression bonding yet.

Figure 23F:
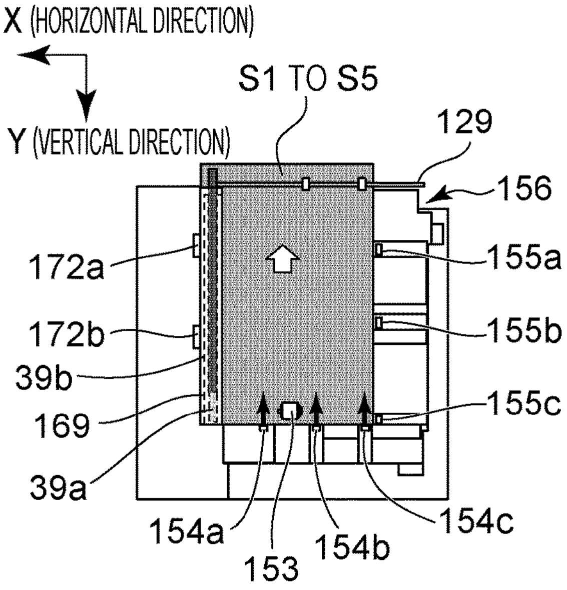

FIG. 23F illustrates a state in which the sheets S1 to S5 have been moved in the −Y direction by being pushed by the sheet contact portions 154*a*, 154*b*, and 154*c*. This operation brings the adhesive-use toner image 39*a* to a position where it overlaps with the heating member 171 in the Y direction.

Figure 23G:
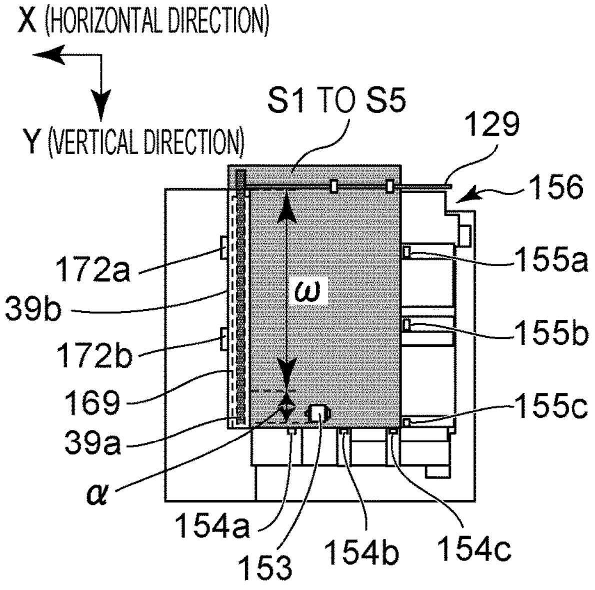

FIG. 23G illustrates a state in which thermal compression bonding has been performed on the aligned sheets S1 to S5 by the heating member 171. In this step, the thermal compression bonding of the adhesive-use toner image 39*a* at the area α, which was a yet-to-be-bonded part, completes, and thus the thermal compression bonding of the entire area of the adhesive-use toner image 39 finishes. Note that the area ω undergoes thermal compression bonding twice.

Figure 23H:
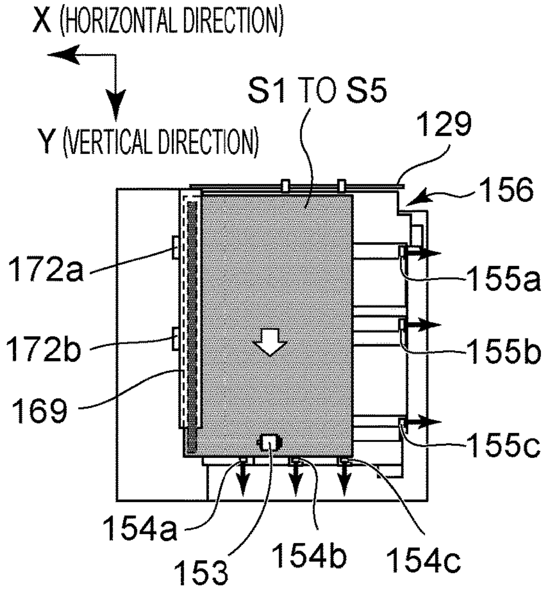
Figure 24A:
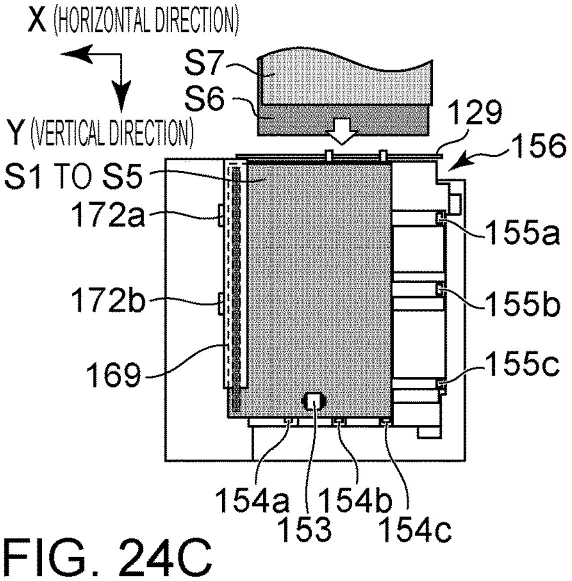
FIGS. 24A to 24F are a set of diagrams illustrating operation of the alignment unit for a sheet that is longer than the heater portion according to the third embodiment.
Figure 24B:
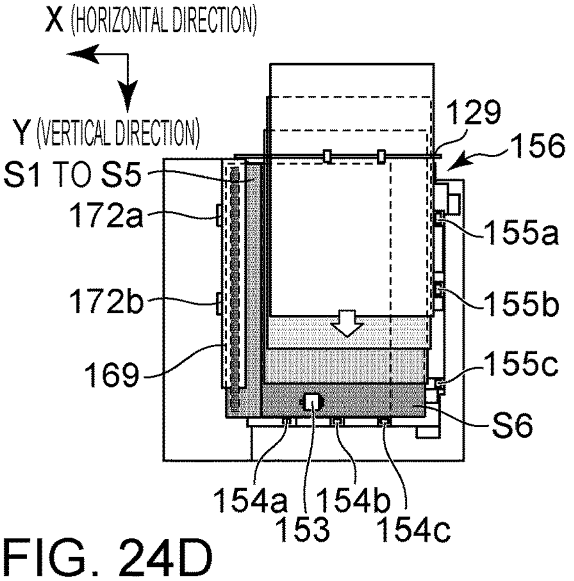
Figure 24C:
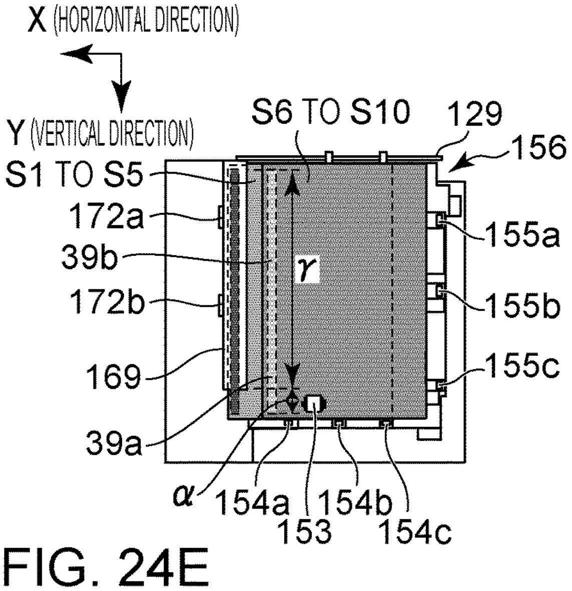
Figure 24D:
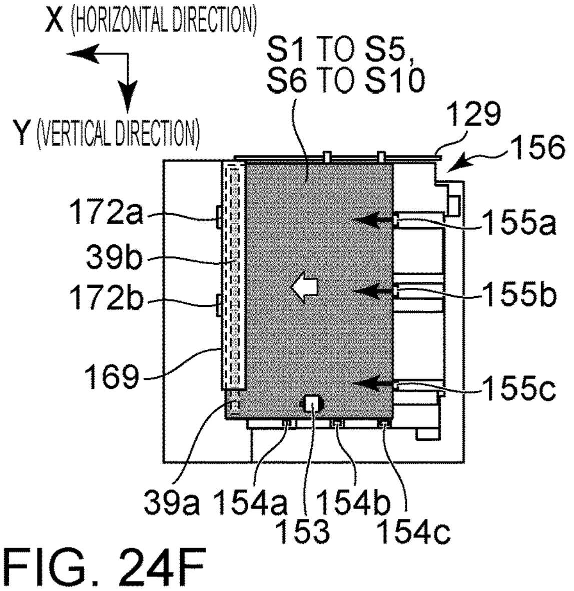
Figure 24E:
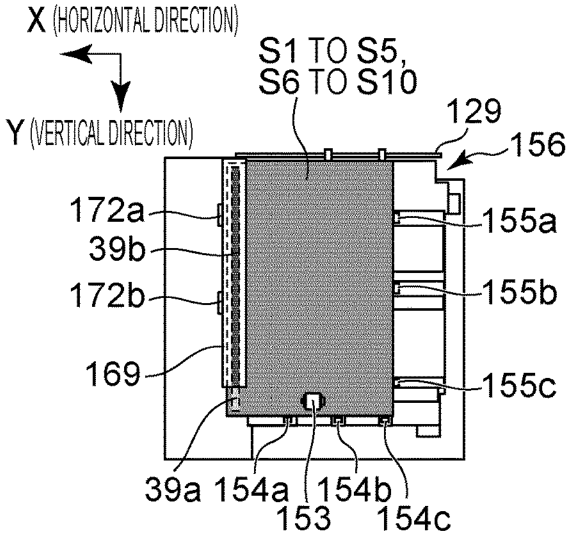
Figure 24F:
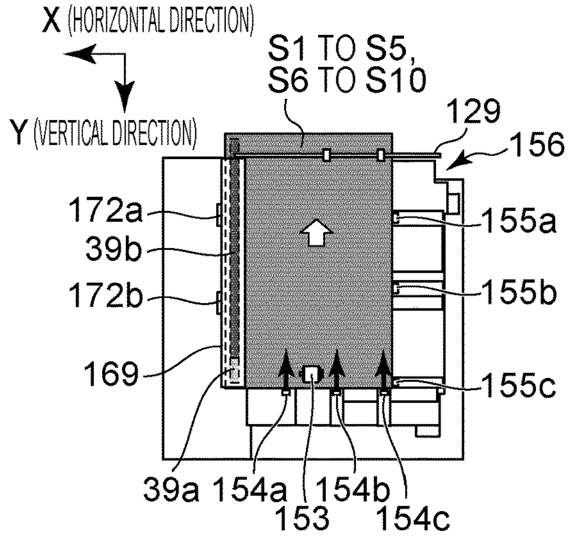

FIG. 23H illustrates a state in which, in order to be ready for accepting the sixth and subsequent sheets, the width alignment member 155 has moved in the retracting direction (toward the −X side) and in which the vertical alignment reference plate 154 and the vertical alignment roller 153 have moved to the standby position in accordance with the sheet size. At this time, the sheets S1 to S5 after the thermal compression bonding are aligned in the sheet conveyance direction by being conveyed toward the +Y side and being brought into contact with the vertical alignment reference plate 154 by the vertical alignment roller 153 while being kept at the position of being in contact with the width alignment reference plates 172*a* and 172*b* in the X direction. Then, the same steps of alignment operation and thermal compression bonding operation as above are repeated as illustrated in FIGS. 24A to 24F for the sheets S6 to S10. Upon completion of thermal compression bonding of all of the sheets that make up one copy of a booklet, the booklet made up of the sheets S1 to S10 is pushed out by the vertical alignment reference plate 154 and is conveyed toward the pair of stack ejection rollers 136 (FIG. 1) (toward the −Y side) regarding the sheet conveyance direction.

In the present embodiment, the sheet processing apparatus may be configured such that the sheet processing apparatus control unit 1004 acquires, or does not acquire, information about the position of the adhesive-use toner image 39 formed on the sheet S. In a case where the apparatus is configured to acquire this information, the heating member 171 may be moved in accordance with the position of the adhesive-use toner image 39. In a case where the apparatus is configured not to acquire this information, the thermal compression bonding unit 167 may always apply heat and pressure to a sheet more than once when the sheet that is longer than the pressing plate 169 comes into the alignment unit 156.

As explained above, with the configuration of the sheet processing apparatus according to the present embodiment, with the operation of the alignment unit according to the present embodiment, and with the thermal compression bonding according to the present embodiment, it is possible to provide a low-cost sheet processing apparatus by adopting a configuration in which the length L2 of the heater portion is less than the maximum sheet length Ls supported by the sheet processing apparatus. Moreover, even in a case where the adhesive-use toner image 39 is formed in a range longer than the heat generation area 168*a* along a longer side on a sheet of the maximum size, it is possible to create a booklet by executing an operation step of positioning an yet-to-be-bonded area of the adhesive-use toner image 39 to the heating member 171 after the first execution of thermal compression bonding operation, followed by the second execution of thermal compression bonding operation. In the present embodiment, the number of times of execution of thermal compression bonding operation is not limited to twice. This may be executed more than twice. The number of times of execution of the operation step of positioning the area of the adhesive-use toner image 39 to the heating member 171 is not limited to once. This may be executed twice or more.

Operation for Overlapping of Heater Portion and Adhesive-use Toner Image in Y Direction: Other Methods Though a method of moving the sheet contact portions 154*a*, 154*b*, and 154*c* has been described as an example in the present embodiment, the same effect can be obtained also when a method of moving the heating member 171 or a method of moving the lower intermediate guide 152 is used, as described earlier with reference to FIGS. 18 and 19.

Fourth Embodiment

Figure 25:
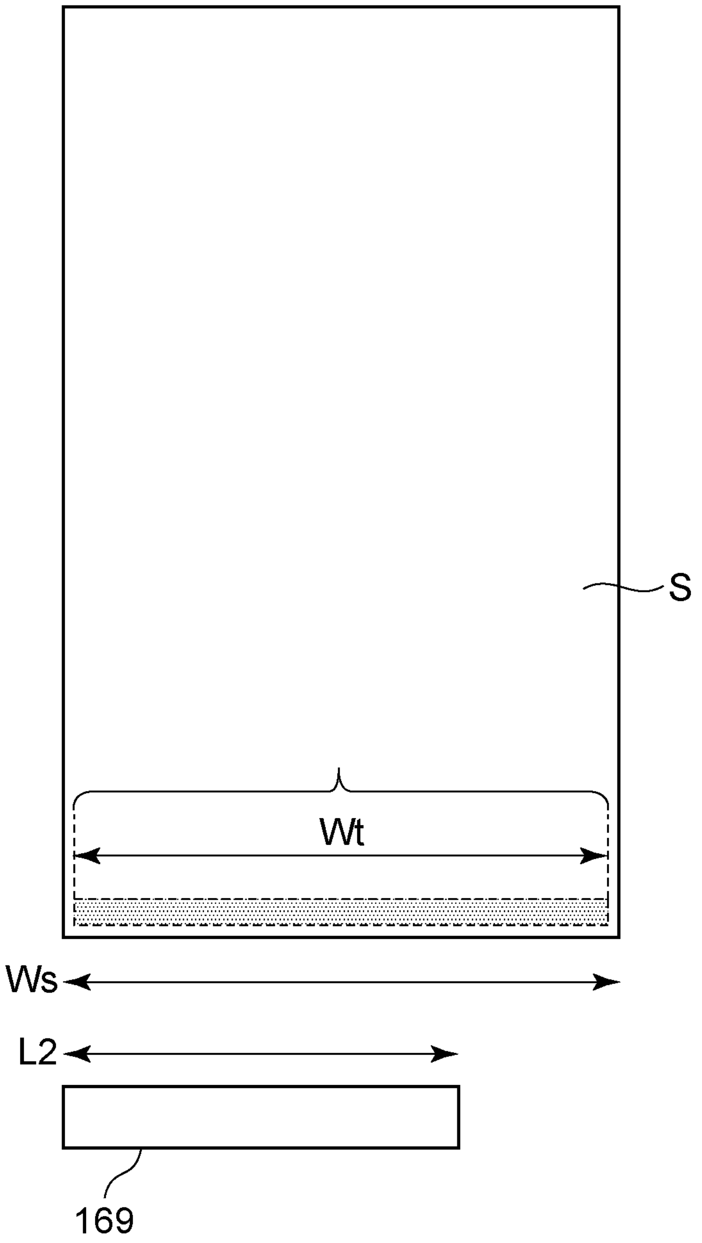
FIG. 25 is a diagram illustrating a width of a heater portion, a maximum sheet width, and a width of a toner layer according to a fourth embodiment.
Figure 26:
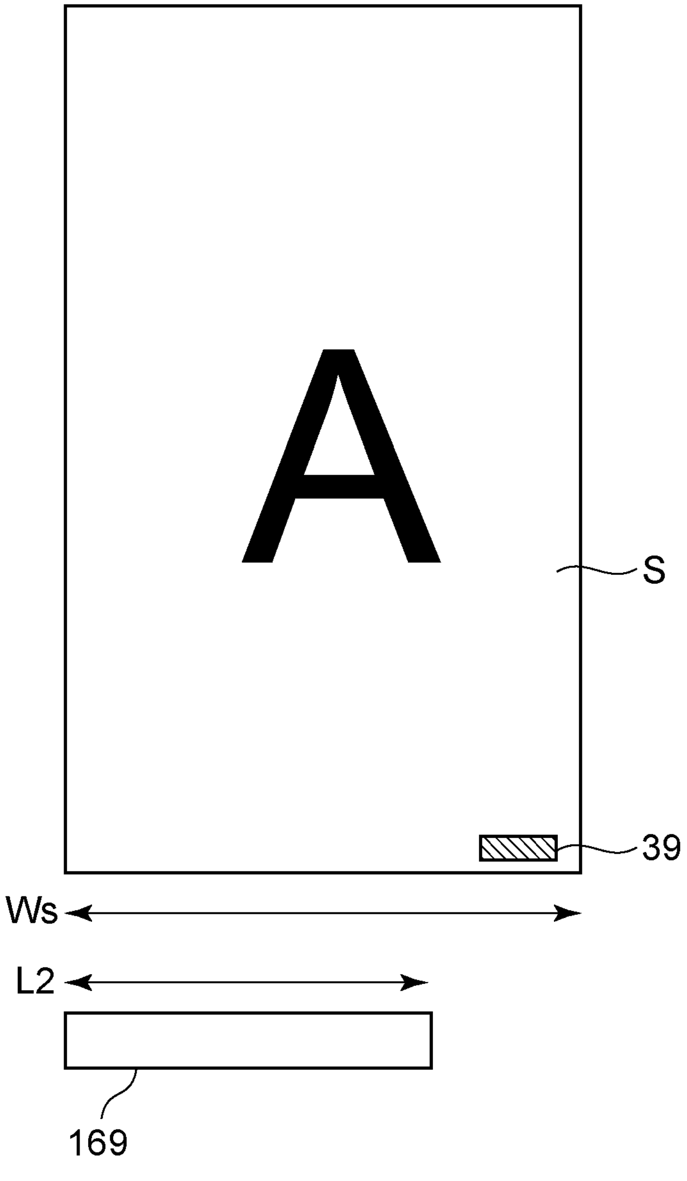
FIG. 26 is a diagram illustrating a toner layer on a sheet according to the fourth embodiment.

Next, with reference to FIGS. 25 to 28, operation of the alignment unit and thermal compression bonding according to a fourth embodiment will now be described. In the present embodiment, as illustrated in FIG. 27, the thermal compression bonding unit 167 is disposed along the sheet width direction (X direction) at the downstream side of the lower intermediate guide 152 and is configured to perform thermal compression bonding at a side extending in the sheet width direction. As illustrated in FIG. 25, the length L2 of the heater portion is less than the maximum sheet width Ws supported by the sheet processing apparatus. In addition, the adhesive-use toner image is arbitrarily selectable within a range Wt that is greater in length than the length L2 of the heater portion. Described in the present embodiment below with reference to FIGS. 27A to 27D is operation for alignment and thermal compression bonding in a case where, as illustrated in FIG. 26, the sheet width Ws is greater than the length L2 of the heater portion and where the adhesive-use toner image 39 on the sheet at the point in time of having come onto the lower intermediate guide 152 does not overlap with the heating member 171 in the X direction.

Alignment Operation and Thermal Compression Bonding Operation: Thermal Compression Bonding Portion Disposed Along Sheet Width Direction Each of FIGS. 27A to 27D is a schematic view of the alignment unit 156 as viewed from above in the Z direction. The illustration of the upper intermediate guide 151 and driving members/components, etc. of the thermal compression bonding unit 167 is omitted.

Figure 27A:
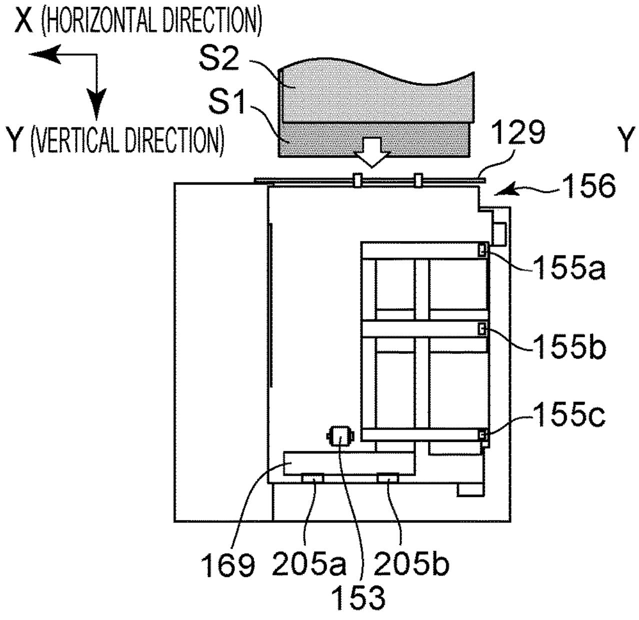
FIGS. 27A to 27D are a set of diagrams illustrating operation of an alignment unit for a sheet that is wider than the heater portion according to the fourth embodiment.

FIG. 27A illustrates a state in which the sheet S1, which is the first one, and the sheet S2, which is the second one, are being conveyed toward the alignment unit 156. The width alignment member 155 is waiting at a position located slightly outward of and away from a sheet-stack-side-edge position so as not to be obstructive to the conveyance of the sheet stack.

Figure 27B:
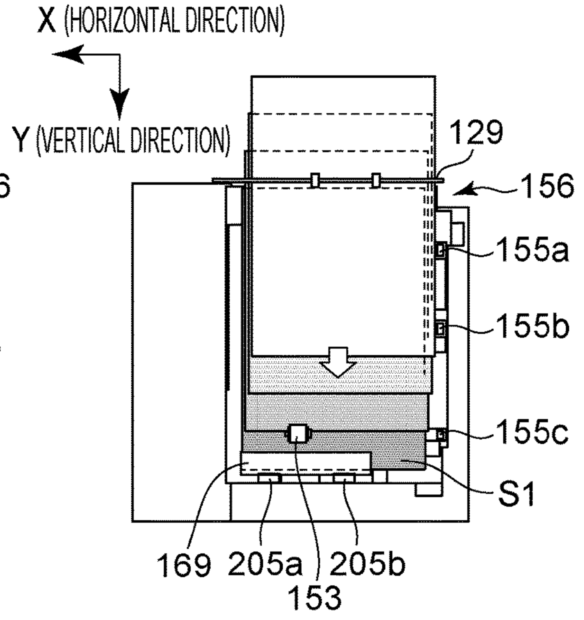

FIG. 27B illustrates a state in which the trailing edge of the sheet S1, the first one, has left the nip of the conveyance roller 129, and the leading edge of the sheet S1 has arrived at the vertical alignment roller 153. The vertical alignment roller 153 has been lowered to a contact position in advance due to electric energization to the solenoid 163 and is being rotated by the drive motor 161. The sheet S1 is transported toward the +Y side by the vertical alignment roller 153 and comes into contact with a vertical alignment heater reference plate 205, thereby being aligned in the sheet conveyance direction. After that, each time the succeeding sheet S2 to S5 leaves the conveyance roller 129, the sheet is transported toward the +Y side by the vertical alignment roller 153 and is brought into contact with the vertical alignment heater reference plate 205, thereby being aligned in the sheet conveyance direction.

Figure 27C:
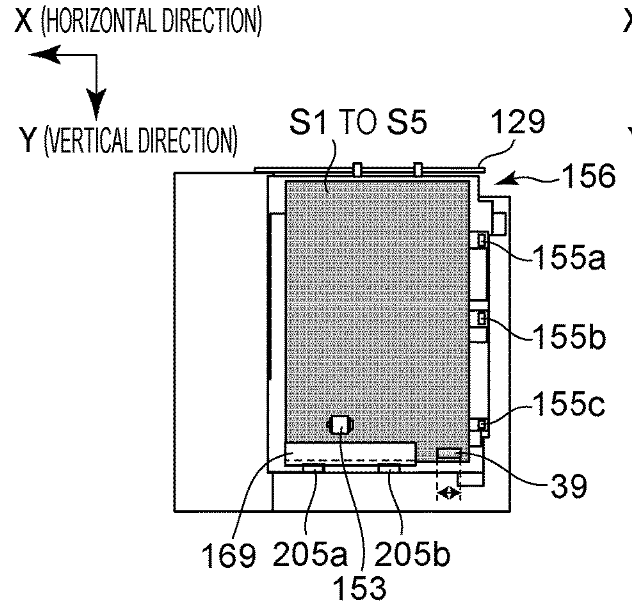

FIG. 27C illustrates a state in which each of the five sheets S1 to S5 has come into contact with the vertical alignment heater reference plate 205, and the alignment of them in the sheet conveyance direction has completed. At this point in time, the adhesive-use toner image 39 selected to be at the lower right corner portion does not overlap with the heating member 171 in the X direction.

Figure 27D:
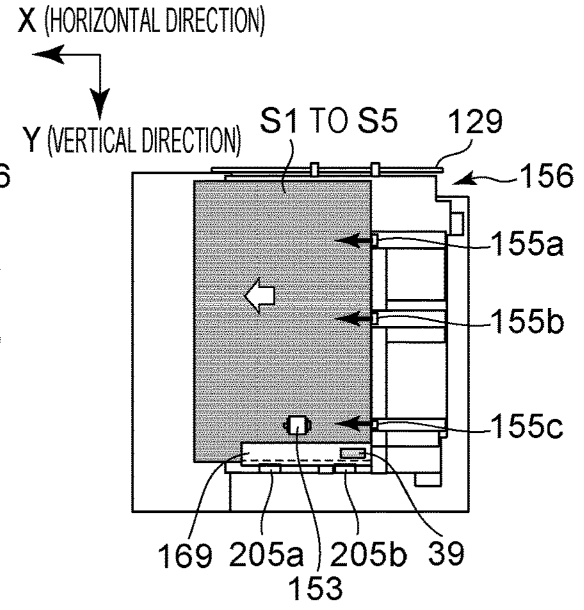

FIG. 27D illustrates a state in which the sheets S1 to S5 have been moved in the +X direction by being pushed by the sheet pushing portions 155*a*, 155*b*, and 155*c* of the width alignment member 155. This operation brings the adhesive-use toner image 39 selected to be at the lower right corner portion to a position where it overlaps with the heating member 171 in the X direction. After this alignment, thermal compression bonding is performed on the five sheets S1 to S5 by the heating member 171. Then, the same steps of alignment operation and thermal compression bonding operation as above are repeated for the sixth and subsequent sheets.

As explained above, with the configuration of the sheet processing apparatus according to the present embodiment, with the operation of the alignment unit according to the present embodiment, and with the thermal compression bonding according to the present embodiment, it is possible to provide a low-cost sheet processing apparatus by adopting a configuration in which the length L2 of the heater portion is less than the maximum sheet width Ws supported by the sheet processing apparatus. Even when the position of the adhesive-use toner image on the sheet is selected to be a position of not overlapping with the heater portion, it is possible to create a booklet by adding an operation step of positioning the adhesive-use toner image 39 to the heating member 171 prior to thermal compression bonding. Even when the heating member 171 is disposed as in the configuration of the present embodiment and the length in the sheet width direction (width) of the area where the adhesive-use toner image 39 is formed is greater than the length L2 of the heater portion, it is possible to perform shorter-side adhesive bonding by performing thermal compression bonding operation twice and by adding an operation step of positioning the adhesive-use toner image 39 to the heating member 171 prior to the second execution of thermal compression bonding as described earlier in the third embodiment.

Operation for Overlapping of Heater Portion and Adhesive-use Toner Image in X Direction: Explanation of Another Method In the present embodiment, as an example, it has been described that the adhesive-use toner image 39 is brought to a position of overlapping with the heating member 171 in the X direction by using a method of moving the sheet stack by moving the sheet pushing portions 155*a*, 155*b*, and 155*c* of the width alignment member 155 to push the sheet stack. However, a similar effect may be obtained even if another method is used. This will be explained below.

Method of Moving Heater Portion

Figure 28A:
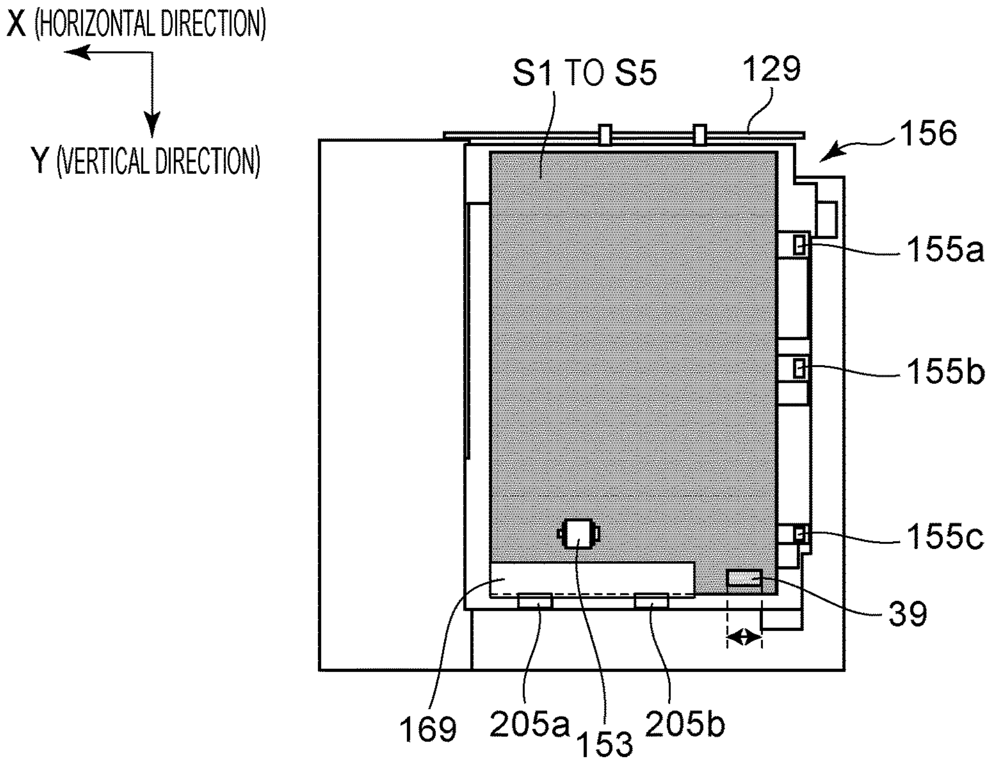
FIGS. 28A and 28B are a set of diagrams illustrating operation of the heater portion in another example of operation of the alignment unit for a sheet that is wider than the heater portion according to the fourth embodiment.

FIG. 28A illustrates a state in which each of the five sheets S1 to S5 has come into contact with the vertical alignment heater reference plate 205, and the alignment of them in the sheet conveyance direction has completed. At this point in time, the adhesive-use toner image 39 selected to be at the lower right corner portion does not overlap with the heating member 171 in the X direction.

Figure 28B:
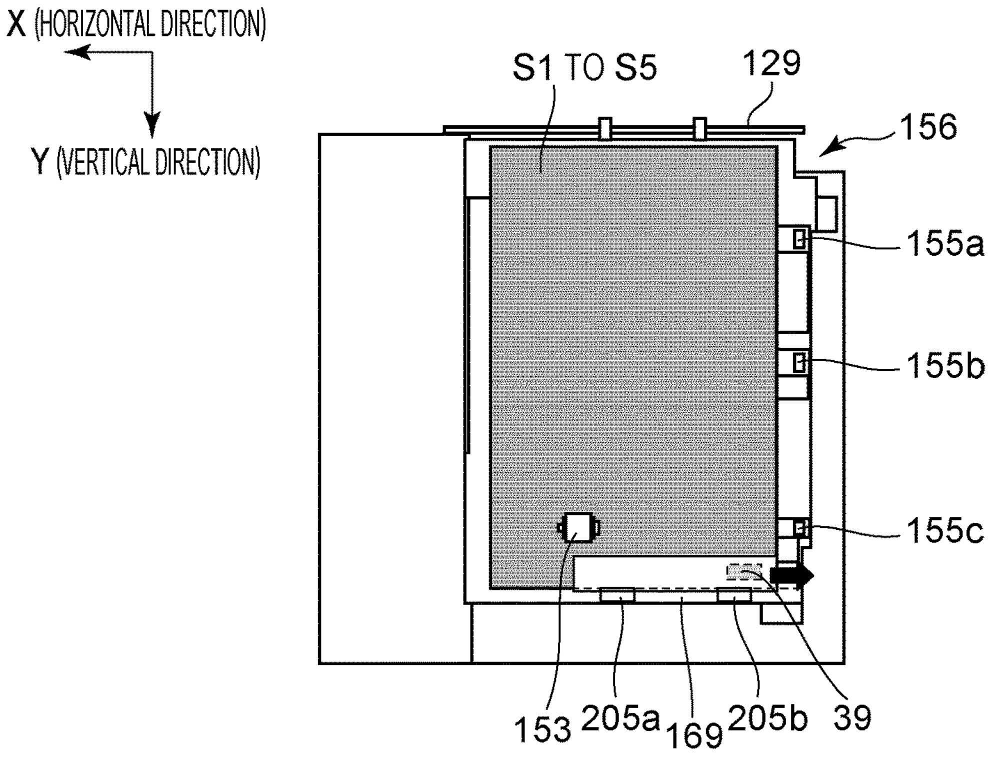

FIG. 28B illustrates a state in which the heating member 171 has moved in the −X direction. This operation brings the heating member 171 to a position where it overlaps with, in the X direction, the adhesive-use toner image 39 selected to be at the lower right corner portion.

Timing of Executing Movement Control: Another Method

In the present embodiment, as an example, it has been described that the adhesive-use toner image 39 is brought to a position of overlapping with the heating member 171 in the X direction by performing movement in the +X direction by the sheet pushing portions 155*a*, 155*b*, and 155*c* of the width alignment member 155 after the sheets S1 to S5 come onto the lower intermediate guide 152. However, as described earlier with reference to FIG. 20, a similar effect may be obtained even if the timing of execution of the movement is before the sheets come.

Fifth Embodiment

Figure 29:
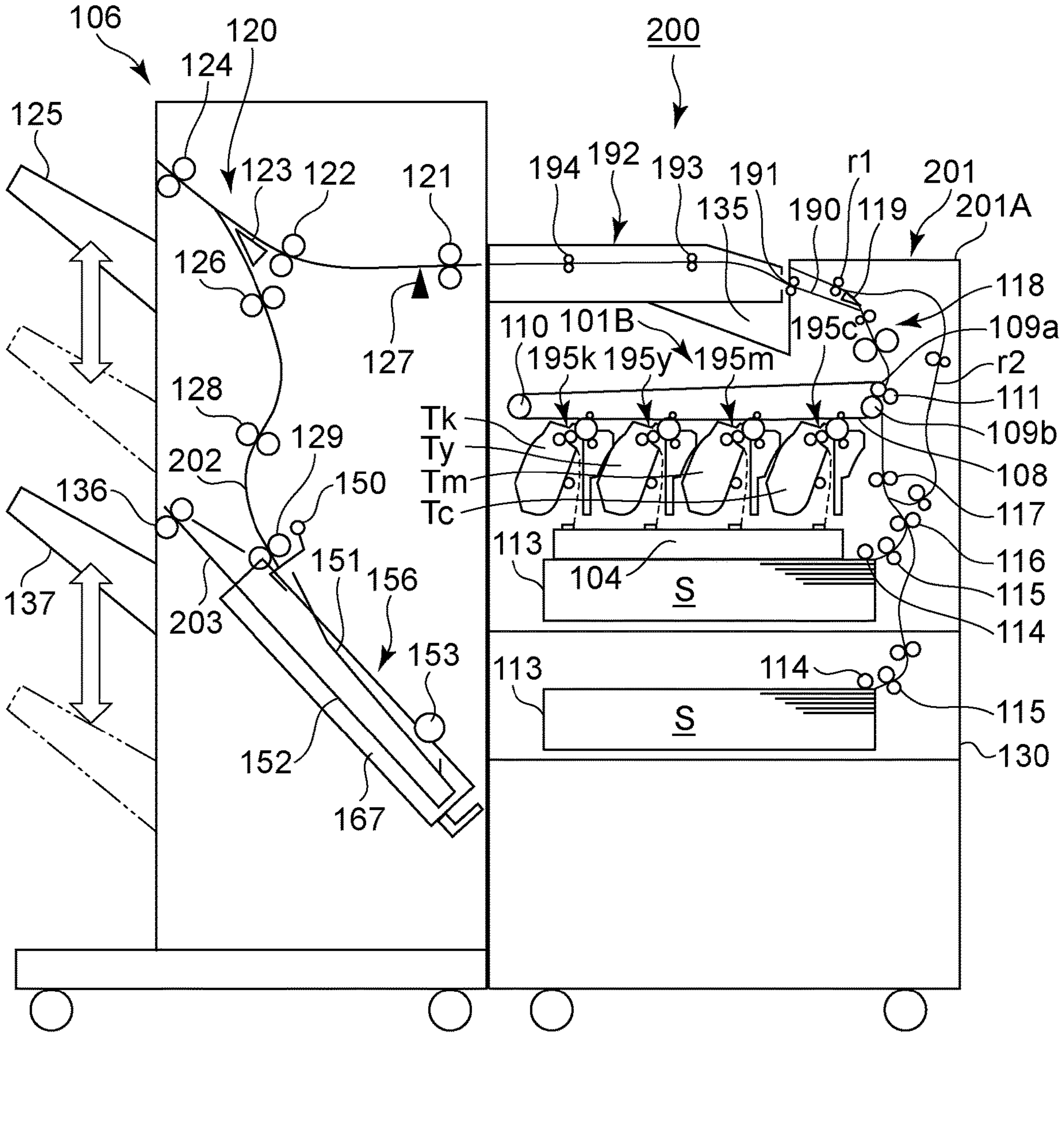
FIG. 29 is a schematic view of an image forming apparatus according to a fifth embodiment.

With reference to FIG. 29, an image forming apparatus 200 according to a fifth embodiment will now be described. The present embodiment is different from the first to fourth embodiments in that a printer body 201 (image forming apparatus body) has a configuration of a color printer configured to form a color image using toners of a plurality of colors. In the description below, unless otherwise specified, elements denoted by the same reference signs as those of the first to fourth embodiments are assumed to have substantially the same configurations and functions as those of the first to fourth embodiments, and differences from the first to fourth embodiments will be mainly explained.

An image forming section 201B of the printer body 201 includes four process cartridges 195*y*, 195*m*, 195*c*, and 195*k* disposed along the intermediate transfer belt 108. The configuration of each of the process cartridges 195*y*, 195*m*, 195*c*, and 195*k* may be substantially the same as the configuration of the process cartridge 195 according to the first and second embodiments, except for the difference in the toner contained therein.

The process cartridge 195*k* forms a single-color image corresponding to a black component of a color image by using a black toner Tk. The process cartridge 195*y* forms a single-color image corresponding to a yellow component of the color image by using a yellow toner Ty. The process cartridge 195*m* forms a single-color image corresponding to a magenta component of the color image by using a magenta toner Tm. The process cartridge 195*c* forms a single-color image corresponding to a cyan component of the color image by using a cyan toner Tc.

The single-color images formed by the process cartridges 195*y*, 195*m*, 195*c*, and 195*k* respectively are primarily transferred in such a way as to be superposed one on another on the intermediate transfer belt 108 and are thereafter secondarily transferred onto a sheet at the secondary transfer section. The other image forming operations performed by the printer body 201 are the same as those of the first to third embodiments.

The toner of at least one of the plurality of colors can be used as the toner for gluing sheets together. For example, it is possible to use the black toner Tk for dual purposes, one of which is a toner for recording an image on a sheet, and the other of which is a toner for adhesive bonding. In this case, the process cartridge 195*k* forms a single-color image corresponding to a black component of a color image and forms the adhesive-use toner image 39 (FIG. 2) that is to be transferred onto the adhesive bonding area of a sheet. When the image forming apparatus 200 creates a booklet, after toner images including the adhesive-use toner image 39 are formed on sheets at the printer body 201, thermal compression bonding is performed at the sheet processing apparatus 106 to glue the sheets together. The same configuration as that of the first to third embodiments can be used for the sheet processing apparatus 106.

Just with a single apparatus configuration, the image forming apparatus 200 according to the present embodiment is capable of performing color print processing and adhesive bonding processing. Using the thermal compression bonding portion described earlier in the first to third embodiments as the thermal compression bonding portion of the sheet processing apparatus 106 makes it possible to provide a low-cost sheet processing apparatus by adopting a configuration in which the length of the heater portion is less than the maximum sheet length supported by the sheet processing apparatus 106. With regard to every sheet size, even when the position of the adhesive-use toner image is selected to be a position of not overlapping with the heater portion, it is possible to create a booklet by adding an operation step of positioning the adhesive-use toner image 39 to the heating member 171 prior to thermal compression bonding. Though a configuration of a tandem-type color printer including four process cartridges has been described as an example in the present embodiment, the number of toner types may be five or more, or three or less. In place of using the toner of at least one of the plurality of colors for dual purposes, one of which is a toner for recording an image on a sheet, and the other of which is a toner for adhesive bonding, a dedicated toner used exclusively for adhesive purpose may be adopted. In this case, the process cartridge using the dedicated toner exclusive for adhesive purpose only forms the adhesive-use toner image 39 (FIG. 2) only. The dedicated toner exclusive for adhesive purpose only may be, for example, a transparent adhesive-use-only toner.

Additional Remarks

The embodiments having been described above discloses at least the following image forming system and the following sheet processing apparatus.

(Item 1)

An image forming system, comprising:

an image forming apparatus configured to form an image on a sheet; and a sheet processing apparatus configured to create a sheet stack by bonding a plurality of sheets together, the plurality of sheets being conveyed from the image forming apparatus, the sheet processing apparatus including a stacking unit, a thermal compression bonding unit, and a moving unit, the stacking unit including a stacking surface on which sheets with a layer of an adhesive formed thereon for bonding the sheets together are to be stacked, the thermal compression bonding unit including a heating member and a sheet cradle member, the heating member being elongated and including a heat generation area configured to heat the adhesive, the sheet cradle member facing the heating member, the thermal compression bonding unit sandwiching and heating the sheets stacked on the stacking unit between the heating member and the sheet cradle member, the thermal compression bonding unit bonding the plurality of sheets together by applying pressure while applying heat to the layer of the adhesive formed on the sheets by moving either one or both of the heating member, which is elongated, and the sheet cradle member, the moving unit moving either one or both of the sheets and the thermal compression bonding unit in a longer-side direction of the heating member, wherein the layer of the adhesive is formed on the sheets by the image forming apparatus, a position of the layer of the adhesive formed on the sheets by the image forming apparatus is selectable in the longer-side direction of the heating member, and in a case where a length of the layer of the adhesive regarding the longer-side direction of the heating member is greater than a length of the heat generation area, an entire area of the layer of the adhesive on the sheets is heated and pressed by applying the heat and the pressure to the layer of the adhesive more than once while changing a relative position of the sheets having been conveyed onto the stacking unit and the heat generation area regarding the longer-side direction of the heating member by the moving unit.

(Item 2)

The image forming system according to item 1, wherein the heating member is a heater including a substrate and a heat generation resistor serving as the heat generation area formed on the substrate.

(Item 3)

The image forming system according to item 1, wherein the heating member includes a heater and a plate member, the heater including a substrate and a heat generation resistor serving as the heat generation area formed on the substrate, the plate member being heated by the heater and being in contact with the sheets.

(Item 4)

The image forming system according to any of items 1 to 3, wherein the sheets on an end portion of which the layer of the adhesive is formed are bonded together, the end portion being an end portion regarding a direction intersecting with the longer-side direction of the heating member.

(Item 5)

The image forming system according to any of items 1 to 4, wherein the longer-side direction of the heating member is along a direction in which the sheets are conveyed onto the stacking unit.

(Item 6)

The image forming system according to any of items 1 to 4, wherein the longer-side direction of the heating member is along a direction orthogonal to a direction in which the sheets are conveyed onto the stacking unit.

(Item 7)

The image forming system according to any of items 1 to 6, wherein the moving unit moves the sheets, and the moving unit includes a restriction member configured to restrict movement of the sheet due to contact of a leading edge of the sheet conveyed onto the stacking unit, and the restriction member restricts the movement of the sheet due to the contact of the leading edge of the sheet when the sheet is conveyed onto the stacking unit.

(Item 8)

The image forming system according to item 7, wherein in a case where, after creation of an already-bonded sheet stack by bonding a plurality of sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

(Item 9)

The image forming system according to any of items 1 to 8, wherein the layer of the adhesive is made of a powdery adhesive.

(Item 10)

The image forming system according to item 9, wherein the powdery adhesive is a toner.

(Item 11)

An image forming system, comprising:

an image forming apparatus configured to form an image on a sheet; and a sheet processing apparatus configured to create a sheet stack by bonding a plurality of sheets together, the plurality of sheets being conveyed from the image forming apparatus, the sheet processing apparatus including a stacking unit, a thermal compression bonding unit, and a moving unit, the stacking unit including a stacking surface on which sheets with a layer of an adhesive formed thereon for bonding the sheets together are to be stacked, the thermal compression bonding unit including a heating member and a sheet cradle member, the heating member being elongated and including a heat generation area configured to heat the adhesive, the sheet cradle member facing the heating member, the thermal compression bonding unit sandwiching and heating the sheets stacked on the stacking unit between the heating member and the sheet cradle member, the thermal compression bonding unit bonding the plurality of sheets together by applying pressure while applying heat to the layer of the adhesive formed on the sheets by moving either one or both of the heating member, which is elongated, and the sheet cradle member, the moving unit moving either one or both of the sheets and the thermal compression bonding unit in a longer-side direction of the heating member, wherein the layer of the adhesive is formed on the sheets by the image forming apparatus, and in a case where a length of the layer of the adhesive regarding the longer-side direction of the heating member is less than a length of the heat generation area, before the sheets are heated and pressed, the moving unit moves either one or both of the sheets and the thermal compression bonding unit in advance in accordance with a sheet length so that an entire area of the layer of the adhesive overlaps with the heat generation area regarding the longer-side direction of the heating member when the sheets have been conveyed onto the stacking unit.

(Item 12)

The image forming system according to item 11, wherein the moving unit moves either one or both of the sheets and the thermal compression bonding unit in advance before a sheet trailing edge becomes stacked on the stacking surface.

(Item 13)

The image forming system according to item 11 or 12, wherein the moving unit moves the sheets, and the moving unit includes a restriction member configured to restrict movement of the sheet due to contact of a leading edge of the sheet conveyed onto the stacking unit, and the restriction member restricts the movement of the sheet due to the contact of the leading edge of the sheet when the sheet is conveyed onto the stacking unit.

(Item 14)

The image forming system according to item 13, wherein in a case where, after creation of an already-bonded sheet stack by bonding a plurality of sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

(Item 15)

The image forming system according to any of items 11 to 14, wherein the layer of the adhesive is made of a powdery adhesive.

(Item 16)

The image forming system according to item 15, wherein the powdery adhesive is a toner.

(Item 17)

An image forming system, comprising:

an image forming apparatus configured to form an image on a sheet; and a sheet processing apparatus configured to create a sheet stack by bonding a plurality of sheets together, the plurality of sheets being conveyed from the image forming apparatus, the sheet processing apparatus including a stacking unit, a thermal compression bonding unit, a moving unit, and a conveyance roller, the stacking unit including a stacking surface on which sheets with a layer of an adhesive formed thereon for bonding the sheets together are to be stacked, the thermal compression bonding unit including a heating member and a sheet cradle member, the heating member being elongated and including a heat generation area configured to heat the adhesive, the sheet cradle member facing the heating member, the thermal compression bonding unit sandwiching and heating the sheets stacked on the stacking unit between the heating member and the sheet cradle member, the thermal compression bonding unit bonding the plurality of sheets together by applying pressure while applying heat to the layer of the adhesive formed on the sheets by moving either one or both of the heating member, which is elongated, and the sheet cradle member, the moving unit moving either one or both of the sheets and the thermal compression bonding unit in a longer-side direction of the heating member, the conveyance roller being provided on a sheet conveyance path and conveying the sheets onto the stacking unit, wherein the conveyance roller and the stacking unit are in such a positional relationship that, upon passing of a trailing edge of the sheet regarding a sheet conveyance direction through the conveyance roller when the sheet is conveyed onto the stacking unit, the trailing edge of the sheet becomes stacked on the stacking unit, the layer of the adhesive is formed on the sheets by the image forming apparatus, and in a case where a sheet length regarding the longer-side direction of the heating member is greater than a length of the heat generation area, and where a length of the layer of the adhesive regarding the longer-side direction of the heating member is less than the length of the heat generation area, and where the layer of the adhesive on the sheets has any area that does not overlap with the heat generation area regarding the longer-side direction of the heating member when the sheets have been conveyed onto the stacking unit, the thermal compression bonding unit heats and presses the layer of the adhesive after a positional alignment of the layer of the adhesive and the heat generation area is performed by changing a relative position of the sheets regarding the longer-side direction of the heating member and the heat generation area by the moving unit.

(Item 18)

The image forming system according to item 17, wherein the moving unit moves the sheets, and the moving unit includes a restriction member configured to restrict movement of the sheet due to contact of a leading edge of the sheet conveyed onto the stacking unit, and the restriction member restricts the movement of the sheet due to the contact of the leading edge of the sheet when the sheet is conveyed onto the stacking unit.

(Item 19)

The image forming system according to item 18, wherein in a case where, after creation of an already-bonded sheet stack by bonding a plurality of sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

(Item 20)

The image forming system according to any of items 17 to 19, wherein the layer of the adhesive is made of a powdery adhesive.

(Item 21)

The image forming system according to item 20, wherein the powdery adhesive is a toner.

(Item 22)

A sheet processing apparatus, comprising:

a stacking unit including a stacking surface on which sheets with a layer of an adhesive formed thereon for bonding the sheets together are to be stacked;

a thermal compression bonding unit including a heating member and a sheet cradle member, the heating member being elongated and including a heat generation area configured to heat the adhesive, the sheet cradle member facing the heating member, the thermal compression bonding unit sandwiching and heating the sheets stacked on the stacking unit between the heating member and the sheet cradle member, the thermal compression bonding unit applying pressure while applying heat to the layer of the adhesive formed on the sheets by moving either one or both of the heating member, which is elongated, and the sheet cradle member;

a moving unit configured to move either one or both of the sheets and the thermal compression bonding unit in a longer-side direction of the heating member; and a controller configured to control the sheet processing apparatus, wherein the sheet processing apparatus bonds a plurality of sheets together by heating and pressing the layer of the adhesive formed on the sheets stacked on the stacking unit, the controller acquires information regarding the sheets on which the layer of the adhesive is formed, and in a case where a length of the layer of the adhesive regarding the longer-side direction of the heating member is greater than a length of the heat generation area and thus where an entire area of the layer of the adhesive formed on one side of a sheet is unable to be heated and pressed just by performing heating and pressing once, based on the information, the controller performs control to change a relative position of the sheets having been conveyed onto the stacking unit and the heat generation area regarding the longer-side direction of the heating member by the moving unit and to apply the heat and the pressure to the layer of the adhesive more than once, thereby heating and pressing an entire area of the layer of the adhesive on the sheet.

(Item 23)

The sheet processing apparatus according to item 22, wherein the controller acquires information regarding a sheet length and/or the length of the layer of the adhesive regarding the longer-side direction of the heating member.

(Item 24)

The sheet processing apparatus according to item 22 or 23, wherein the moving unit moves the sheets, and the moving unit includes a restriction member configured to restrict movement of the sheet due to contact of a leading edge of the sheet conveyed onto the stacking unit, and the restriction member restricts the movement of the sheet due to the contact of the leading edge of the sheet when the sheet is conveyed onto the stacking unit.

(Item 25)

The sheet processing apparatus according to item 24, wherein in a case where, after creation of an already-bonded sheet stack by bonding a plurality of sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

(Item 26)

A sheet processing apparatus, comprising:

a stacking unit including a stacking surface on which sheets with a layer of an adhesive formed thereon for bonding the sheets together are to be stacked;

a thermal compression bonding unit including a heating member and a sheet cradle member, the heating member being elongated and including a heat generation area configured to heat the adhesive, the sheet cradle member facing the heating member, the thermal compression bonding unit sandwiching and heating the sheets stacked on the stacking unit between the heating member and the sheet cradle member, the thermal compression bonding unit applying pressure while applying heat to the layer of the adhesive formed on the sheets by moving either one or both of the heating member, which is elongated, and the sheet cradle member;

a moving unit configured to move either one or both of the sheets and the thermal compression bonding unit in a longer-side direction of the heating member; and a controller configured to control the sheet processing apparatus, wherein the sheet processing apparatus bonds a plurality of sheets together by heating and pressing the layer of the adhesive formed on the sheets stacked on the stacking unit, the controller acquires information regarding the sheets on which the layer of the adhesive is formed, and in a case where a length of the layer of the adhesive regarding the longer-side direction of the heating member is less than a length of the heat generation area, and based on the information, the controller performs control to, before the sheets are heated and pressed, cause the moving unit to move either one or both of the sheets and the thermal compression bonding unit in advance in accordance with a sheet length so that an entire area of the layer of the adhesive overlaps with the heat generation area regarding the longer-side direction of the heating member when the sheets have been conveyed onto the stacking unit.

(Item 27)

The sheet processing apparatus according to item 26, wherein the controller acquires information regarding a sheet length and information regarding the length of the layer of the adhesive regarding the longer-side direction of the heating member.

(Item 28)

The sheet processing apparatus according to item 26 or 27, wherein the moving unit moves the sheets, and the moving unit includes a restriction member configured to restrict movement of the sheet due to contact of a leading edge of the sheet conveyed onto the stacking unit, and the restriction member restricts the movement of the sheet due to the contact of the leading edge of the sheet when the sheet is conveyed onto the stacking unit.

(Item 29)

The sheet processing apparatus according to item 28, wherein in a case where, after creation of an already-bonded sheet stack by bonding a plurality of sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

(Item 30)

A sheet processing apparatus, comprising:

a stacking unit including a stacking surface on which sheets with a layer of an adhesive formed thereon for bonding the sheets together are to be stacked;

a thermal compression bonding unit including a heating member and a sheet cradle member, the heating member being elongated and including a heat generation area configured to heat the adhesive, the sheet cradle member facing the heating member, the thermal compression bonding unit sandwiching and heating the sheets stacked on the stacking unit between the heating member and the sheet cradle member, the thermal compression bonding unit applying pressure while applying heat to the layer of the adhesive formed on the sheets by moving either one or both of the heating member, which is elongated, and the sheet cradle member;

a moving unit configured to move either one or both of the sheets and the thermal compression bonding unit in a longer-side direction of the heating member;

a controller configured to control the sheet processing apparatus; and a conveyance roller provided on a sheet conveyance path and configured to convey the sheets onto the stacking unit, wherein the sheet processing apparatus bonds a plurality of sheets together by heating and pressing the layer of the adhesive formed on the sheets stacked on the stacking unit, the controller acquires information regarding the sheets on which the layer of the adhesive is formed, the conveyance roller and the stacking unit are in such a positional relationship that, upon passing of a trailing edge of the sheet regarding a sheet conveyance direction through the conveyance roller when the sheet is conveyed onto the stacking unit, the trailing edge of the sheet becomes stacked on the stacking unit, and in a case where a sheet length regarding the longer-side direction of the heating member is greater than a length of the heat generation area, and where a length of the layer of the adhesive regarding the longer-side direction of the heating member is less than the length of the heat generation area, and where the layer of the adhesive on the sheets has any area that does not overlap with the heat generation area regarding the longer-side direction of the heating member when the sheets have been conveyed onto the stacking unit, based on the information, the controller causes the moving unit to perform a positional alignment of the layer of the adhesive and the heat generation area by changing a relative position of the sheets regarding the longer-side direction of the heating member and the heat generation area and thereafter causes the thermal compression bonding unit to heat and press the layer of the adhesive.

(Item 31)

The sheet processing apparatus according to item 30, wherein the controller acquires information regarding a sheet length and information regarding the length of the layer of the adhesive regarding the longer-side direction of the heating member.

(Item 32)

The sheet processing apparatus according to item 30 or 31, wherein the moving unit moves the sheets, and the moving unit includes a restriction member configured to restrict movement of the sheet due to contact of a leading edge of the sheet conveyed onto the stacking unit, and the restriction member restricts the movement of the sheet due to the contact of the leading edge of the sheet when the sheet is conveyed onto the stacking unit.

(Item 33)

The sheet processing apparatus according to item 32, wherein in a case where, after creation of an already-bonded sheet stack by bonding a plurality of sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

With the present disclosure, it is possible to provide an image forming system and a sheet processing apparatus configured to create a stack of sheets bonded together by applying heat and pressure properly to a layer of an adhesive formed on a sheet when creating the sheet stack the length of which is greater than the length of the heat generation area of a heater.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-040809, filed Mar. 15, 2023, which is hereby incorporated by reference herein in its entirety.

What is claimed is:

1. An image forming system comprising:

an image forming apparatus configured to form an image on a sheet; and a sheet processing apparatus that is configured to create a sheet stack by bonding together a plurality of sheets conveyed from the image forming apparatus and that includes a stacking unit, a moving unit, and a thermal compression bonding unit having a heating member that is elongated and a sheet cradle member that faces the heating member, wherein the stacking unit includes a stacking surface on which plural sheets, having a layer of an adhesive formed on the plural sheets by the image forming apparatus for bonding the plural sheets together, are to be stacked, wherein the moving unit is configured to move either one or both of the plural sheets and the thermal compression bonding unit in a longer-side direction of the elongated heating member, wherein the heating member of the thermal compression bonding unit includes a heat generation area configured to heat the adhesive, wherein the thermal compression bonding unit is configured to sandwich and heat the plural sheets stacked on the stacking unit between the heating member and the sheet cradle member, and to bond the plural sheets together by applying pressure while applying heat to the layer of the adhesive formed on the plural sheets by moving either one or both of the heating member and the sheet cradle member, wherein a position of the layer of the adhesive formed on the plural sheets is selectable in the longer-side direction of the heating member, and wherein, in a case where a length of the layer of the adhesive regarding the longer-side direction of the heating member is greater than a length of the heat generation area, an entire area of the layer of the adhesive on the plural sheets is heated and pressed by applying the heat and the pressure to the layer of the adhesive more than once while changing, via the moving unit, a relative position of the plural sheets having been conveyed onto the stacking unit and the heat generation area regarding the longer-side direction of the heating member.

2. The image forming system according to claim 1, wherein the heating member is a heater including a substrate and a heat generation resistor serving as the heat generation area formed on the substrate.

3. The image forming system according to claim 1, wherein the heating member includes a heater and a plate member, the heater includes a substrate and a heat generation resistor serving as the heat generation area formed on the substrate, and the plate member is configured to be heated by the heater and be in contact with the plural sheets.

4. The image forming system according to claim 1, wherein the plural sheets on an end portion of which the layer of the adhesive is formed are bonded together, and the end portion is an end portion regarding a direction intersecting with the longer-side direction of the heating member.

5. The image forming system according to claim 1, wherein the longer-side direction of the heating member is along a direction in which the plural sheets are conveyed onto the stacking unit.

6. The image forming system according to claim 1, wherein the longer-side direction of the heating member is along a direction orthogonal to a direction in which the plural sheets are conveyed onto the stacking unit.

7. The image forming system according to claim 1, wherein the moving unit includes a restriction member configured to restrict movement of the sheet, and wherein, in moving either one or both of the plural sheets and the thermal compression bonding unit, the moving unit moves the plural sheets and the restriction member restricts movement of the sheet due to contact of a leading edge of the sheet when the sheet is conveyed onto the stacking unit.

8. The image forming system according to claim 7, wherein, in a case where, after creation of an already-bonded sheet stack by bonding multiple sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

9. The image forming system according to claim 1, wherein the layer of the adhesive is made of a powdery adhesive.

10. The image forming system according to claim 9, wherein the powdery adhesive is a toner.

11. An image forming system comprising:

an image forming apparatus configured to form an image on a sheet; and a sheet processing apparatus that is configured to create a sheet stack by bonding together a plurality of sheets conveyed from the image forming apparatus and that includes a stacking unit, a moving unit, and a thermal compression bonding unit having a heating member that is elongated and a sheet cradle member that faces the heating member, wherein the stacking unit includes a stacking surface on which plural sheets, having a layer of an adhesive formed on the plural sheets by the image forming apparatus for bonding the plural sheets together, are to be stacked, wherein the moving unit is configured to move either one or both of the plural sheets and the thermal compression bonding unit in a longer-side direction of the elongated heating member, wherein the heating member of the thermal compression bonding unit includes a heat generation area configured to heat the adhesive, wherein the thermal compression bonding unit is configured to sandwich and heat the plural sheets stacked on the stacking unit between the heating member and the sheet cradle member, and to bond the plural sheets together by applying pressure while applying heat to the layer of the adhesive formed on the plural sheets by moving either one or both of the heating member and the sheet cradle member, and wherein, in a case where a length of the layer of the adhesive regarding the longer-side direction of the heating member is less than a length of the heat generation area, before the plural sheets are heated and pressed, the moving unit moves either one or both of the plural sheets and the thermal compression bonding unit in advance in accordance with a sheet length of the sheet so that an entire area of the layer of the adhesive overlaps with the heat generation area regarding the longer-side direction of the heating member when the plural sheets have been conveyed onto the stacking unit.

12. The image forming system according to claim 11, wherein the moving unit moves either one or both of the plural sheets and the thermal compression bonding unit in advance before a trailing edge of the sheet becomes stacked on the stacking surface.

13. The image forming system according to claim 11, wherein the moving unit includes a restriction member configured to restrict movement of the sheet, and wherein, in moving either one or both of the plural sheets and the thermal compression bonding unit, the moving unit moves the plural sheets and the restriction member restricts movement of the sheet due to contact of a leading edge of the sheet when the sheet is conveyed onto the stacking unit.

14. The image forming system according to claim 13, wherein, in a case where, after creation of an already-bonded sheet stack by bonding multiple sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

15. The image forming system according to claim 11, wherein the layer of the adhesive is made of a powdery adhesive.

16. The image forming system according to claim 15, wherein the powdery adhesive is a toner.

17. An image forming system comprising:

an image forming apparatus configured to form an image on a sheet; and a sheet processing apparatus that is configured to create a sheet stack by bonding together a plurality of sheets conveyed from the image forming apparatus and that includes a stacking unit, a moving unit, a thermal compression bonding unit having a heating member that is elongated and a sheet cradle member that faces the heating member, and a conveyance roller provided on a sheet conveyance path and configured to convey plural sheets onto the stacking unit, wherein the stacking unit includes a stacking surface on which the plural sheets, having a layer of an adhesive formed on the plural sheets by the image forming apparatus for bonding the plural sheets together, are to be stacked, wherein the moving unit is configured to move either one or both of the plural sheets and the thermal compression bonding unit in a longer-side direction of the elongated heating member, wherein the heating member of the thermal compression bonding unit includes a heat generation area configured to heat the adhesive, wherein the thermal compression bonding unit is configured to sandwich and heat the plural sheets stacked on the stacking unit between the heating member and the sheet cradle member, and to bond the plural sheets together by applying pressure while applying heat to the layer of the adhesive formed on the plural sheets by moving either one or both of the heating member and the sheet cradle member, wherein the conveyance roller and the stacking unit are in such a positional relationship that, upon passing of a trailing edge of the sheet regarding a sheet conveyance direction through the conveyance roller when the sheet is conveyed onto the stacking unit, the trailing edge of the sheet becomes stacked on the stacking unit, wherein, in a case (i) where a length of the sheet regarding the longer-side direction of the heating member is greater than a length of the heat generation area, and (ii) where a length of the layer of the adhesive regarding the longer-side direction of the heating member is less than the length of the heat generation area, and (iii) where the layer of the adhesive on the plural sheets has any area that does not overlap with the heat generation area regarding the longer-side direction of the heating member when the plural sheets have been conveyed onto the stacking unit, the thermal compression bonding unit heats and presses the layer of the adhesive after a positional alignment of the layer of the adhesive and the heat generation area is performed by the moving unit changing a relative position of the plural sheets regarding the longer-side direction of the heating member and the heat generation area.

18. The image forming system according to claim 17, wherein the conveyance roller is provided at a position where the stacking unit and at least a part of the conveyance roller overlap in the conveyance direction when viewed in an axial direction of the conveyance roller.

19. The image forming system according to claim 17, wherein the moving unit includes a restriction member configured to restrict movement of the sheet, and wherein, in moving either one or both of the plural sheets and the thermal compression bonding unit, the moving unit moves the plural sheets and the restriction member restricts movement of the sheet due to contact of a leading edge of the sheet when the sheet is conveyed onto the stacking unit.

20. The image forming system according to claim 19, wherein, in a case where, after creation of an already-bonded sheet stack by bonding multiple sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

21. The image forming system according to claim 17, wherein the layer of the adhesive is made of a powdery adhesive.

22. The image forming system according to claim 21, wherein the powdery adhesive is a toner.

23. A sheet processing apparatus comprising:

a stacking unit including a stacking surface on which plural sheets, having a layer of an adhesive formed on the plural sheets for bonding the plural sheets together, are to be stacked;

a thermal compression bonding unit having a heating member that is elongated and a sheet cradle member that faces the heating member, wherein the heating member includes a heat generation area configured to heat the adhesive, and wherein the thermal compression bonding unit is configured to sandwich and heat the plural sheets stacked on the stacking unit between the heating member and the sheet cradle member, and to apply pressure while applying heat to the layer of the adhesive formed on the plural sheets by moving either one or both of the heating member and the sheet cradle member;

a moving unit configured to move either one or both of the plural sheets and the thermal compression bonding unit in a longer-side direction of the elongated heating member; and a controller configured to control the sheet processing apparatus, wherein the sheet processing apparatus is configured to bond the plural sheets together by heating and pressing the layer of the adhesive formed on the plural sheets stacked on the stacking unit, wherein the controller is configured to acquire information regarding the plural sheets on which the layer of the adhesive is formed, and wherein, in a case where a length of the layer of the adhesive regarding the longer-side direction of the heating member is greater than a length of the heat generation area and thus where an entire area of the layer of the adhesive formed on one side of a sheet is unable to be heated and pressed just by performing heating and pressing once, based on the acquired information, the controller performs control to cause the moving unit to change a relative position of the plural sheets having been conveyed onto the stacking unit and the heat generation area regarding the longer-side direction of the heating member and to cause the thermal compression bonding unit to apply the heat and the pressure to the layer of the adhesive more than once, thereby heating and pressing an entire area of the layer of the adhesive on the sheet.

24. The sheet processing apparatus according to claim 23, wherein the heating member is a heater including a substrate and a heat generation resistor serving as the heat generation area formed on the substrate.

25. The sheet processing apparatus according to claim 23, wherein the heating member includes a heater and a plate member, the heater includes a substrate and a heat generation resistor serving as the heat generation area formed on the substrate, and the plate member is configured to be heated by the heater and be in contact with the plural sheets.

26. The sheet processing apparatus according to claim 23, wherein the plural sheets on an end portion of which the layer of the adhesive is formed are bonded together, and the end portion is an end portion regarding a direction intersecting with the longer-side direction of the heating member.

27. The sheet processing apparatus according to claim 23, wherein the controller further is configured to acquire information regarding a length of the sheet and/or information regarding the length of the layer of the adhesive regarding the longer-side direction of the heating member.

28. The sheet processing apparatus according to claim 23, wherein the moving unit includes a restriction member configured to restrict movement of the sheet, and wherein, in moving either one or both of the plural sheets and the thermal compression bonding unit, the moving unit moves the plural sheets and the restriction member restricts movement of the sheet due to contact of a leading edge of the sheet when the sheet is conveyed onto the stacking unit.

29. The sheet processing apparatus according to claim 28, wherein, in a case where, after creation of an already-bonded sheet stack by bonding multiple sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

30. A sheet processing apparatus comprising:
- a stacking unit including a stacking surface on which plural sheets, having a layer of an adhesive formed on the plural sheets for bonding the plural sheets together, are to be stacked;
- a thermal compression bonding unit having a heating member that is elongated and a sheet cradle member that faces the heating member,
- wherein the heating member includes a heat generation area configured to heat the adhesive, and
- wherein the thermal compression bonding unit is configured to sandwich and heat the plural sheets stacked on the stacking unit between the heating member and the sheet cradle member, and to apply pressure while applying heat to the layer of the adhesive formed on the plural sheets by moving either one or both of the heating member and the sheet cradle member;
- a moving unit configured to move either one or both of the plural sheets and the thermal compression bonding unit in a longer-side direction of the elongated heating member; and
- a controller configured to control the sheet processing apparatus to bond the plural sheets together by heating and pressing the layer of the adhesive formed on the plural sheets stacked on the stacking unit,
- wherein the controller further is configured to acquire information regarding the plural sheets on which the layer of the adhesive is formed, and
- wherein, in a case where a length of the layer of the adhesive regarding the longer-side direction of the heating member is less than a length of the heat generation area, and based on the acquired information, the controller performs control to, before the plural sheets are heated and pressed, cause the moving unit to move either one or both of the plural sheets and the thermal compression bonding unit in advance in accordance with a length of a sheet so that an entire area of the layer of the adhesive overlaps with the heat generation area regarding the longer-side direction of the heating member when the plural sheets have been conveyed onto the stacking unit.

31. The sheet processing apparatus according to claim 30, wherein the controller further is configured to acquire information regarding a length of the sheet and information regarding the length of the layer of the adhesive regarding the longer-side direction of the heating member.

32. The sheet processing apparatus according to claim 30,
- wherein the moving unit includes a restriction member configured to restrict movement of the sheet, and
- wherein, in moving either one or both of the plural sheets and the thermal compression bonding unit, the moving unit moves the plural sheets and the restriction member restricts movement of the sheet due to contact of a leading edge of the sheet when the sheet is conveyed onto the stacking unit.

33. The sheet processing apparatus according to claim 32, wherein, in a case where, after creation of an already-bonded sheet stack by bonding multiple sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

34. A sheet processing apparatus comprising:
- a stacking unit including a stacking surface on which plural sheets, having a layer of an adhesive formed on the plural sheets for bonding the plural sheets together, are to be stacked;
- a thermal compression bonding unit having a heating member that is elongated and a sheet cradle member that faces the heating member,
- wherein the heating member includes a heat generation area configured to heat the adhesive, and
- wherein the thermal compression bonding unit is configured to sandwich and heat the plural sheets stacked on the stacking unit between the heating member and the sheet cradle member, and to apply pressure while applying heat to the layer of the adhesive formed on the plural sheets by moving either one or both of the heating member and the sheet cradle member;
- a moving unit configured to move either one or both of the plural sheets and the thermal compression bonding unit in a longer-side direction of the elongated heating member;
- a conveyance roller provided on a sheet conveyance path and configured to convey the plural sheets onto the stacking unit; and
- a controller configured to control the sheet processing apparatus to bond the plural sheets together by heating and pressing the layer of the adhesive formed on the plural sheets stacked on the stacking unit,
- wherein the controller further is configured to acquire information regarding the plural sheets on which the layer of the adhesive is formed,
- wherein the conveyance roller and the stacking unit are in such a positional relationship that, upon passing of a trailing edge of the sheet regarding a sheet conveyance direction through the conveyance roller when the sheet is conveyed onto the stacking unit, the trailing edge of the sheet becomes stacked on the stacking unit, and
- wherein, in a case (i) where a length of the sheet regarding the longer-side direction of the heating member is greater than a length of the heat generation area, and (ii) where a length of the layer of the adhesive regarding the longer-side direction of the heating member is less than the length of the heat generation area, and (iii) where the layer of the adhesive on the plural sheets has any area that does not overlap with the heat generation area regarding the longer-side direction of the heating member when the plural sheets have been conveyed onto the stacking unit, based on the acquired information, the controller causes the moving unit to perform a positional alignment of the layer of the adhesive and the heat generation area by changing a relative position of the plural sheets regarding the longer-side direction of the heating member and the heat generation area and thereafter causes the thermal compression bonding unit to heat and press the layer of the adhesive.

35. The sheet processing apparatus according to claim 34, wherein the conveyance roller is provided at a position where the stacking unit and at least a part of the conveyance roller overlap in the conveyance direction when viewed in an axial direction of the conveyance roller.

36. The sheet processing apparatus according to claim 34, wherein the controller further is configured to acquire information regarding the length of the sheet and information regarding the length of the layer of the adhesive regarding the longer-side direction of the heating member.

37. The sheet processing apparatus according to claim 34, wherein the moving unit includes a restriction member configured to restrict movement of the sheet, and wherein, in moving either one or both of the plural sheets and the thermal compression bonding unit, the moving unit moves the plural sheets and the restriction member restricts movement of the sheet due to contact of a leading edge of the sheet when the sheet is conveyed onto the stacking unit.

38. The sheet processing apparatus according to claim 37, wherein, in a case where, after creation of an already-bonded sheet stack by bonding multiple sheets together, a succeeding sheet is additionally bonded to the already-bonded sheet stack, a position where movement of the succeeding sheet conveyed onto the stacking unit is restricted by the restriction member is identical to a position where movement of each sheet of the already-bonded sheet stack conveyed onto the stacking unit is restricted by the restriction member.

* * * * *